United States Patent

[11] 3,580,107

[72] Inventor Elias Orshansky, Jr.
San Francisco, Calif.
[21] Appl. No. 769,008
[22] Filed Oct. 21, 1968
[45] Patented May 25, 1971
[73] Assignee URS Systems Corporation
San Mateo, Calif.

[54] TRANSMISSION
93 Claims, 33 Drawing Figs.

[52] U.S. Cl. ................................................... 74/687
[51] Int. Cl. ............................................. F16h 47/08
[50] Field of Search .......................................... 74/691,
686, 687, 689, 690, 691, 714, 720.5

[56] References Cited
UNITED STATES PATENTS

| | | | |
|---|---|---|---|
| 1,626,584 | 4/1927 | Reeves | 74/689UX |
| 2,833,160 | 5/1958 | Morgan | 74/687X |
| 2,939,342 | 6/1960 | Woydt et al. | 74/687 |
| 2,962,915 | 12/1960 | Wiggermann | 74/687 |
| 2,972,905 | 2/1961 | Bullard | 74/687X |
| 3,204,486 | 9/1965 | DeLalio | 74/687 |
| 3,212,358 | 10/1965 | DeLalio | 74/687 |
| 3,427,899 | 2/1969 | Gunderson et al | 74/687 |
| 3,433,095 | 3/1969 | Tuck | 74/687 |

Primary Examiner—Carlton R. Croyle
Assistant Examiner—Thomas C. Perry
Attorney—Owen, Wickersham and Erickson ABSTRACT: Power is transmitted by a planetary and hydraulic assembly which has one input shaft, two output means, and two reactions. While one output means is increasing its speed, the other output means is simultaneously decreasing its speed, and the ratio of the maximum speed of one output means to its minimum speed is substantially the same as the ratio of the maximum speed of the other output means to its minimum speed. This characteristic of speeding up one output means while the other slows down is used over and over again by shifting the final output from the point where one of the output means is going at maximum speed to the other output means when it is going at minimum speed, thus going through this cycle again and again. The power transmission therefore connects successively the final output drive to one output member of the planetary assembly and then to the other output member of the planetary assembly, and then back to the first output member of the planetary assembly at a different ratio from the previous connection, and so on, and this can be done because these output means continually increase and decrease their speeds.

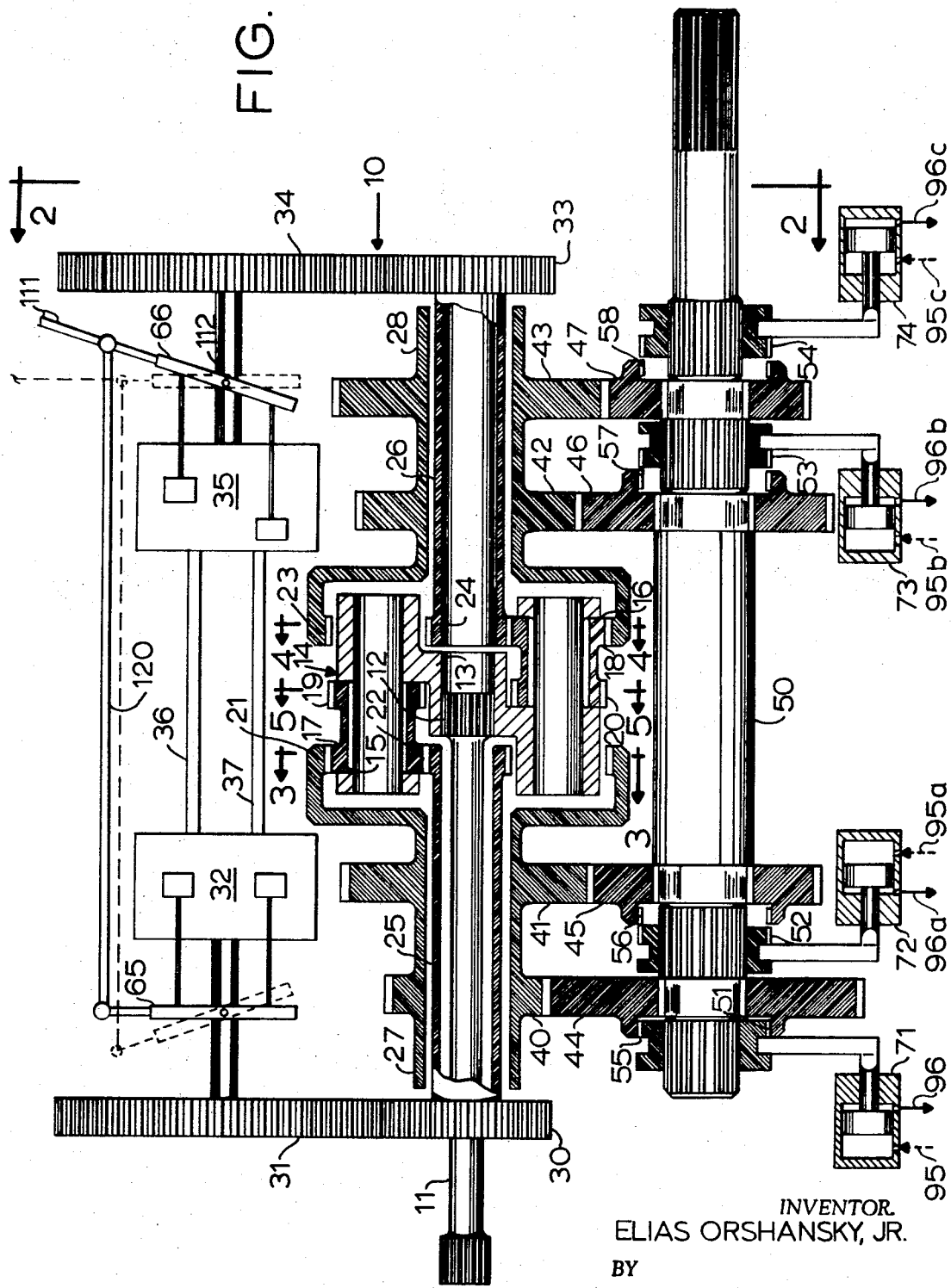

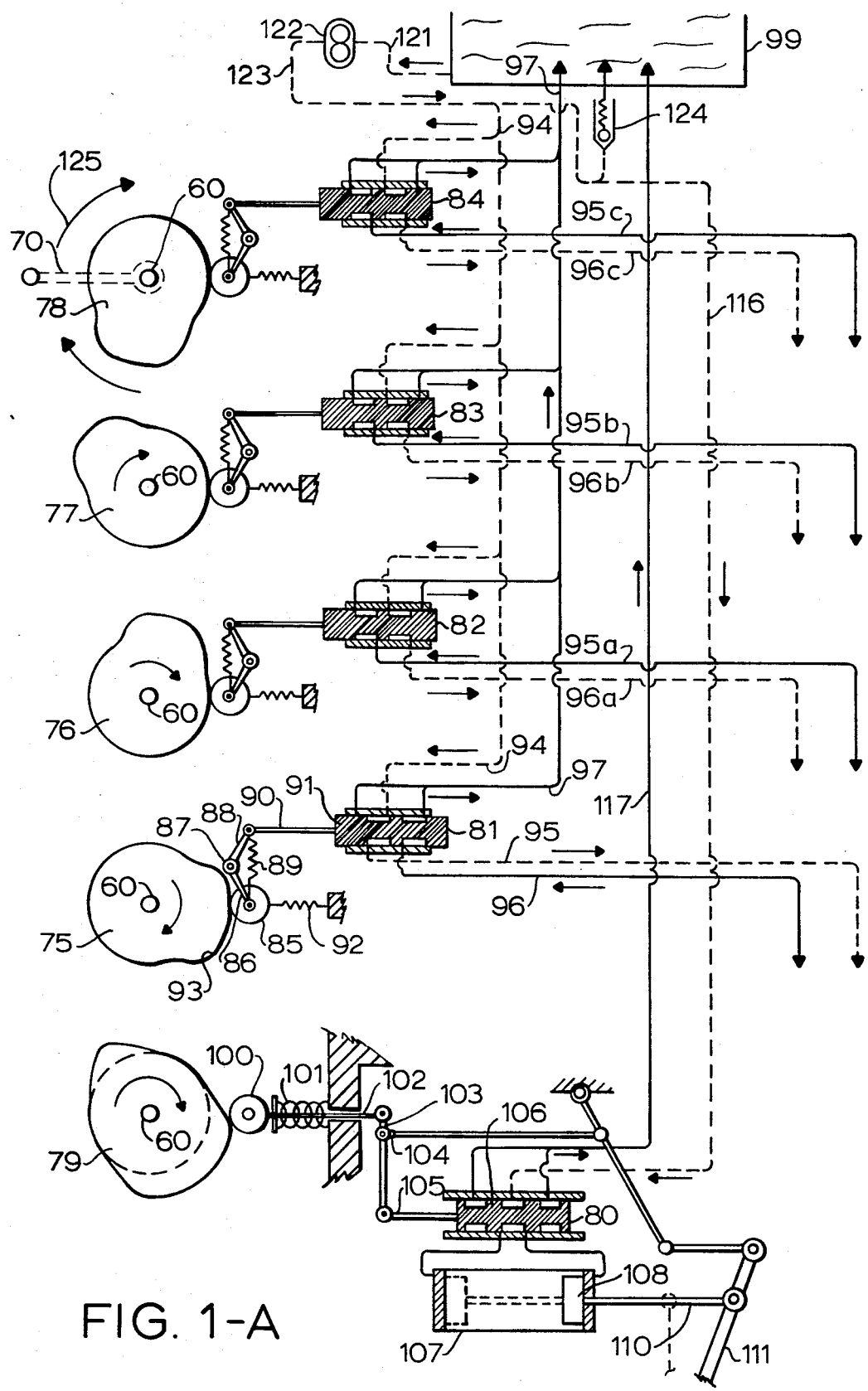
FIG. 1-A

INVENTOR.
ELIAS ORSHANSKY, JR
ATTORNEYS

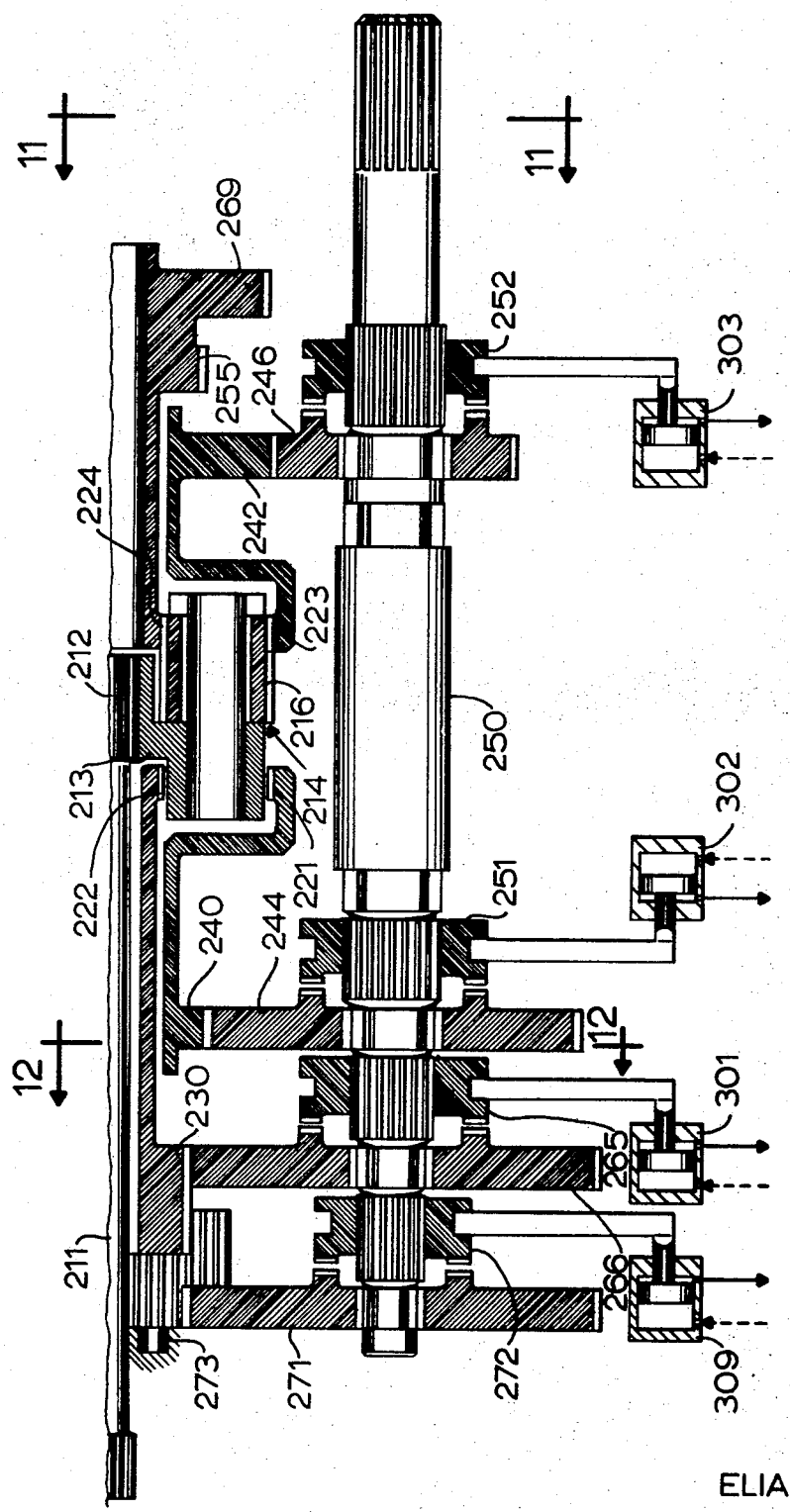

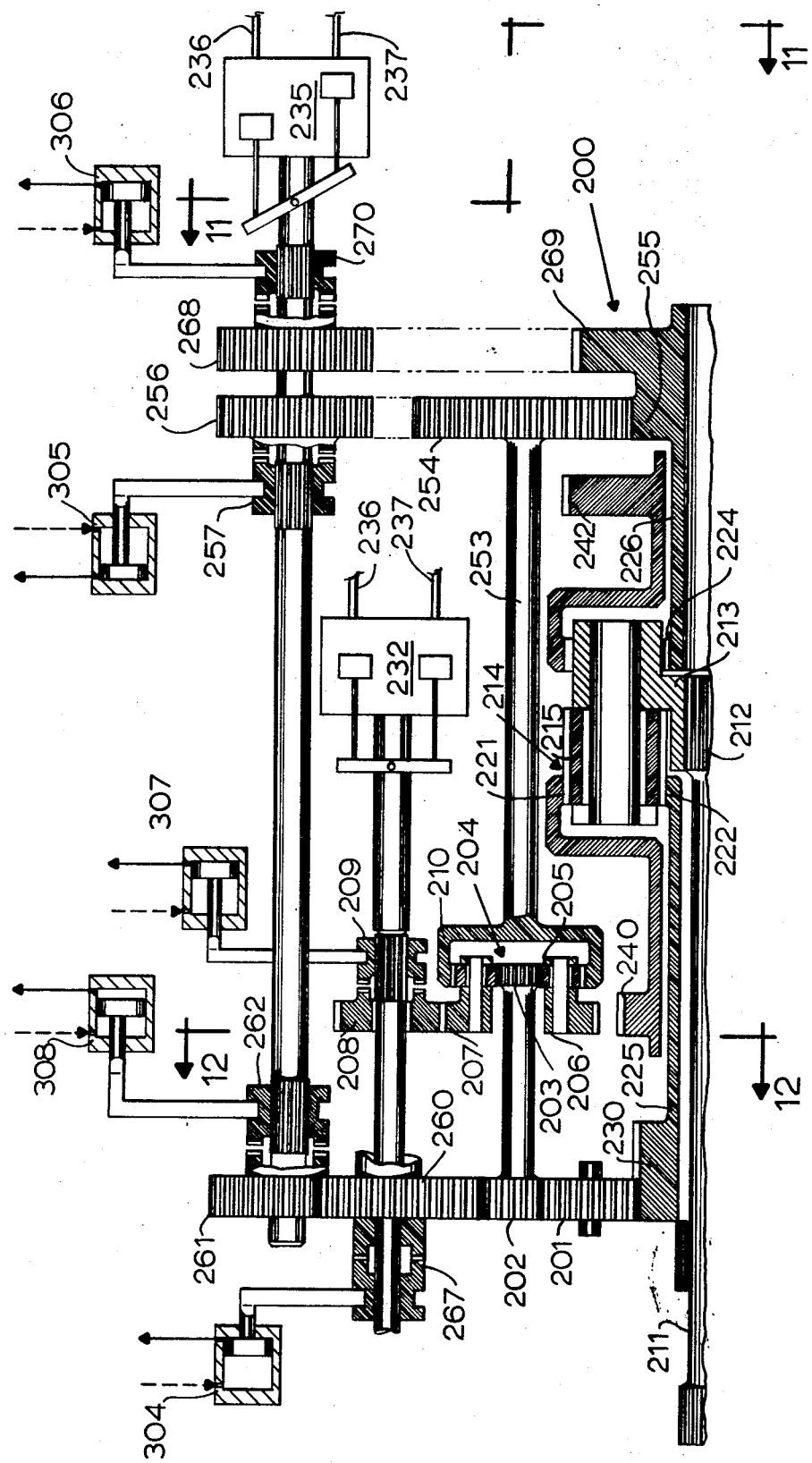
FIG. 10-B

SPEED RELATIONSHIPS OF PLANETARY MEMBERS TO OUTPUT SHAFT OF FIG. 1

RELATIONSHIP OF ELEMENT SPEEDS OF PLANETARY MEMBERS TO OUTPUT SHAFT SPEED OF FIGS 1 AND 8.

FIG. 19 TORQUES OF THE HYDRAULIC UNITS AT THE VARIOUS SPEEDS OF THE OUTPUT SHAFT.

PATENTED MAY 25 1971 3,580,107

INVENTOR.
ELIAS ORSHANSKY, JR
BY
ATTORNEYS

SPEED RELATIONSHIPS OF PLANETARY MEMBERS TO OUTPUT SHAFT OF FIG. 14

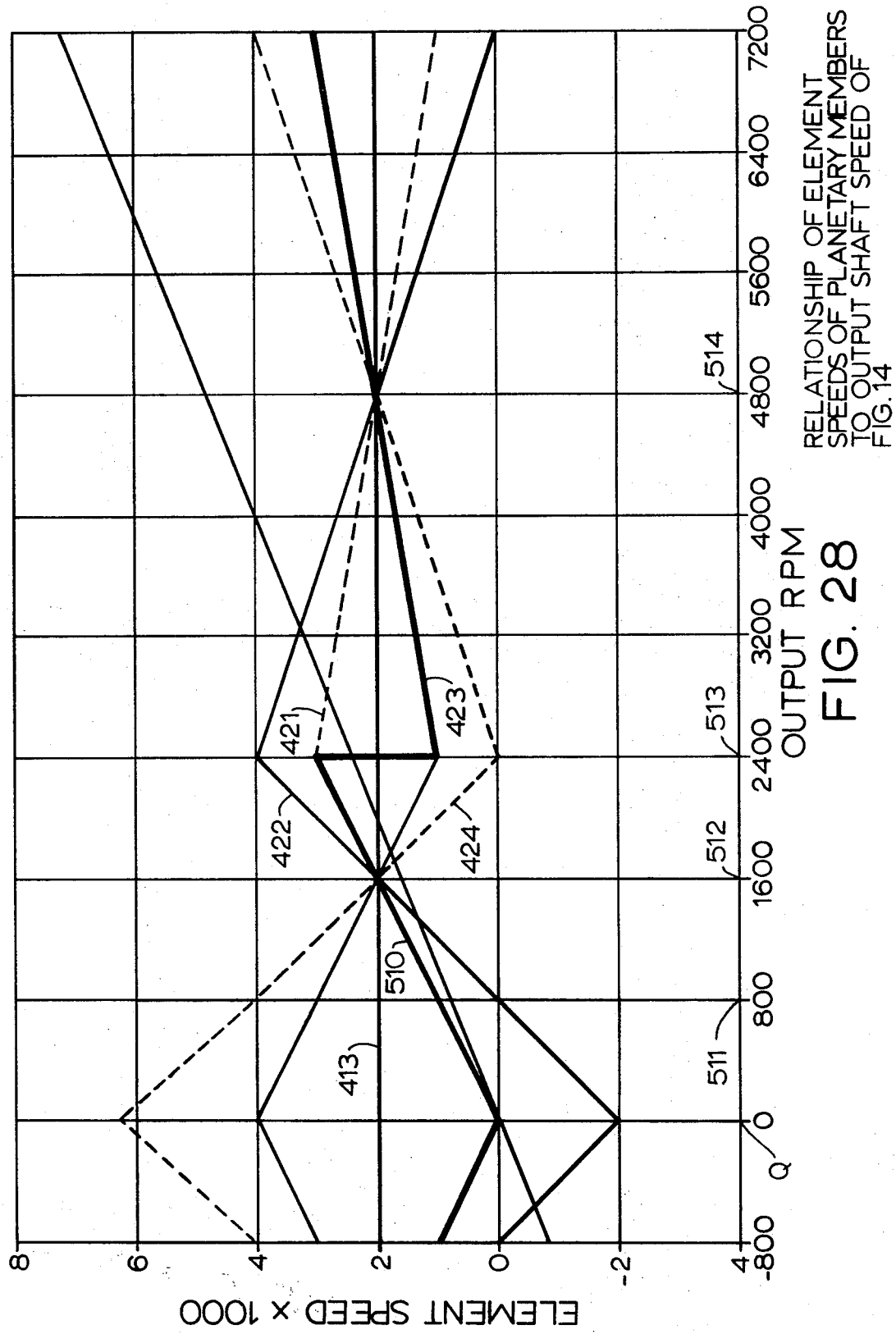

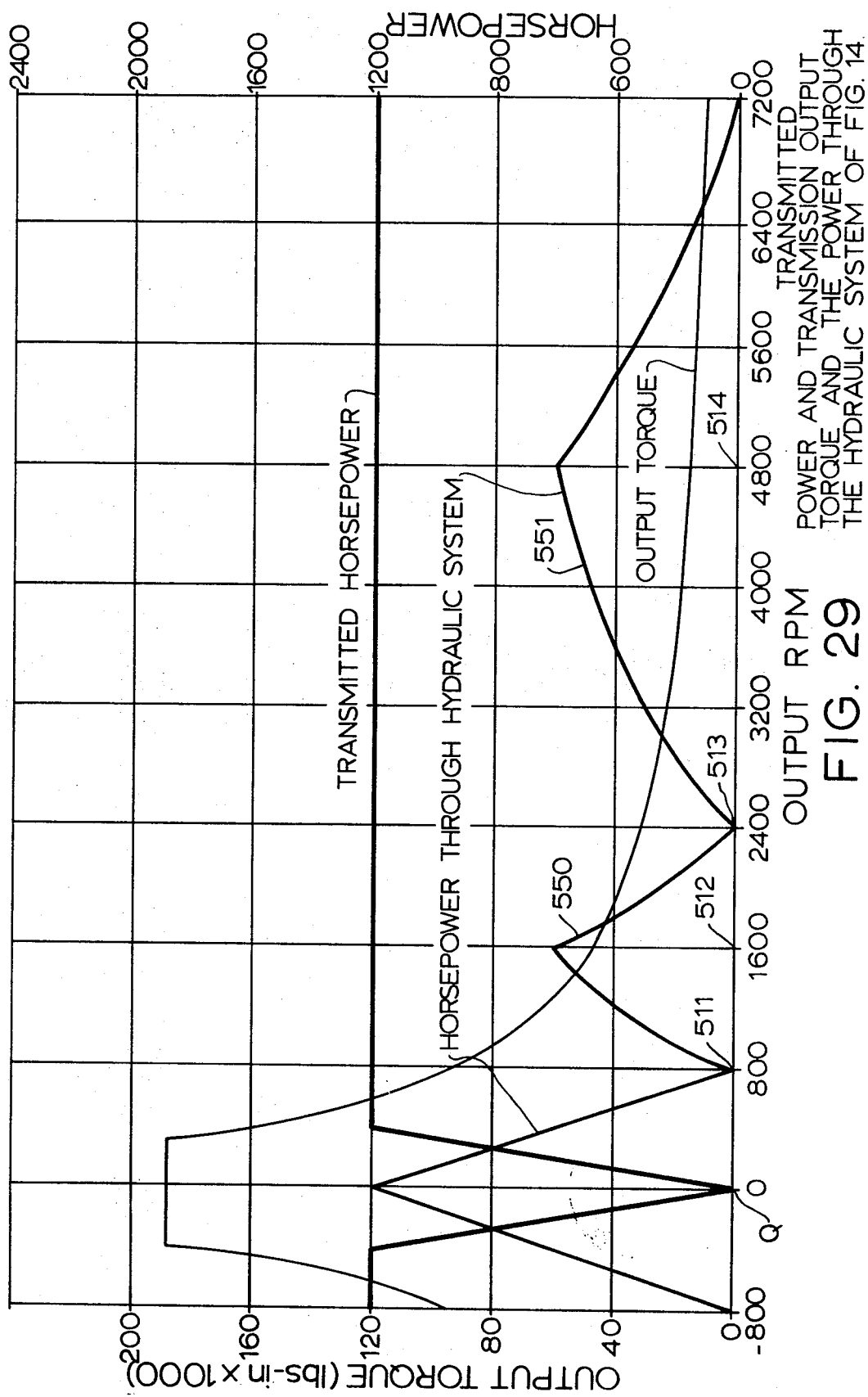
FIG. 29 POWER AND TRANSMISSION OUTPUT TORQUE AND THE POWER THROUGH THE HYDRAULIC SYSTEM OF FIG. 14.

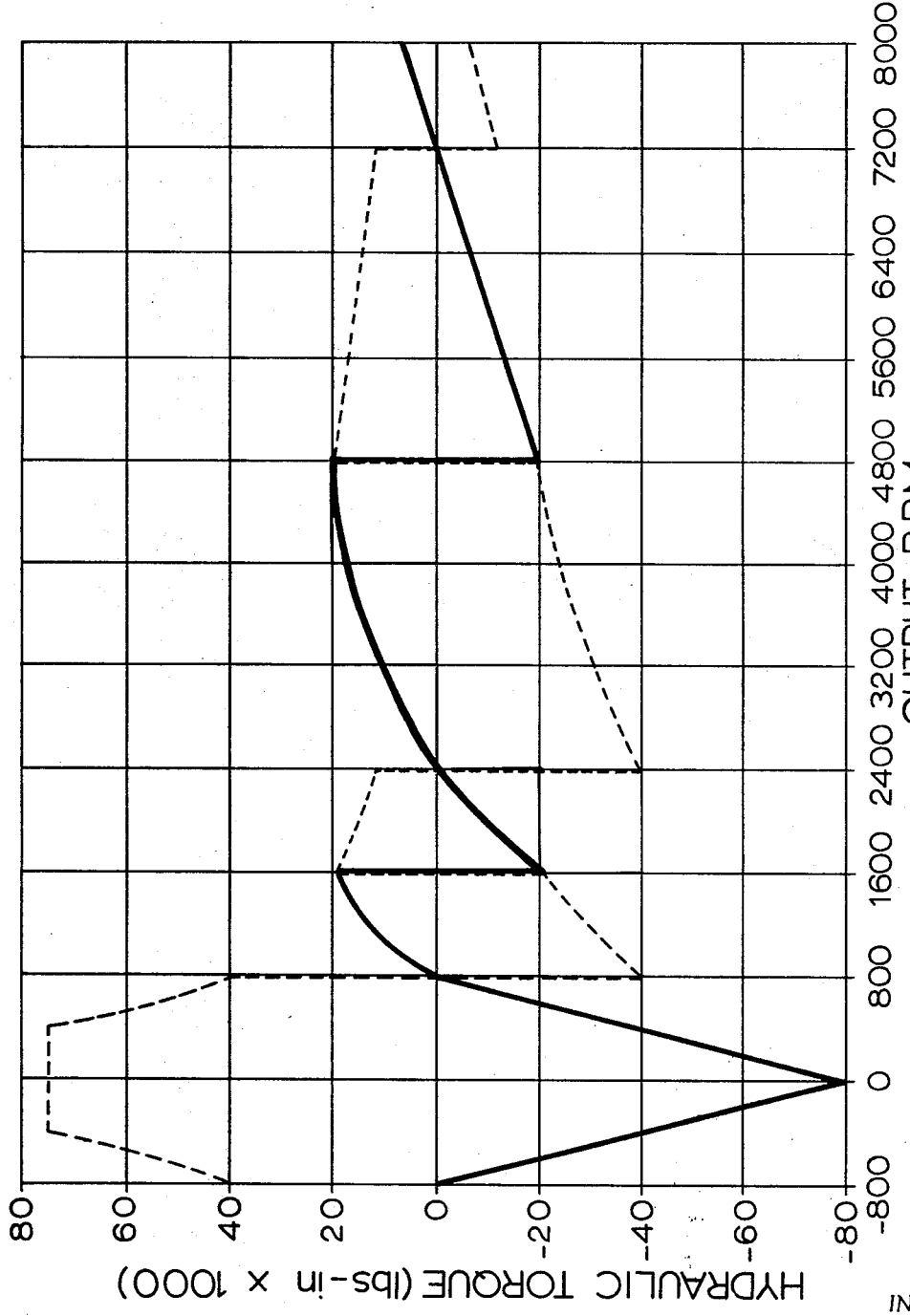

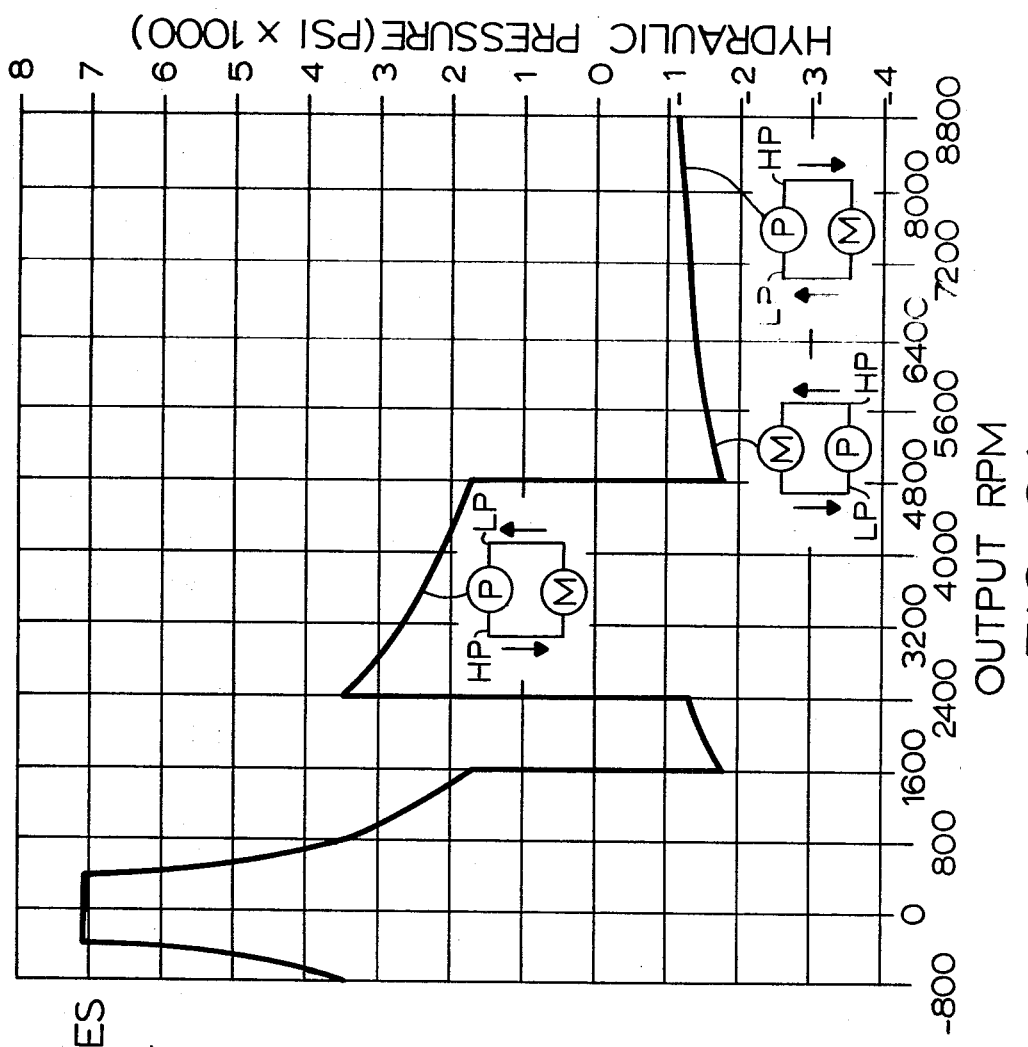

TRANSMISSION

This invention relates to an improved transmission.

The transmission of this invention has the ability to produce a continually variable speed-torque characteristic which may extend over a wide range of torque multiplication—e.g., 18 to 1 or more—by recycling a split torque planetary and hydraulic system through as many stages of operation as are required to obtain the desired wide torque variation. The planetary and hydraulic split-torque part of the transmission traverses only a relatively narrow range of torque multiplication, but due to the recycling ability, it can traverse this range over and over again without an interruption of power flow from the input to the output and without at any time unloading the power plant and so letting it run away. There are moments when two sets of gears are engaged but no moment during power transmission where nothing is engaged.

The desirability of recycling arises because, for any given torque multiplication range, the size of hydraulic units and the amount of the power transmitted hydraulically is dependent upon the extent of that range. The "rated horsepower" or "rating" of an hydraulic unit is the product of the highest torque it may be called upon to sustain (even though that may occur when the unit is stationary) multiplied by the highest speed it may be called upon to sustain (even though it may transmit no torque at that speed). The unit may never reach its rated horsepower, but its rated horsepower does determine its size and cost. For instance, if, within a planetary and hydraulic system, the torque multiplication range in a single cycle of operation is 2 to 1, the rated horsepower of the hydraulic units is equal to the horsepower input to transmission (HIT). If the torque multiplication range is 3 to 1, the rated horsepower of the hydraulic units is twice the HIT. If the range is 4 to 1, the rated horsepower of the hydraulic units is three times the HIT, and so on, so that for an 18 to 1 range, the rated horsepower would be 17 times the HIT. As a practical matter, it is desirable to keep the size of the hydraulic units within reason, because their cost, size, and weight increase with increases in rated horsepower, and also because units of extremely large horsepower are unavailable.

The hydraulically transmitted horsepower also increases with the range covered in a single cycle of operation. The narrower this range the more efficient is the performance of the planetary and hydraulic system because, first, the hydraulic units in themselves are smaller and, second, the amount of hydraulically transmitted horsepower is also smaller. Generally, the rating of the hydraulic unit is described by the product of (HIT) and (R minus 1), where R is the overall reduction ratio for one cycle. Where reduction ranges of the order of 18 to 1 are required, it is not possible to accomplish this in one cycle with units of reasonable size. For instance, in a 1,000 HP transmission with an 18 to 1 reduction range, the hydraulic units required would have to be capable of transmitting 17,000 HP, if a single cycle of operation were used.

A significant virtue of the present invention lies in the fact that a small reduction range—e.g., the range that has been used in the calculations and curves herein, approximately 1.7 to 1, and which requires hydraulic units of only 700 HP rating for a 1000 HP transmission—may be stepped several times through output ratio gearing to result in an overall range of 18 to 1 or whatever total reduction is needed.

When a new range is first engaged in shifting from one range to another, the new range is not required to transmit power immediately upon engagement, a very important advantage, because it means that power-shift clutches are not needed. Also, in shifting from one range to another, the engagement of the new range takes place before the old range is disconnected; thus the power plant is never relieved of the final load and cannot run away. This is especially important in applications involving turbine or diesel engines. Further, at the point of shift from one range to the other, the final drive gearing runs in a condition of synchronism (or virtually so) and, therefore, there is no shock on the system in effecting the shift; for that reason, dog or gear coupling clutches may be used instead of having to rely on expensive friction clutches. These shifting characteristics enable the device to be used where extremely large horsepowers are involved.

Another important feature is that at any speed where shifting occurs, the two clutches are engaged at the same time. Instead of disengaging one of the clutches, both may be left engaged and power transmission is then purely mechanical. The device can be operated at any of these shifting speeds as a purely mechanical transmission with very high efficient and with minimal wear of the hydraulic units.

Many prior-art constructions have operated hydraulic units through a number of cycles in a given range of reduction, but these constructions relied upon compounding more and more planetaries and upon shifting the hydraulic units from one planetary to the other, or else the hydraulic units did not operate under identical conditions in each cycle, and therefore their size had to be a compromise. The present invention, in contrast, enables one planetary assembly to go through as many cycles as are required, and the hydraulic units operate under identical conditions in each cycle.

Two reaction means are used in the transmission of this invention, and one of these may be on either the input or the output shaft; when that is the case, the planetary itself has only one reaction means.

The invention may be considered as a recycling transmission containing a planetary system and an hydraulic system attached to two reaction means, at least one reaction means being on the planetary system and the second either there or on the input or the output shaft. The planetary system has two output members which operate so that one increases its speed while the other is decreasing its speed. These output members are connected in alternation at different ratios to the final output shaft at points of synchronous speeds, in such a way that the planetary and hydraulic systems can repeat their cycles of operation over and over again. In two such sequential attachments of the two output members, the planetary-hydraulic unit assembly returns to its initial condition. Thus, in two subcycles, the basic transmission elements have gone through one complete cycle and can be used over again.

In place of hydraulic units, any unit capable of variable torque-speed relationship (such as an electric motor generator system with braking capabilities or possibly even a friction drive) may be used so long as, at certain points in the system, one of the members of this variable system is capable of holding a member of the planetary gearing stationary while its opposite side spins free. This is usually easiest to accomplish in an hydraulic unit, but an electrical or mechanical system can be used. The torque-varying member of the transmission thus comprises the planetary gearing plus a torque-varying entity (whether hydraulic, electrical, mechanical, or whatever), and this torque-varying member is capable of alternately holding the reaction means of one or the other members of the planetary, which could be either its own reaction gearing or its input or its output shaft in combination with another reaction gear.

A principle involved is that there are two reaction units, one capable of providing all necessary reaction torque, while the other unit spins freely. This characteristic enables shifting from one range to another at the final output shaft to be made without power being transmitted by the new range gearing immediately upon its engagement.

Other objects and advantages of the invention will appear from the following description of some preferred embodiments thereof.

In the drawings:

FIG. 1 is a somewhat simplified view in elevation and in section of a basic transmission embodying the principles of the invention, taken along the line 1–1 in FIG. 2. An alternate position of the angle plates for the hydraulic units and their connecting means is shown in broken lines.

FIG. 1A is a somewhat simplified schematic view of a control system that may be used in conjunction with the device of FIG. 1, it being understood that all the cams are actually on a single shaft but are shown as they are for clarity. Hydraulic lines under high pressure are shown in broken lines, while the low-pressure hydraulic lines are shown in solid lines.

Figure 2:
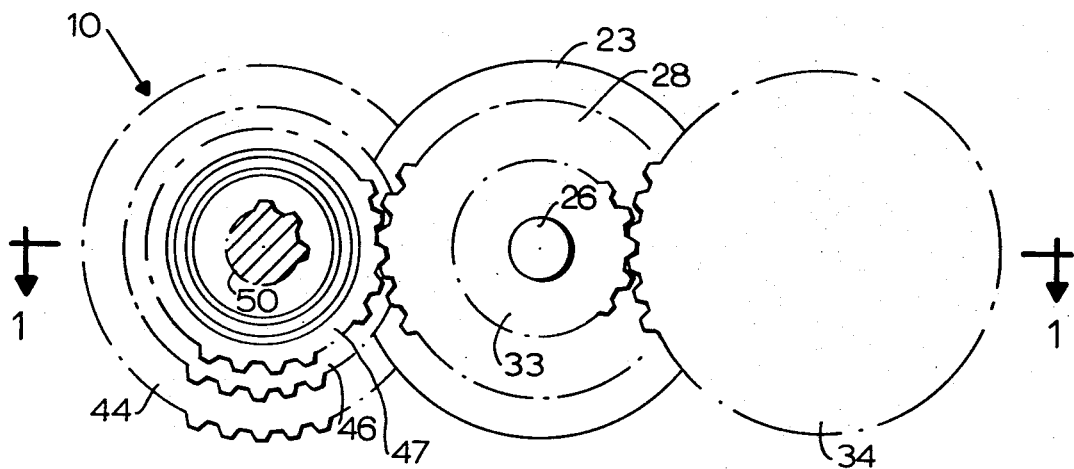
FIG. 2 is a view in section taken along the line 2–2 in FIG. 1.
Figure 3:
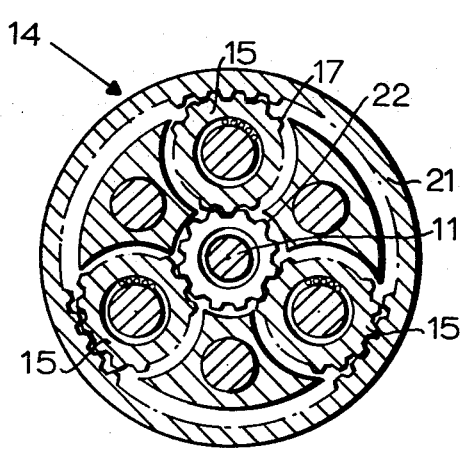
FIG. 3 is a view in section taken along the line 3–3 in FIG. 1.
Figure 4:
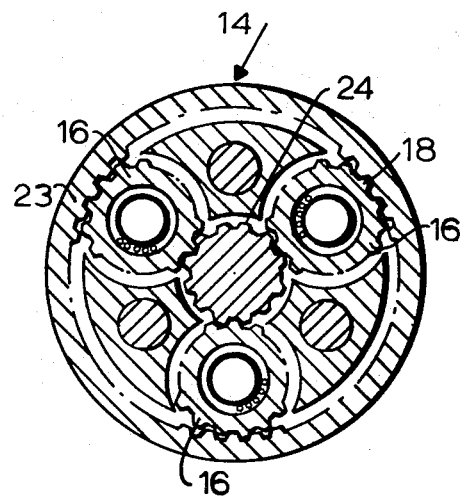
FIG. 4 is a view in section taken along the line 4–4 in FIG. 1.
Figure 5:
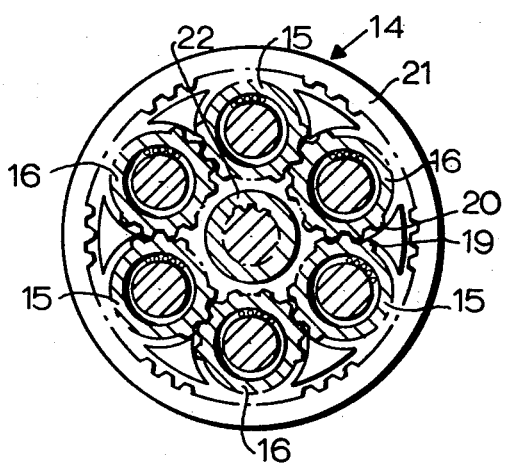
FIG. 5 is a view in section taken along the line 5–5 in FIG. 1.
Figure 6:
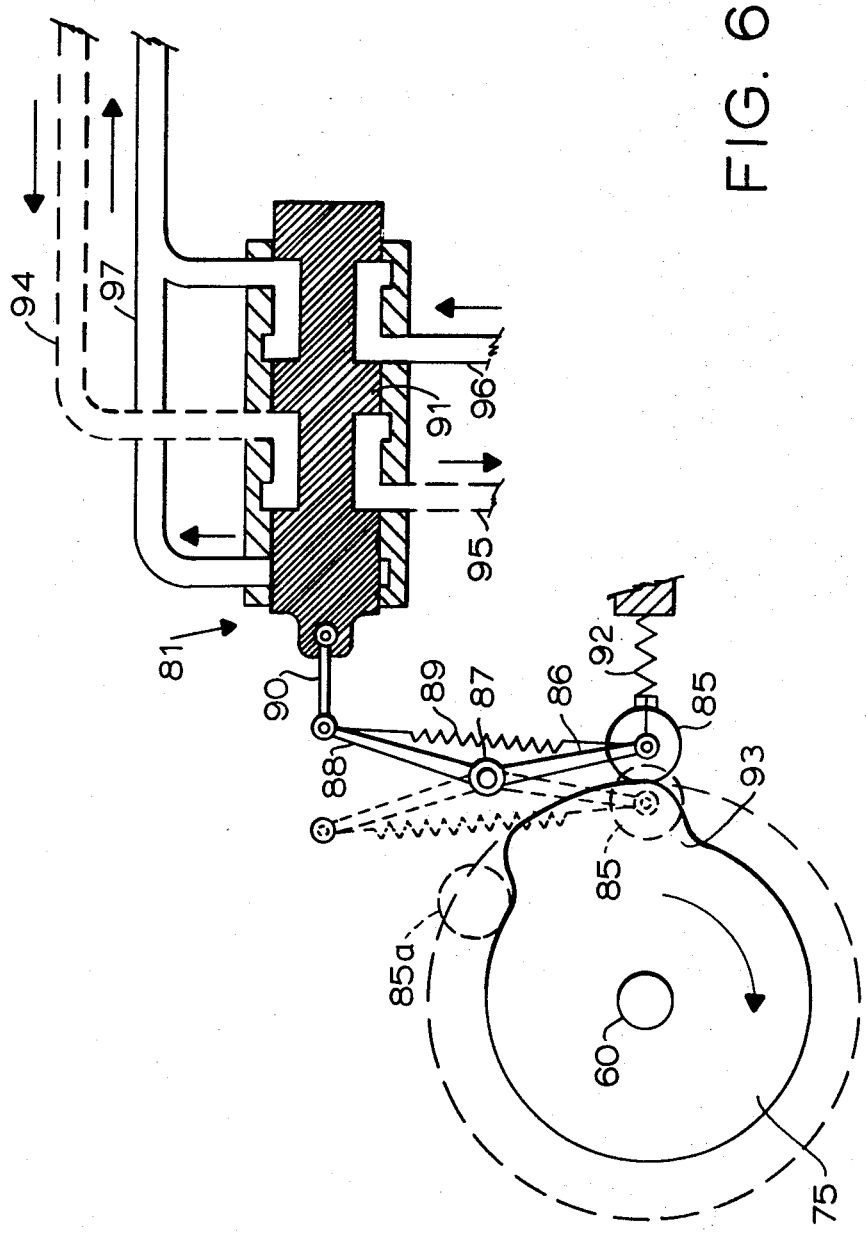

FIG. 6 is an enlarged view of a portion of FIG. 1A, showing one of the several shift-actuating valve-and-cam arrangements of that system. Alternative positions of the cam roller and some associated parts are shown in broken lines. High-pressure and low-pressure hydraulic lines are shown as in FIG. 1A.

Figure 7:
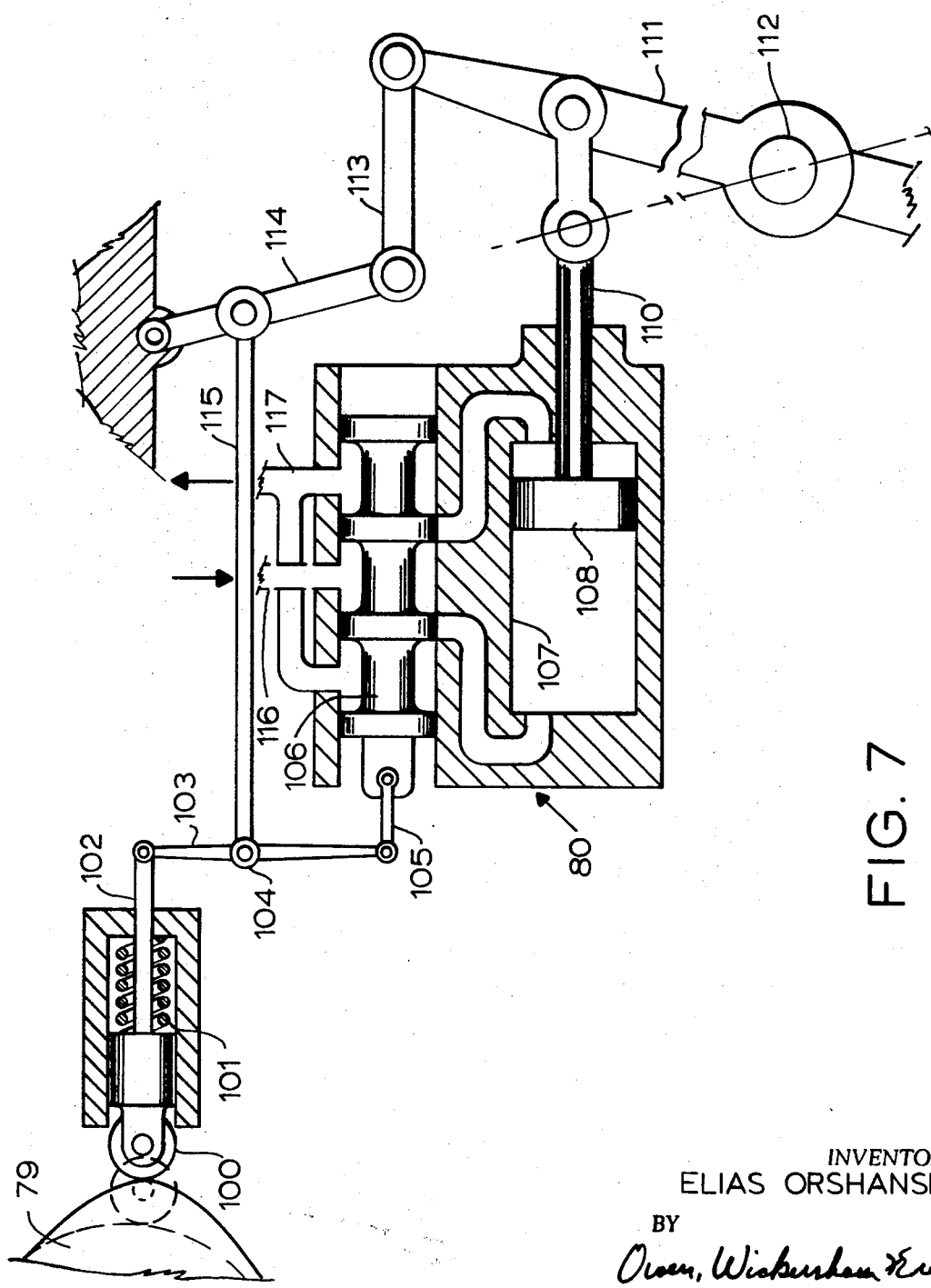

FIG. 7 is an enlarged view in elevation and in section and generally schematic of a portion of FIG. 1A showing a servocontrol system for controlling the stroke of one or both hydraulic units of FIG. 1.

Figure 8:
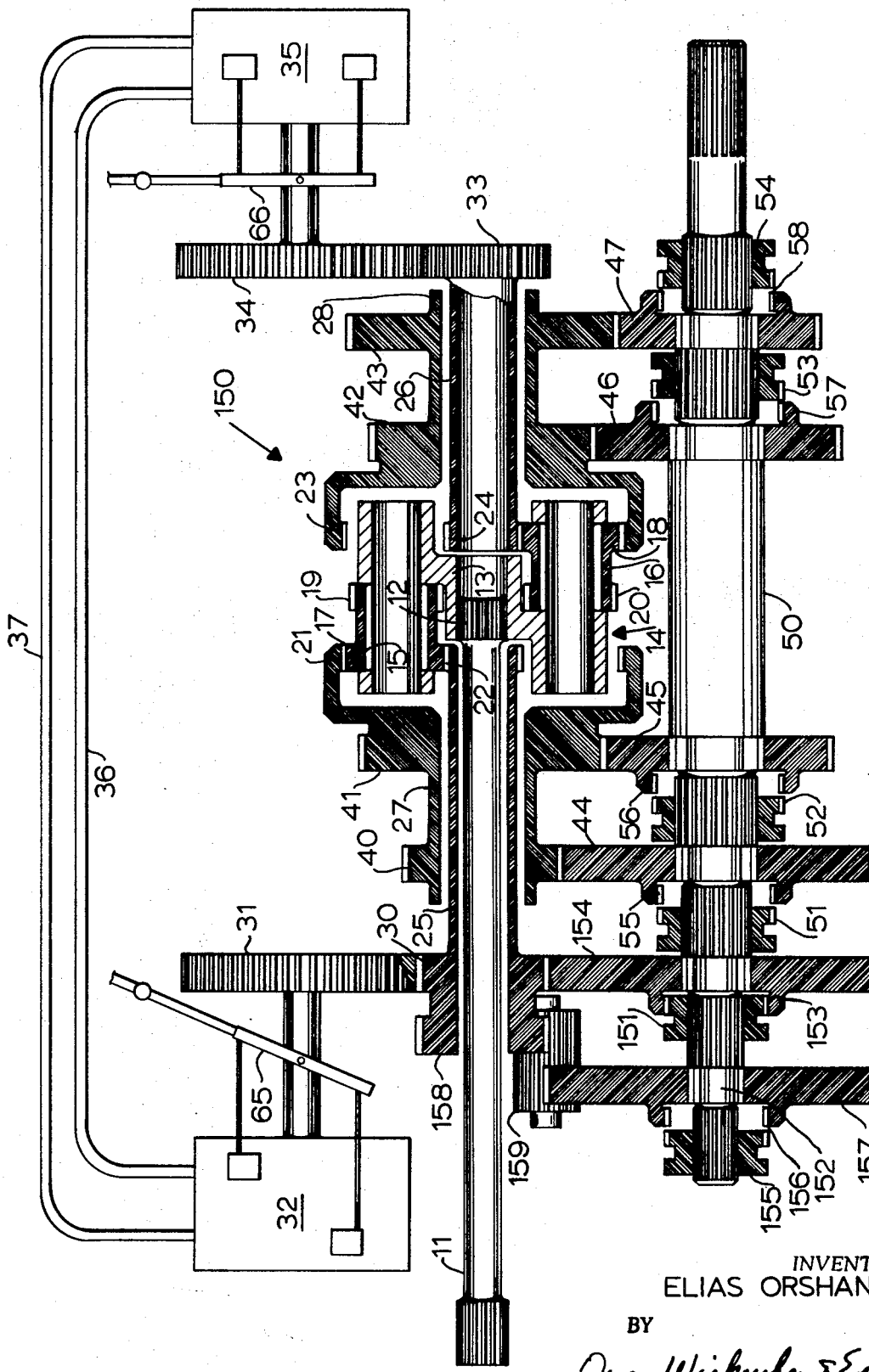

FIG. 8 is a view similar to FIG. 1 of a modified form of the invention having reverse and starting gears added to the device of FIG. 1.

Figure 9:
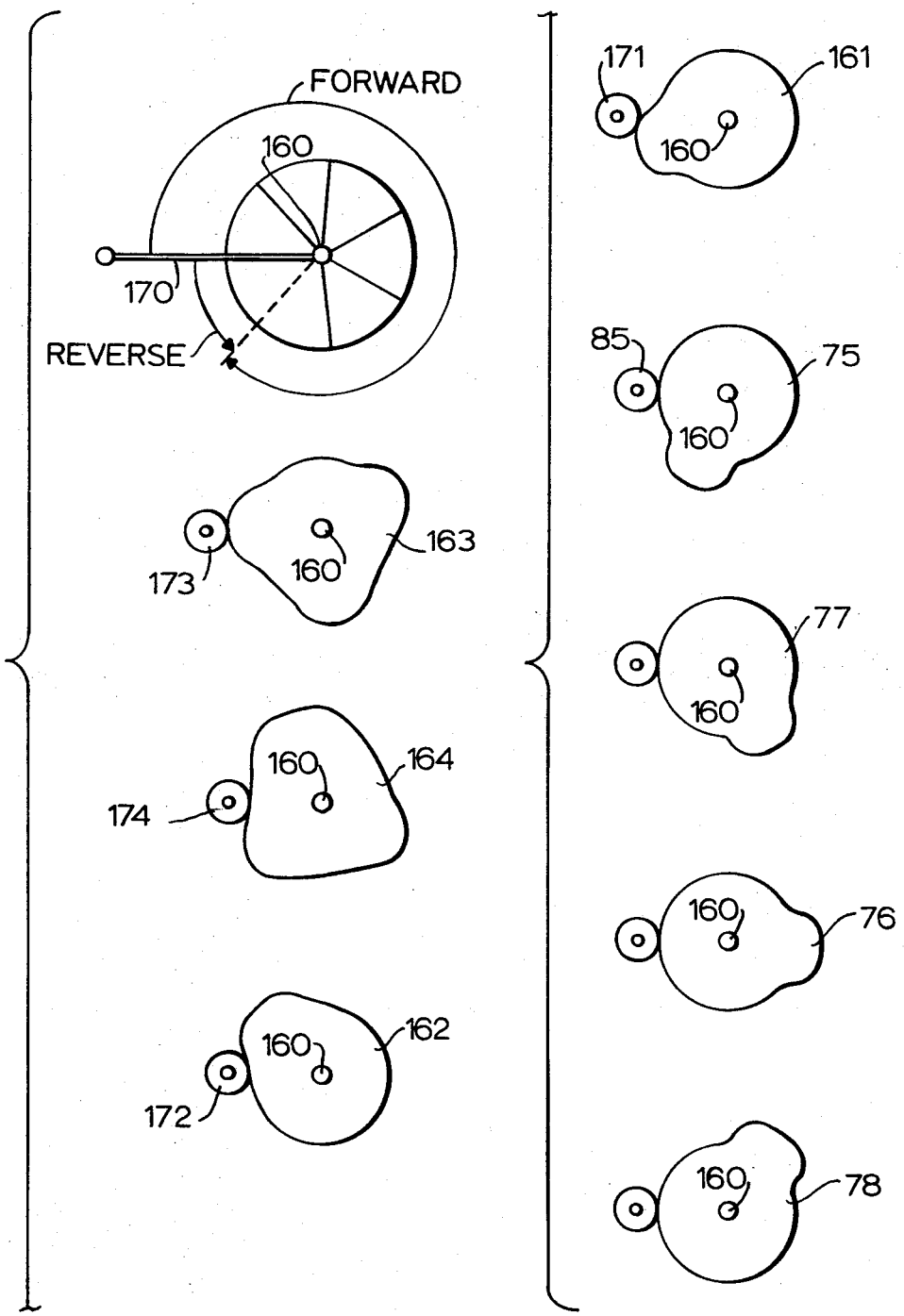

FIG. 9 is an exploded view of a cam system that may be used for control of the device of FIG. 8, through a system generally like that of FIG. 1A, the cams being shown in their relative angular positions. Normally they are all on a single shaft.

Figure 12:
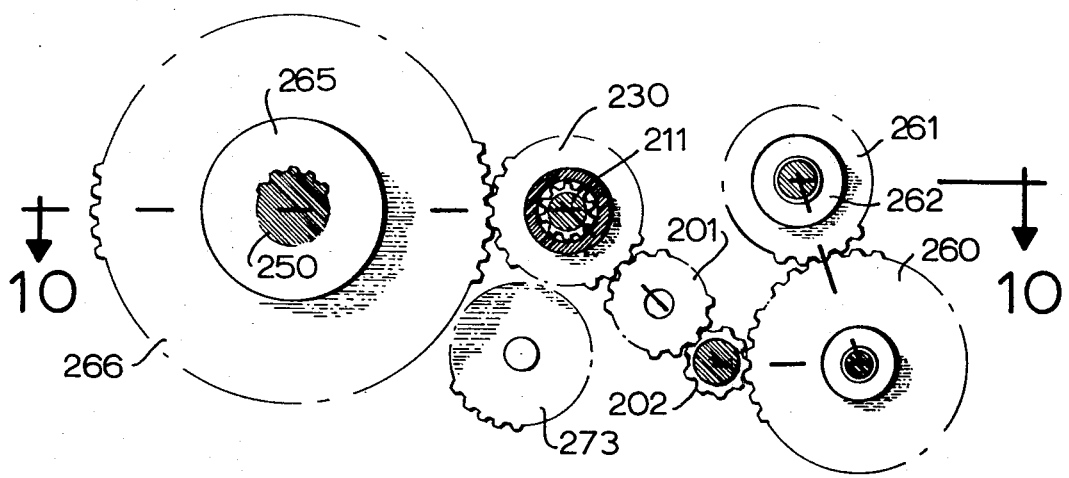

FIGS. 10A and 10B comprise a view similar to FIG. 1 of another modified form of the invention including a secondary split-torque function, taken along the line 10–10 in FIG. 12. The view is shown on two sheets because of space limitations.

Figure 11:
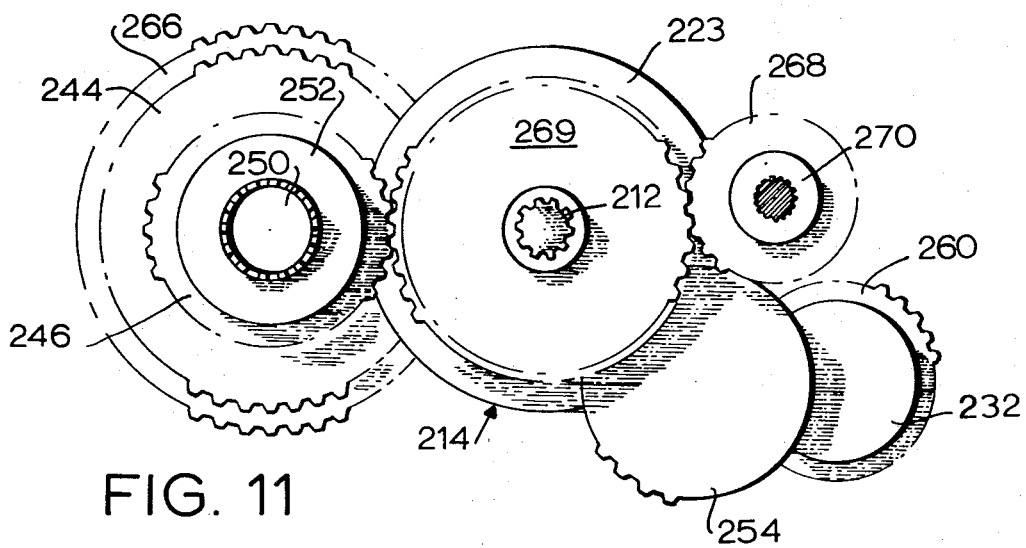

FIG. 11 is a view in section taken along the line 11–11 in FIGS. 10A and 10B.

FIG. 12 is a view in section taken along the line 12–12 in FIGS. 10A and 10B.

Figure 13:
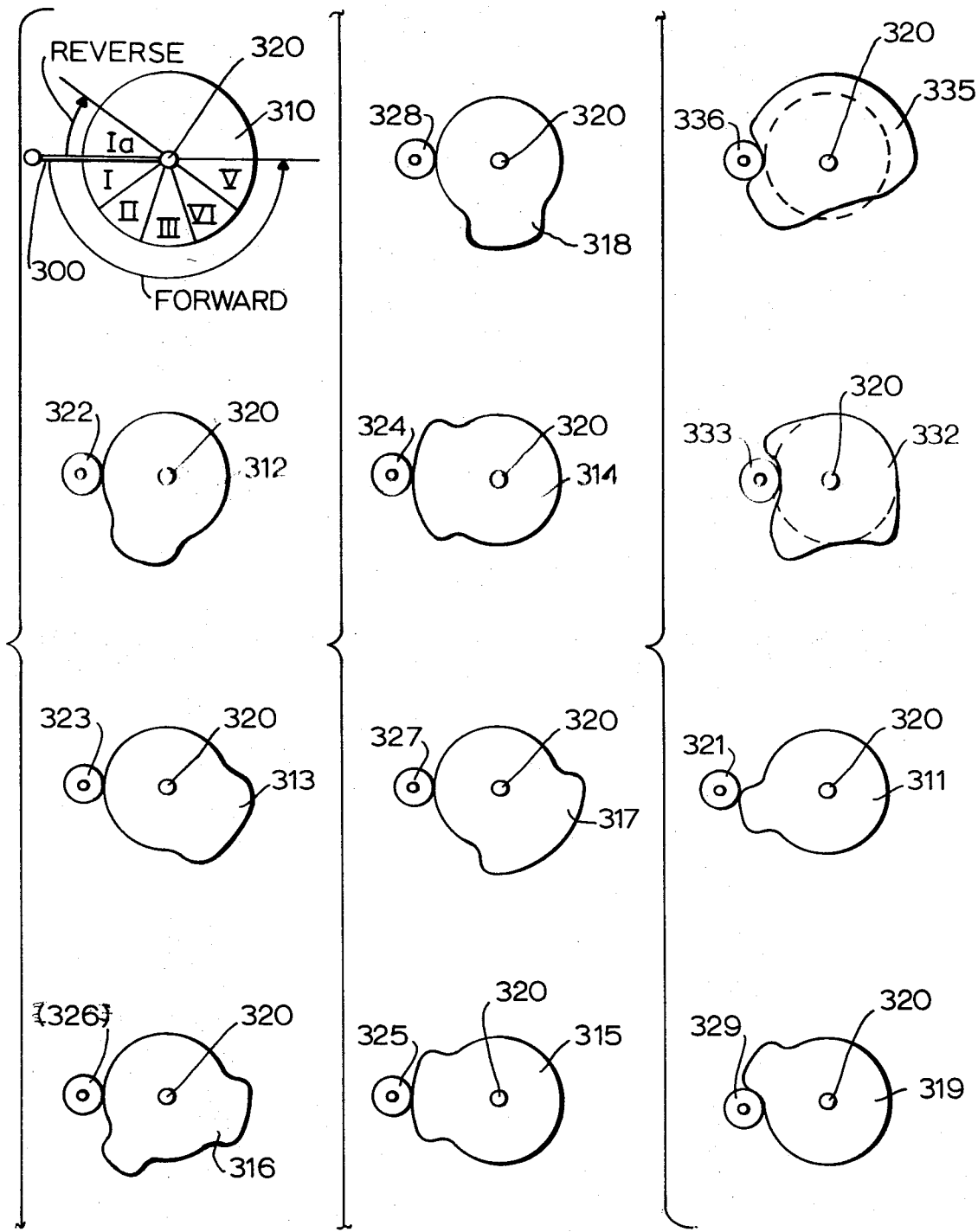

FIG. 13 is a schematic, exploded diagram of a cam system that may be used for a control system for the transmission shown in FIGS. 10A and 10B.

Figure 14:
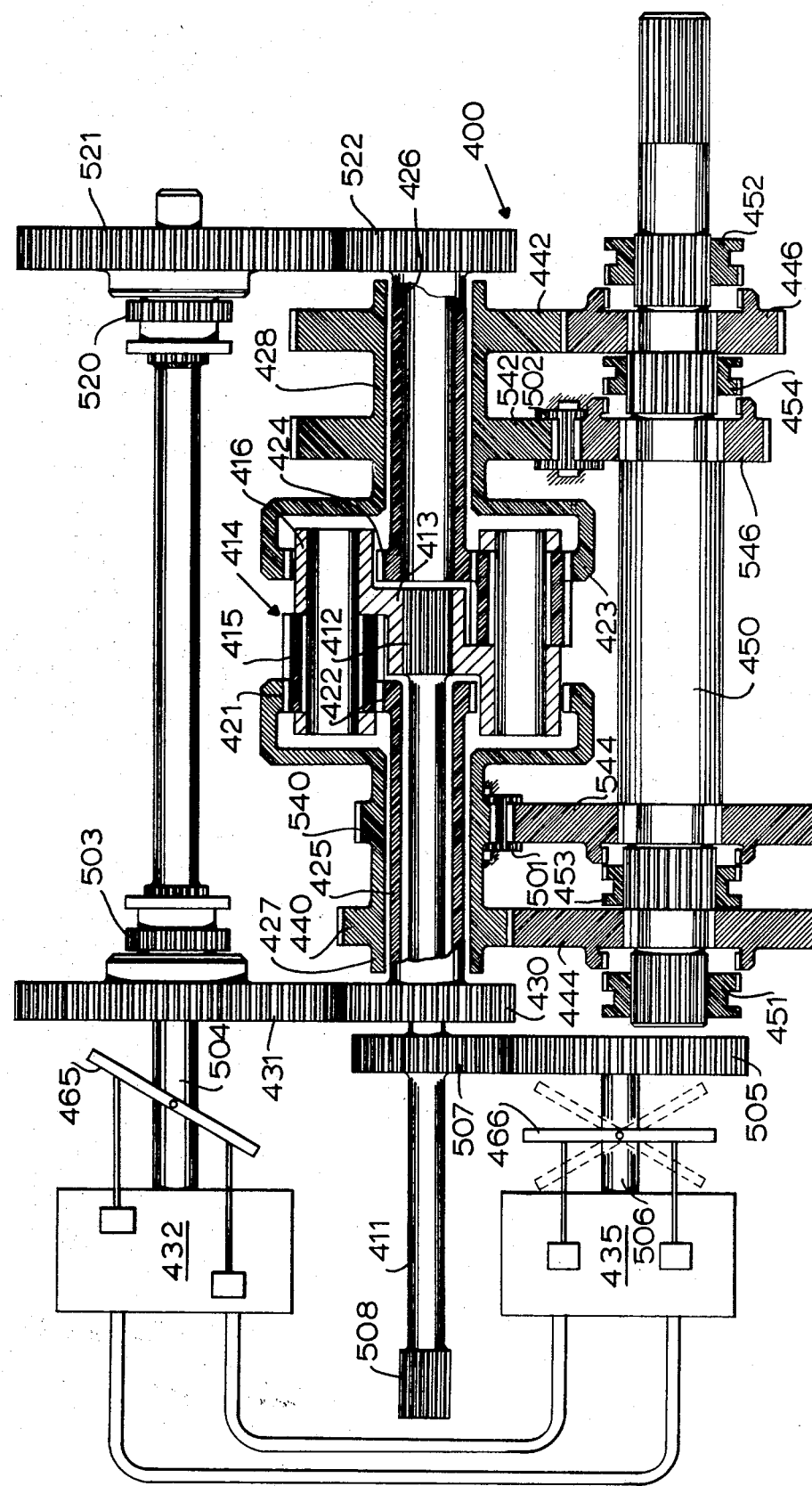

FIG. 14 is a view similar to FIG. 1 of yet another modified form of the invention which includes a split-torque transmission that uses the input as one of the reaction means (input coupled) and is fully reversible. One hydraulic unit has fixed displacement while extreme positions of the angle plate of the other hydraulic unit are shown in broken lines.

Figure 15:
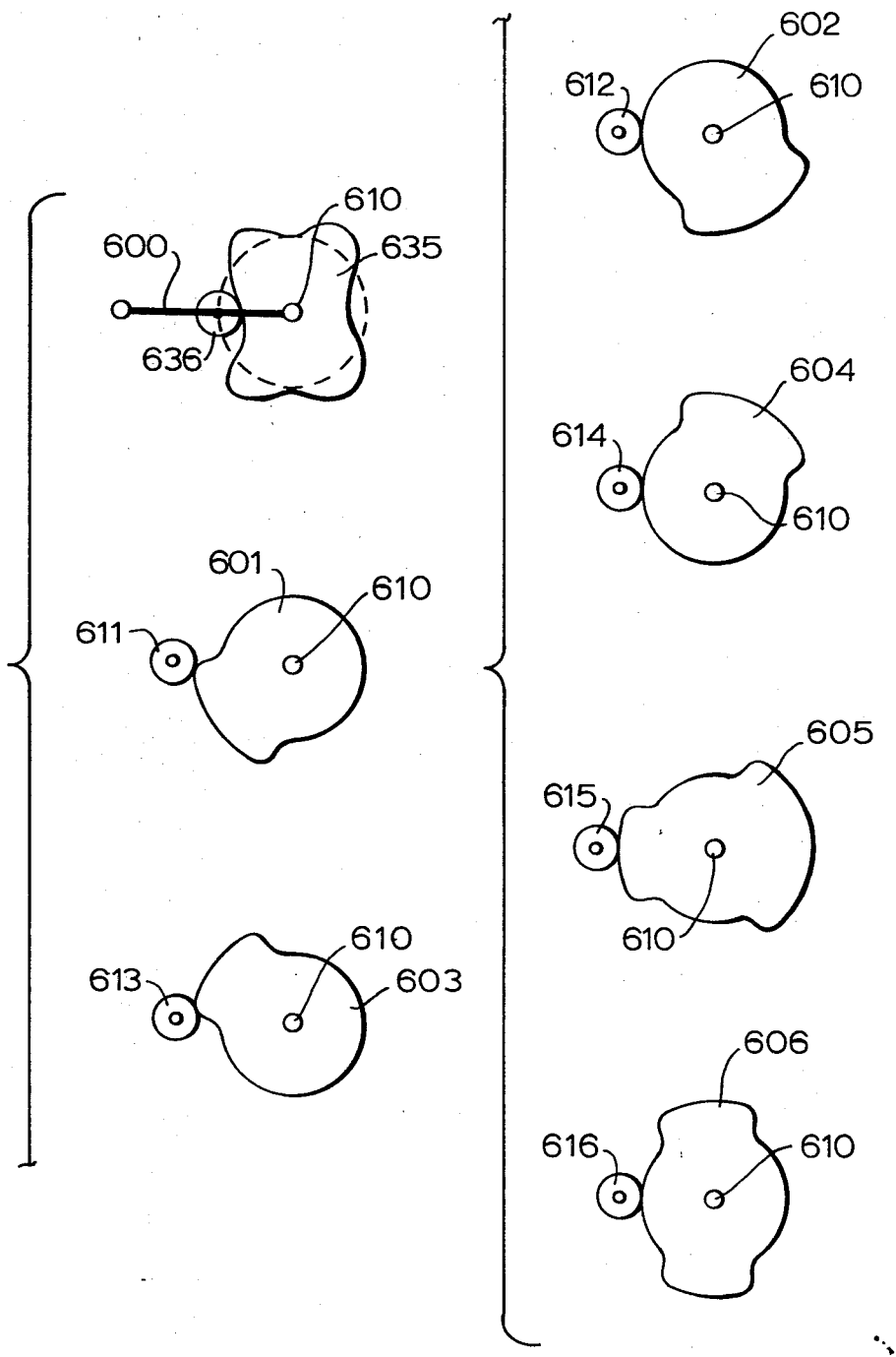

FIG. 15 is an exploded view of a cam system that may be used for control of the transmission of FIG. 14.

Figure 16:
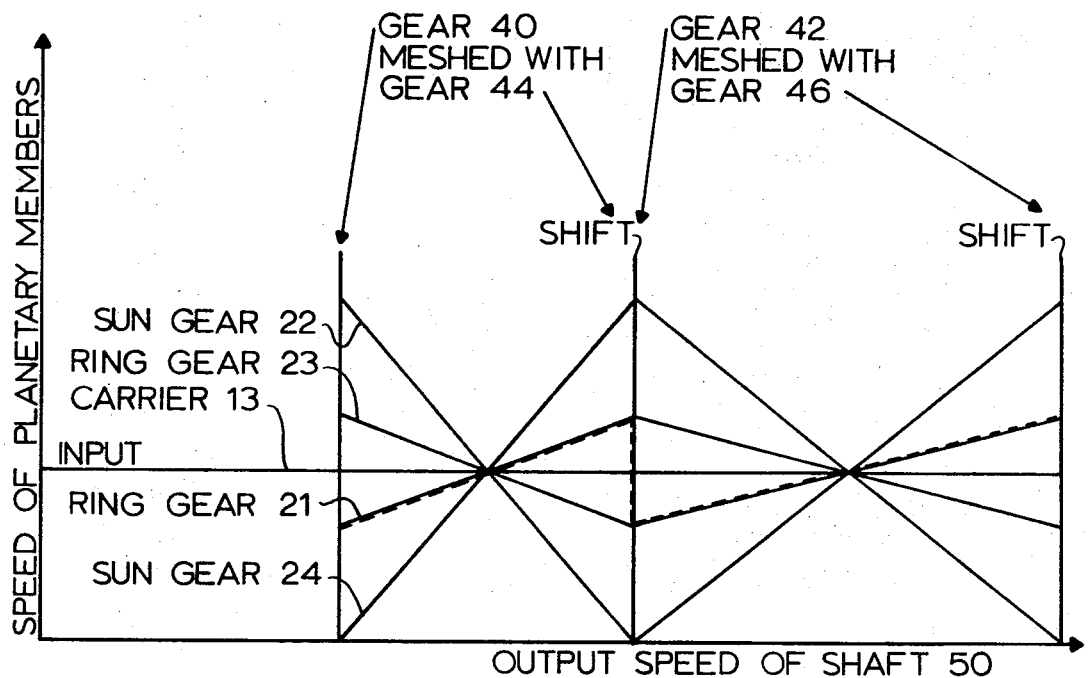

FIG. 16 is a graph of the characteristic speeds of the planetary carrier, sun gears, and ring gears in the planetary transmission of FIG. 1 during one full cycle of operation of the speed of the final output shaft.

Figure 17:
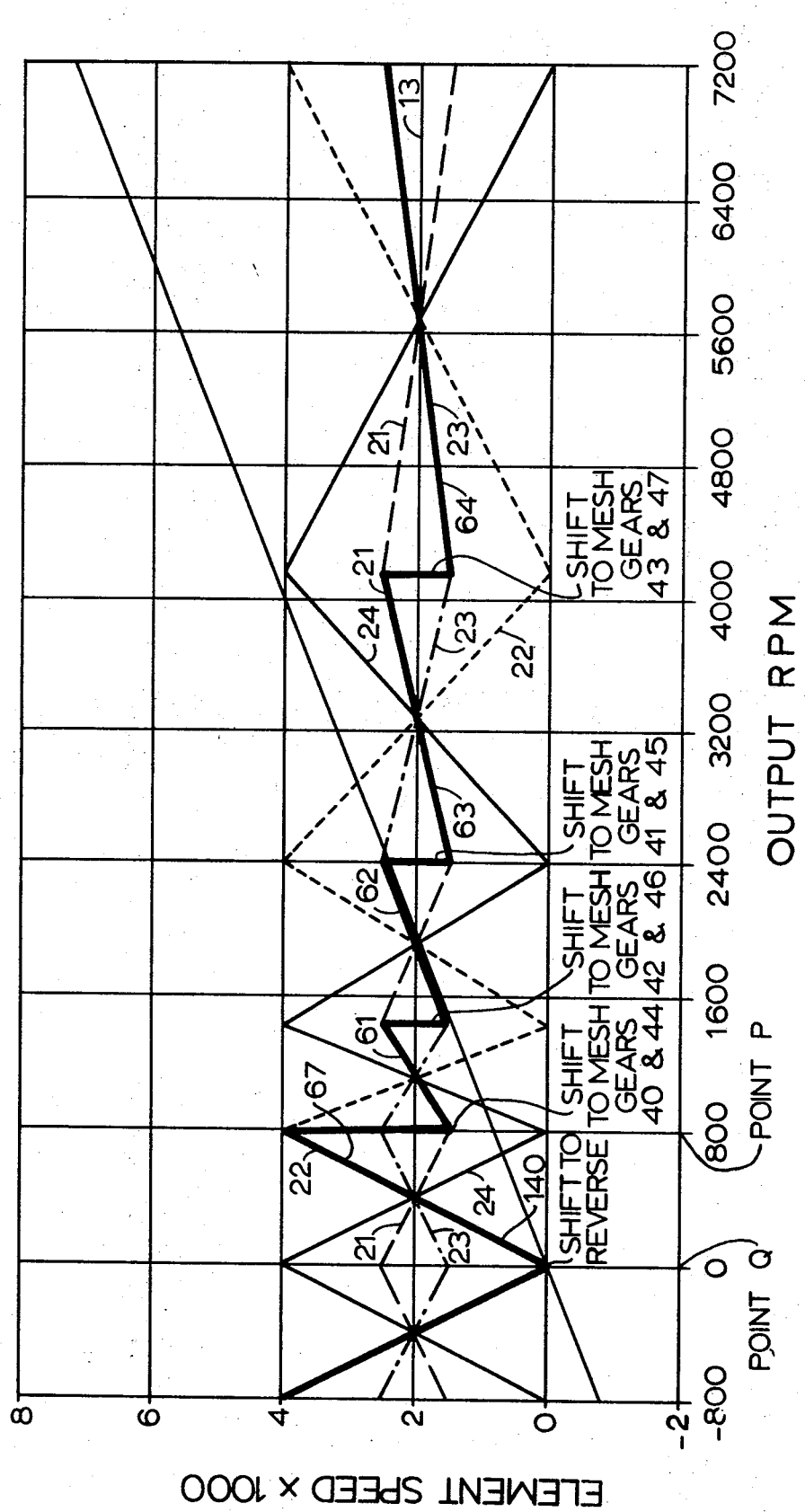

FIG. 17 is a similar more detailed graph of speed relationships in the transmissions of FIGS. 1 and 8, showing the shifting from gear to gear through all the available ratios. The vertical axis shows element speeds in thousands of r.p.m. and the horizontal axis shows the output speed of the output shaft.

Figure 18:
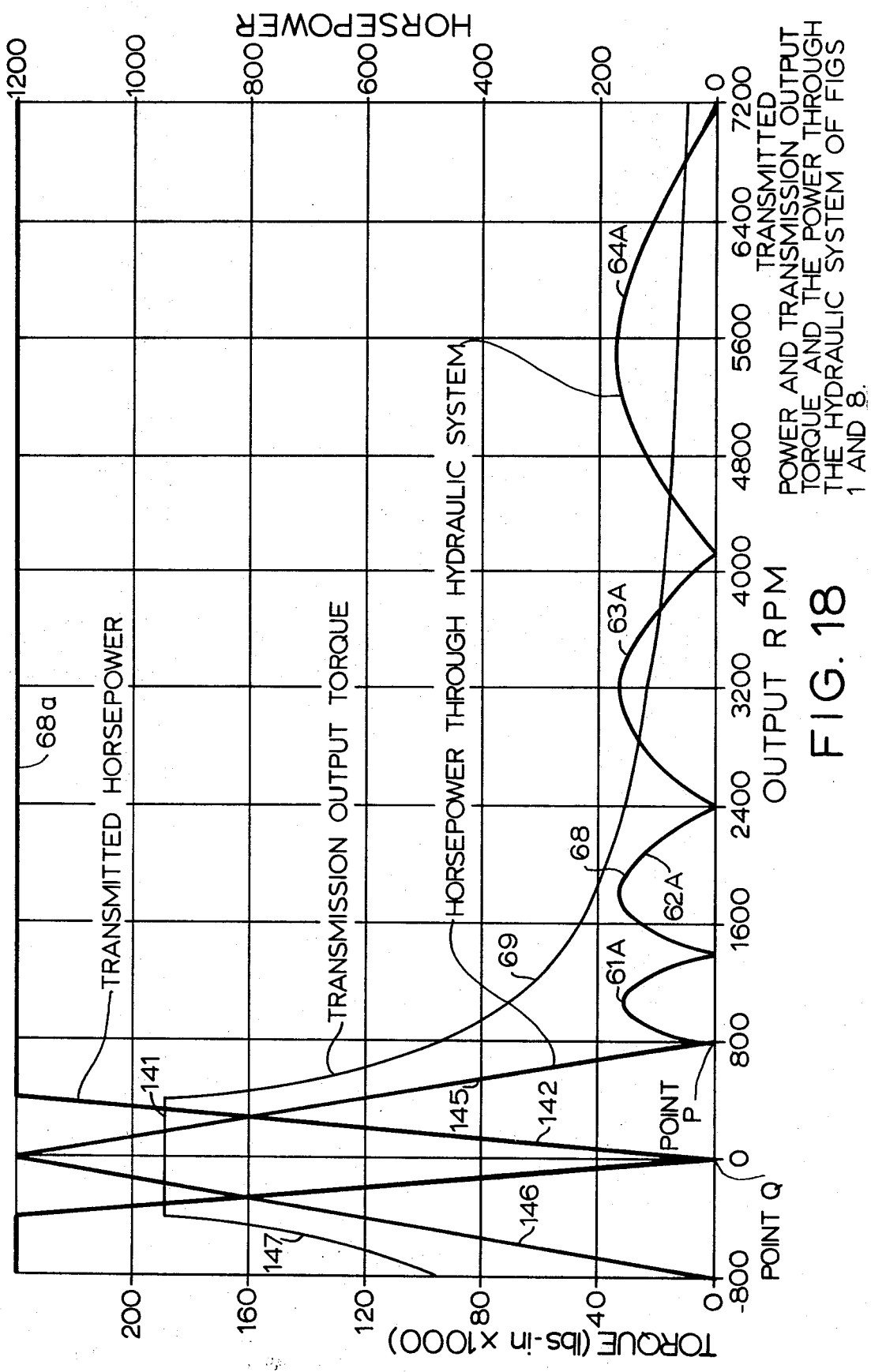

FIG. 18 is a graph showing the transmitted horsepower, transmission output torque, and the horsepower through the hydraulic system with the vertical axis representing both torque in thousands of inch-pounds and horsepower, and the horizontal axis the output r.p.m., for the system of FIG. 8 and, to the right of 800 r.p.m., also for the system of FIG. 1.

Figure 19:
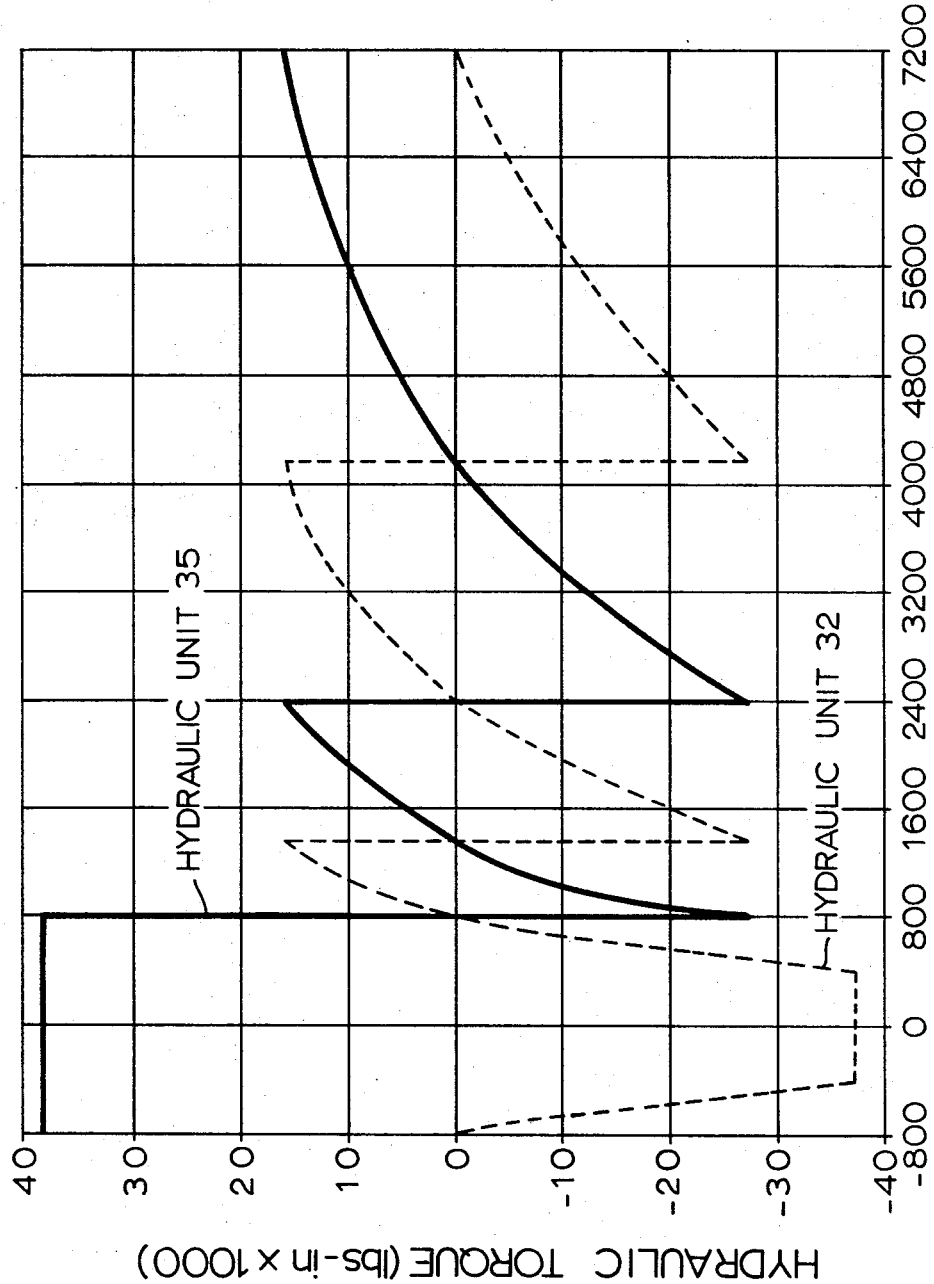

FIG. 19 is a graph of the hydraulic torques of the two hydraulic units of FIGS. 1 and 8 at the various output speeds of the output shaft.

Figure 20:
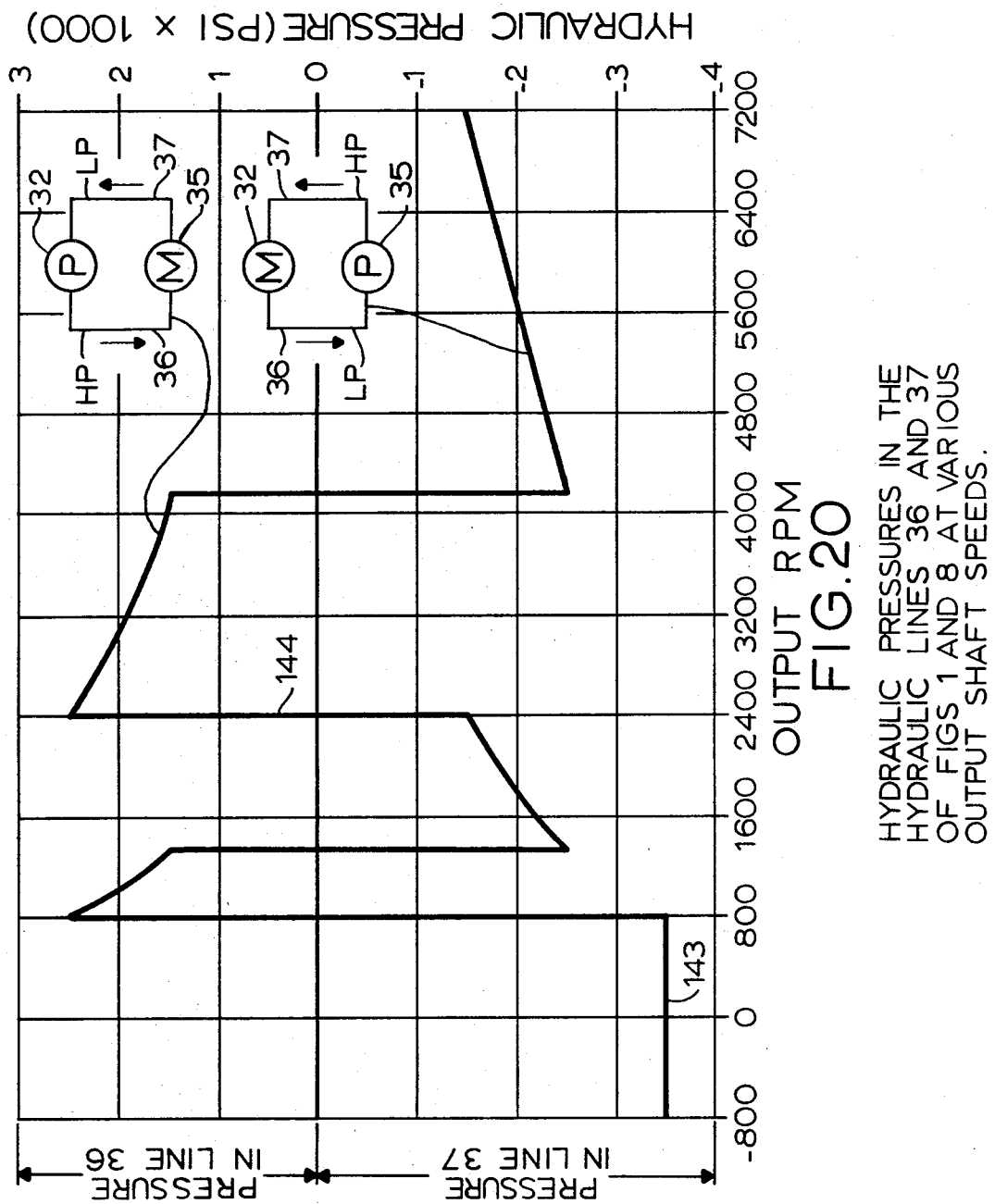

FIG. 20 is a graph of the hydraulic pressures of the two hydraulic units and their hydraulic lines of FIGS. 1 and 8 at the various speeds of the output shaft.

Figure 21:
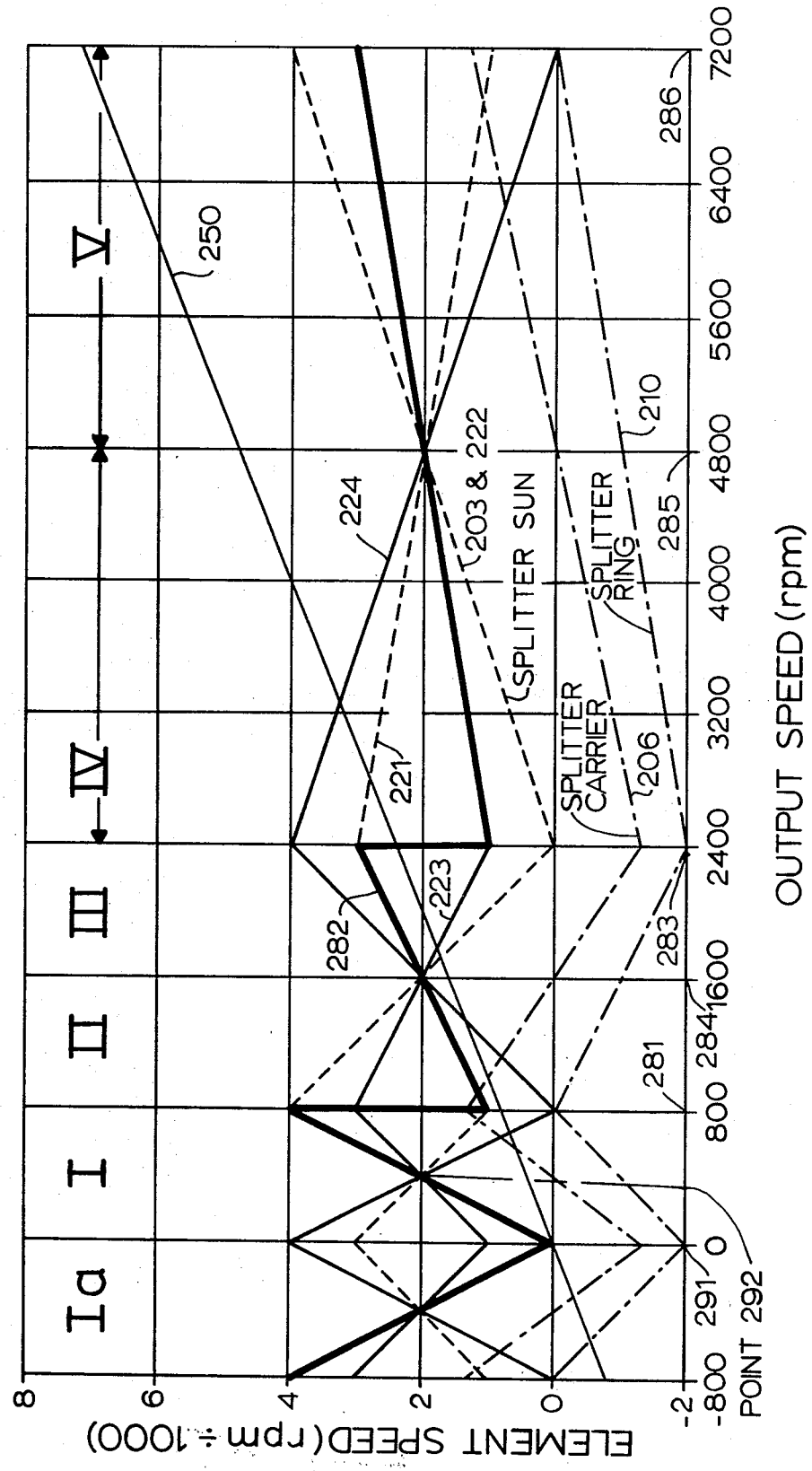

FIG. 21 is a graph of the type of FIG. 17, for the unit of FIGS. 10A and 10B, with torque splitting, plotting speeds of the various planetary and splitter elements against output shaft speed and showing operating ranges Ia, I, II, III, IV, and V corresponding to those shown in FIG. 13, in each of which different elements drive the output shaft.

Figure 22:
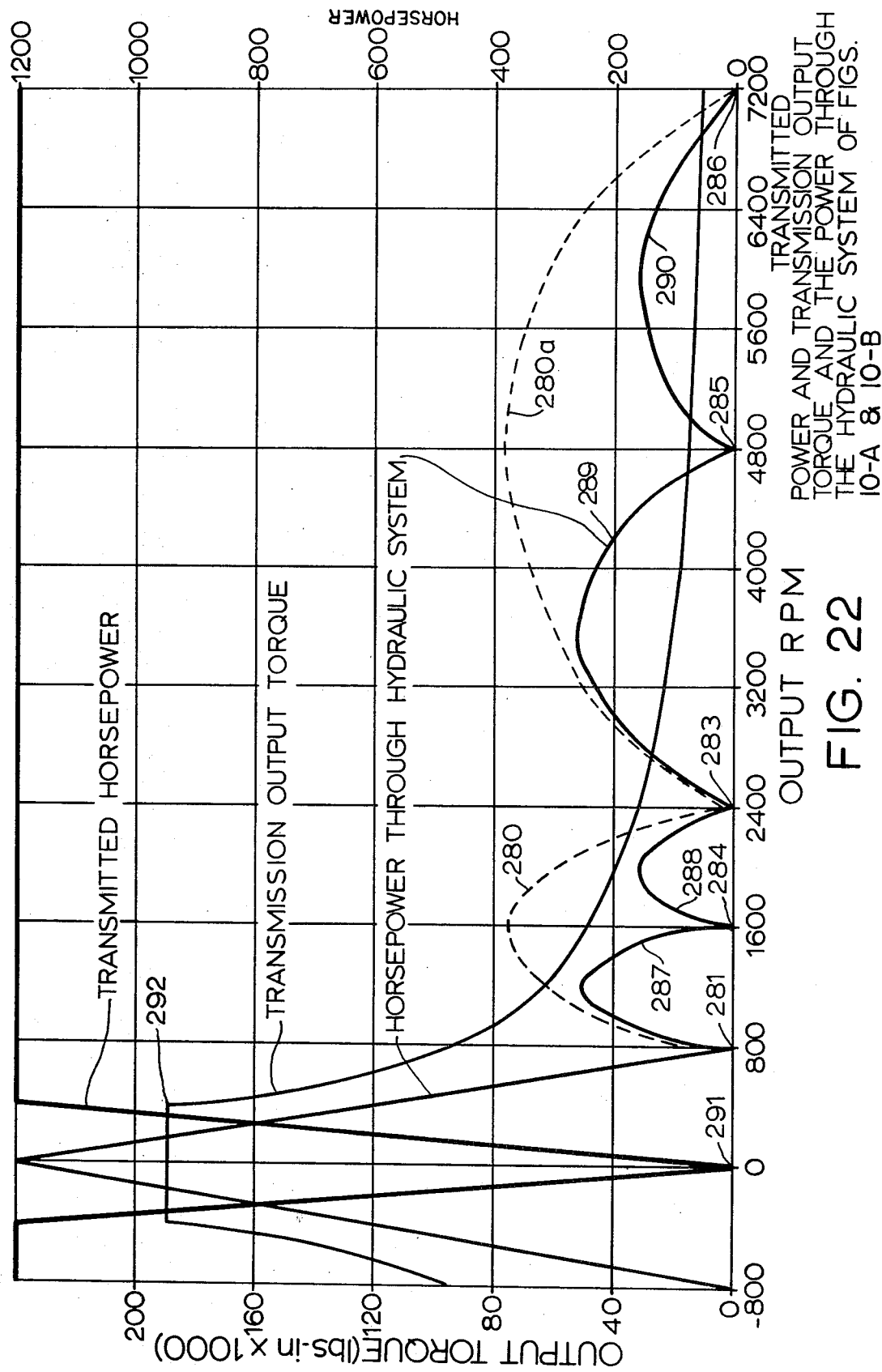

FIG. 22 is a graph of the type of FIG. 18 for the unit of FIGS. 10A and 10B, plotting output torque and horsepower and horsepower transmitted through the hydraulic system against output speed.

Figure 23:
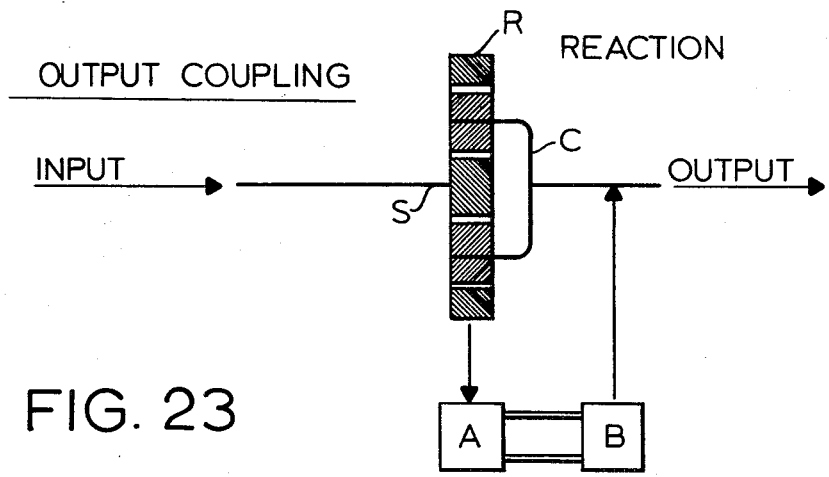

FIG. 23 is a diagrammatic view of an output-coupled planetary unit, as in FIGS. 1, 8, and 10.

Figure 24:
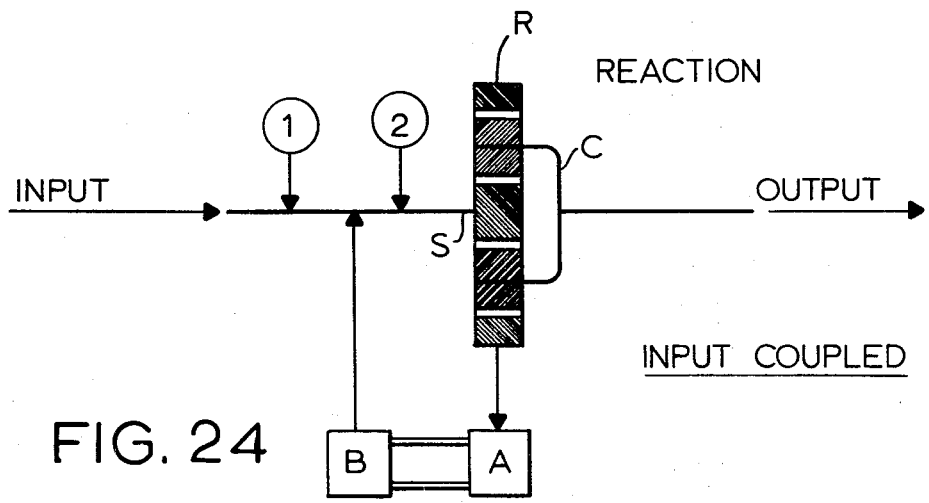

FIG. 24 is a similar view of an input-coupled planetary unit, as in FIG. 14.

Figure 25:
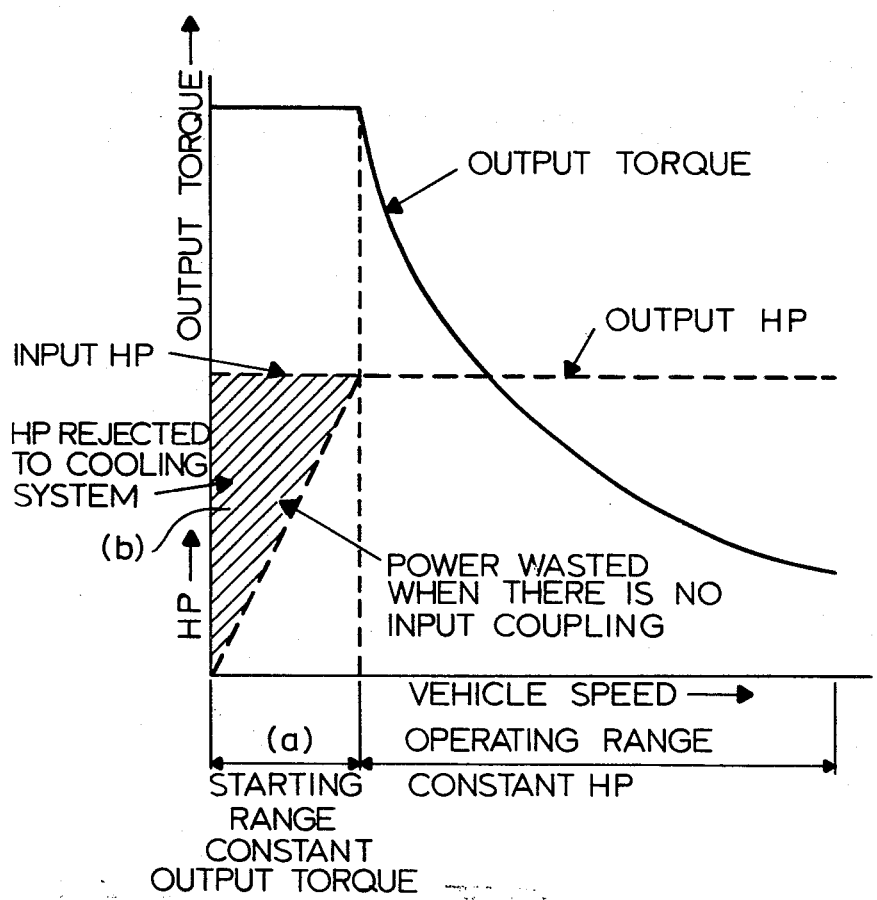

FIG. 25 is a graph of vehicle speed versus output torque for the unit of FIG. 23, showing in a shaded area the horsepower that is wasted during the starting range.

Figure 26:
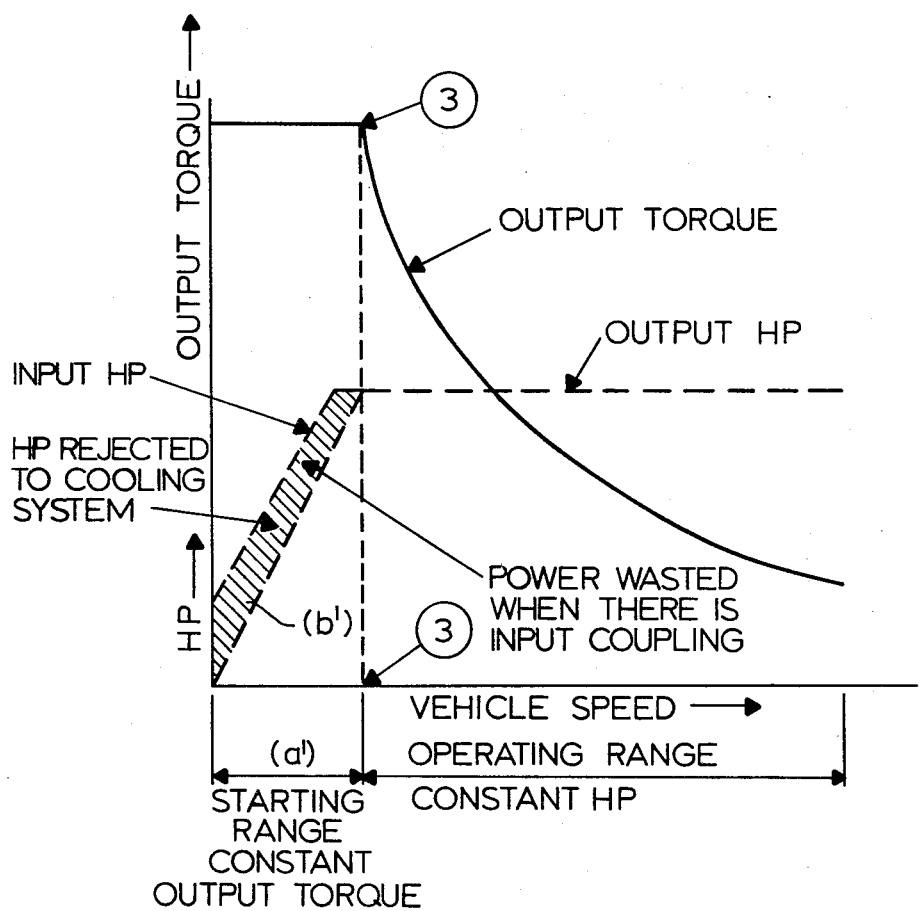

FIG. 26 is a similar graph for the unit of FIG. 24.

Figure 27:
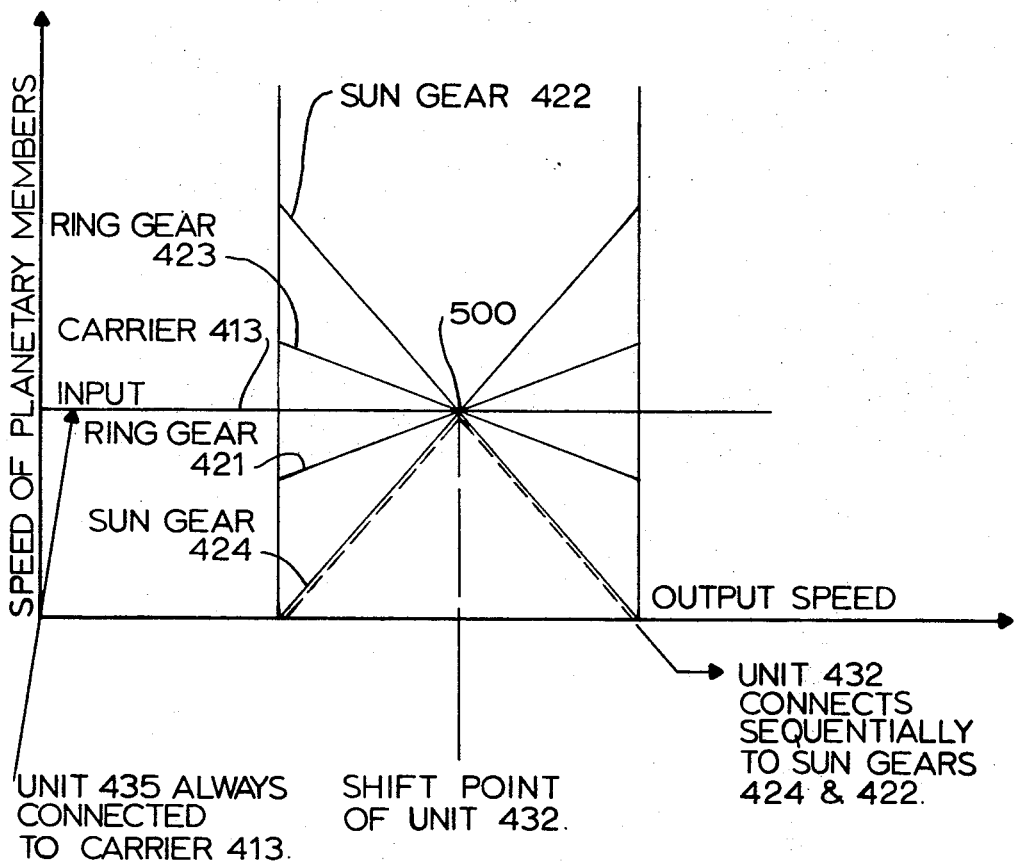

FIG. 27 is a graph of the type of FIG. 16 for the unit of FIG. 14, plotting the speed of the planetary members against the output shaft speed of one half cycle, showing a shift of one hydraulic unit from one reaction member to the other at a point when the speeds of the reaction members are equal and in between two gear shifts.

FIG. 28 is a graph of the type of FIG. 17 for the unit of FIG. 14, plotting the element speeds against the output shaft speeds.

FIG. 29 is a graph of the type of FIG. 18 for the unit of FIG. 14, plotting torque and power against the output speed.

FIG. 30 is a graph of the type of FIG. 19 for the unit of FIG. 14, plotting the hydraulic torque of the hydraulic units against the output shaft speed.

FIG. 31 is a graph of the type of FIG. 20 for the unit of FIG. 14, plotting the hydraulic pressures in the hydraulic lines against the output shaft speeds.

The drawings show a series of embodiments. The basic transmission 10 of FIGS. 1 to 7 has one member connected to the input, two members which constitute reactions and which are connected to the hydraulic units, and two members which constitute the output, one or the other (or both) of which is (or are) at any time during operation, connected to the final output shaft. The modification of FIGS. 8 and 9 shows means for providing partial range in reverse and for making it possible to start the transmission from a static condition. As shown in FIGS. 10A to 13, the basic transmission can be provided with a torque splitter and with starting gears. As shown in FIGS. 14 and 15, it is also possible to operate this transmission over a full range of forward and reverse speeds of equal magnitude. FIG. 14 also shows that one of the hydraulic units may be connected to the input and the other hydraulic unit may alternatingly be connected to one or the other of the reaction members of the planetary assembly.

Although in the drawings the input member of the planetary is shown as the carrier, the output members as the two rings, and the reaction members as the two suns, the principles of the transmission enable other planetary arrangements to be used so long as they incorporate a single input member, two reaction members, and two output members, and so long as all these elements are in the same relative speed conditions at the beginning of each cycle of operation.

The basic transmission 10 of FIG. 1 has an input shaft 11 driven by an engine, not shown. The shaft 11 is splined by a spline 12 to a planetary carrier 13, so that the planetary carrier 13 is in the input member of a planetary assembly 14. The planetary carrier 13 carries six planets in two sets, three planets 15 and three planets 16. Each of these planets 15, 16 has an axially outer set of teeth 17 or 18 (see FIGS. 1, 3, and 4) and an axially inner set of teeth 19 or 20 (see FIG. 5). (The teeth 17 and 19 may, for certain planetary ratios, be the same set elongated, as may be the teeth 18 and 20; see FIG. 14.) The axially inner teeth 19 of each planet 15 mesh with the corresponding axially inner teeth 20 of at least one planet 16 (see FIG. 5). The axially outer teeth 17 of each planet 15 mesh both with a ring gear 21 (see FIGS. 1 and 3) and a reaction gear 22, which may be one of two sun gears of the assembly 14. On the opposite side, the planet 16 has its teeth 18 mesh with a ring gear 23 and a reaction gear 24 (see FIGS. 1 and 4), which may also be a sun gear. The sun or reaction gear 22 is mounted at one end of a hollow shaft 25 (FIG. 1), which may encircle the input shaft 11, and the sun or reaction gear 24 is mounted at one end of a hollow shaft 26, which may be coaxial with the shafts 25 and 11. The ring gears 21 and 23 are respectively mounted on hollow shafts 27 and 28 which are concentric with the shafts 25 and 26 respectively and are the outputs for the planetary assembly 14.

As shown in FIG. 1, the sun or reaction gear 22 and its shaft 25 are preferably connected by means of a gear 30 on the shaft 25 and a gear 31 to an hydraulic unit 32 of variable displacement. The sun or reaction gear 24 and its shaft 26 are preferably similarly connected by means of gears 33 and 34 to a hydraulic unit 35, which is also a hydraulic unit of variable displacement. These two units 32 and 35 are interconnected by hydraulic lines 36 and 37 so that either the unit 32 may act as a pump while the unit 35 acts as a motor, or vice versa, the unit 35 may act as a pump while the unit 32 acts as a motor. Or, as a third condition, one of the units 32, 35 may be on stroke and standing still, and the other unit on zero stroke spinning without offering any resistance to its corresponding sun gear.

The output ring gears 21 and 23 and their respective hollow shafts 27 and 28 have associated with them several final-drive ratio gears and some clutches. Thus, the shaft 27 carries output gears 40 and 41, and the shaft 28 carries output gears 42 and 43. Each of these gears, 40, 41, 42, and 43, may mesh with a respective final drive output gear 44, 45, 46, or 47, each of which freely rotates upon an output shaft 50 and is connectable to the output shaft 50 for driving purposes by a clutch 51, 52, 53 or 54, each splined to the output shaft 50. Thus, the gear 44 has internal clutch teeth 55 meshing with the teeth of a sliding dog clutch 51; the clutch 52 can mesh with internal clutch teeth 56 made integral with the gear 45. Similarly, the gear 46 has clutch teeth 57 which may be in mesh with the teeth of a sliding clutch 53; while the last clutch 54 may mesh with clutch teeth 58 integral with the gear 47.

The described construction accomplishes the following purpose: In varying the speed-and-torque relationship in a variable speed transmission with a constant speed input, the amount of hydraulic horsepower transmitted varies as the ratio of the highest to the lowest speed of the output, at a given input speed, so that the wider this ratio is, the larger is the requirement for the size of the hydraulic units, and this situation varies in such a manner that for a reduction of 10 to 1 with a 1,000 horsepower transmission, the rating of each hydraulic unit 32 and 35 would have to be 9,000 horsepower, or nine times the input capacity. If the reduction were 4:1, the rating of the hydraulic unit would be three times the power. If the reduction were 6:1, it would be five times, and if it were 18:1, it would be 17 times, the relationship being denoted by R-1 as a multiplier of input horsepower, where R is the overall reduction ratio. At present, it is not feasible to have a 9,000 horsepower hydraulic unit or a 17,000 horsepower hydraulic unit. Such units do not exist and even if they did, they would be impractically expensive and large.

However, the present invention makes it possible to break the overall reduction range into several steps and to treat each step as a separate entity, so that the hydraulic unit 32 or 35 goes through one step in one output gear ratio such as, for instance, a mesh of the gear 40 to the gear 44. Once having completed that portion of the range, the gears 42 and 46 might be meshed in, and subsequently, the gears 40 and 44 disengaged, to change the output gear ratio. Subsequently, the gears 41 and 45 may be meshed and the gears 42 and 46 unmeshed, to go through a third subcycle. Finally, the gears 43 and 47 may be meshed and the gears 41 and 45 unmeshed, to take the transmission 10 up to its highest speed.

Since the just-described four subcycles (or two full cycles) of operation are repetitive, the transmission 10 may be termed a recycling transmission. The recycling function of this transmission is very important. By the word "recycling" is meant that the planetary assembly 14, and the two ring gears 21 and 23, and the two sun gears 22 and 24, may begin with a condition such that the gear 21 is running at its lowest speed while the gear 23 is running at its highest speed, and, as the speed of the gear 21 increases, the speed of the gear 23 decreases. Assuming that the gear 21 is originally connected to the output shaft 50 through the output gears 40 and 44, the speed of the output shaft 50 can increase up to the maximum speed of the gear 21. At that point, the gear 23 has reached its lowest speed, and therefore the gears 42 and 46 may be engaged, and the gears 40 and 44 may be decoupled by the clutches 53 and 51, respectively. The output shaft 50 may then be further speeded up, as the speed of the gear 23 goes from its minimum speed to its maximum speed. At the point where the gear 23 reaches its maximum speed, in turn, another shift occurs, enabling the gears 41 and 45 to drive, the gear 21 then again taking over the drive at its lowest speed and carrying it up to its highest speed. These relationships are shown diagrammatically in FIG. 16, where the input is indicated by "carrier 13" representing the constant speed of the carrier 13.

The speed relationships of the reaction or sun gears 22 and 24, and the ring gears 21 and 23 for the entire speed range of the transmission are shown in FIG. 17, where the lines 61, 62, 63, and 64 indicate where each gear 21 and 23 drives through its part of the cycles and indicate the portion of the speed range attainable by the basic transmission of FIG. 1.

The recycling occurs because, as shown in FIG. 17, first one ring gear 21 speeds up while the other ring gear 23 slows down; then the gear 23 that has slowed down picks up an output and carries it to a higher speed, whereas the gear 21 that was previously running fast slows down and gets in a position to pick up the load again to carry it up still higher. Thus, the gears 21 and 23 go through the same cycle over and over again. In order to increase the output speed of the shaft 50 as this recycling occurs, the ratios of the gear sets 40, 44; 41, 45; 42, 46; and 43, 47 are all different, so that for each successive cycle of the planetary unit, the output shaft 50 runs faster and faster.

This recycling function is brought about by the interaction between the hydraulic units 32 and 35 and the planetary assembly 14. At the point where the output ring 21 runs at a minimum speed and the output ring 23 runs at a maximum speed, the sun gear 24, as shown in FIG. 16, is stationary because it is held by the hydraulic unit 35, which at that time is in full stroke. The opposite sun gear 22 is spinning freely, because it is connected to the hydraulic unit 32, which at that time is on zero stroke. The indication of the stroke of the hydraulic unit 32 or 35 is shown by the position of an angle plate, so that in the case above described the angle plate 65 for the hydraulic unit 32 is in the position shown in FIG. 1 in solid lines, which is the zero-stroke position, whereas the angle plate 66 of the unit 35 is in its solid line position in FIG. 1, which is its full stroke position.

In order to speed up the ring gear 21, the hydraulic unit 32 begins to increase its stroke, and its angle plate 65 goes from its zero-stroke position toward its full-stroke position (shown in FIG. 1 in broken lines), and the hydraulic unit 35 begins to decrease its stroke so that its angle plate 66 goes from its full-stroke position to its zero-stroke position (shown in FIG. 1 in broken lines). When the latter conditions are accomplished, the transmission is in a condition in which the ring gear 21 is running at maximum speed and the ring gear 23 is running at minimum speed. In the lowest driving range of the FIG. 1 device, the output shaft 50 is driven by the gears 40 and 44 with the clutching 51 and 55 engaged. After the ring gear 21 reaches its maximum speed, the clutch 53 engages the gear teeth 57, which at that point are running at a speed equal to that of the shaft 50 due to the difference in the ratio, and after this clutch engagement is made, the power begins to be transferred from the gear 40 to the gear 42 and through the gear 46 and the clutch 53 to the output shaft 50. At still higher output speeds similar shifts are made, with the driven being transmitted next through gears 41 and 45, and subsequently through gears 43 and 47, which covers the entire range shown by the lines 61, 62, 63, and 64 in FIG. 17.

One full cycle, therefore, consists of the interval between the lowest speed of the gear 21 (corresponding to the highest speed of the gear 23) to the point where the highest speed of the gear 21 occurs (corresponding to the lowest speed of gear 23) and back again to the point where the gear 21 is returned to its lowest speed and the gear 23 again reaches its highest speed. The cycling may be done over and over again as many times as there are pairs of output gears 40 and 44, 41 and 45, 42 and 46, 43 and 47, and so on.

Since the speedup and slowdown of the output ring gears 21 and 23 are accomplished by shifting the strokes and displacements of the hydraulic units 32 and 35, the units 32 and 35 transmit a varied amount of horsepower throughout their cycle. For instance, at the point where the hydraulic unit 32 is on zero stroke, shown by the full-line zero-stroke position of its angle plate 65, and the hydraulic unit 35 is on maximum stroke, as shown in full lines by the full-stroke position of its angle plate 66, the unit 35 holds the full reaction torque and the unit 32 spins freely. However, there is zero horsepower transmitted, since the unit 35 does not rotate and holds the torque statically. Zero horsepower is also transmitted when the unit 32 is on maximum stroke and the unit 35 is on zero-stroke.

In between, however, while on unit 32 or 35 is going from zero towards maximum and the other unit 35 or 32 is going from maximum toward zero, the amount of hydraulic horsepower varies, as is shown in FIG. 18. Due to the appearance of the curve 68 indicating this horsepower variation, each such variation may be termed a "bump," so that there exists one bump per one pair of output mesh gears; bumps 61A, 62A, 63A and 64A are shown in FIG. 18 and correspond to the speeds 61, 62, 63 and 64, respectively, in FIG. 17. For a given HIT and a given size of hydraulic units 32 and 35, the greater the range of reduction required, the more pairs of output gears that become necessary. Within the range covered by each bump, however, the hydraulic horsepower transmitted can be quite low because the ratio between the highest output speed and the lowest output speed for any bump involved is low, as for instance in the case of FIGS. 17 and 18, where the ratio is only 1.73 within each bump. The four bumps 61A, 62A, 63A, and 64A cover a total range of 9:1 in torque multiplication along the curve 69 between the output speeds of 800 r.p.m. and 7200 r.p.m. A range of 18:1 can be accomplished, as will be described below when discussing the starting condition. For the present, note also how the curve 68 is related to a curve 68a, which represents the transmitted horsepower, showing that only a very small proportion of the transmitted horsepower passes through the hydraulic system in the recycling portion.

The torques carried by the hydraulic units 32 and 35 at various times and in various portions of the cycle are shown in FIG. 19, where the curves are identified by the hydraulic unit concerned. The sharp changes of torque are brought about by the shift from one ratio of output gearing to another ratio of output gearing. The recycling features are clearly shown here, too. FIG. 19 thus shows that the torque values do not rise as a percentage of output torque (curve 69 in FIG. 18) but that they repeat themselves at relatively low amounts. A significant result is the pressure curve shown in FIG. 20, again showing repetitions at relatively low values and showing the change of roles (as pump and motor) of the hydraulic units 32 and 35 from one subcycle to another. The symbol LP here stands for low pressure and the symbol HP stands for high pressure.

A feasible control system for the device of FIG. 1 is shown partly in FIG. 1 and partly in FIG. 1A, with some portions being shown in detail in FIGS. 6 and 7. The change from one ratio to another occurs by shifting hydraulic control devices 71, 72, 73, 74, (FIG. 1) which sequentially engage the clutches 51, 52, 53, and 54 with which they are respectively associated. During the interval of engagement of any one clutch 51, 52, 53, 54, and therefore of each pair of gears 40, 44; 41, 45; 42, 46; and 43, 47, the hydraulic units 32 and 35 are to be in certain positions, and the control system has to determine for the transmission, first, which ratio gears are being used and, second, what are the positions of the hydraulic units 32 and 35. Thus, the control system has to provide signals for the change of stroke of the hydraulic units 32 and 35 and for the sequential shifting and clutching and declutching of each set of gears 40, 44, etc.

The control system of FIGS. 1 and 1A produces a ratio change in the transmission as a function of the position of a handle 70 (FIG. 1A). (The ratio being changed is that of the input speed to the output speed.) The handle 70 may be positioned manually by an operator, or it may be positioned by a sensing control system, which senses changes of input and output speeds and hydraulic fluid pressure (as an indication of load), compensates for the requirement of optimum engine speed at every horsepower setting for best fuel consumption, and may also take into account other factors, such as rate of vehicle acceleration, wheel slip, etc. The sensing control is not illustrated or described here because a large number and variety of such controls may be designed to fit specific system.

All types of control systems for this transmission translate the information fed to them into required transmission ratio, which is represented by the position of the handle 70. An experienced operator performs the sensing control function in moving the handle 70 manually. This is a progressive system whereby the motion of the handle 70 from one position to another sweeps the full range of ratios of input to output speeds.

Since there are a number of functions, as stated above, that have to be described in the course of this procedure, each individual shift may be guided by a particular cam, and all of the cams may be mounted on one shaft 60 which is rotated for change of ratio; therefore, all the cams rotate in unison, while each cam performs one function. For instance, a cam 75 (FIG. 1A) actuates the hydraulic control device 71 (FIG. 1) for the clutch 51, a cam 76 actuates the hydraulic control device 72 for the clutch 52, a cam 77 actuates the hydraulic control device 73 for the clutch 53, and a cam 78 actuates the hydraulic control device 74 for the clutch 54. A cam 79, in the meantime, positions the hydraulic units 32 and 35 in various positions for each gear ration, and this procedure is repeated over and over again as the shifts occur from one gear set to another. The cams 75, 76, 77, 78, and 79 respectively act upon valves 81, 82, 83, 84 and 80 (FIG. 1A). Because many of the cams actuate an identical type of valve and because the hydraulic units 32 and 35 are also actuated by a servocontrol system, there is no need to draw these components over and over again in detail for the various applications shown. Therefore, only one of the valve systems (FIG. 6) and one servomotor system (FIG. 7) will be described in detail, while showing them in combination with cams of various angular positions in adaptations to the various transmissions of FIGS. 1, 8, 10A-—10B, and 14.

FIG. 6 indicates a valve and cam combination to actuate a clutching cylinder. The cam 75 was chosen, with valve 81 for the hydraulic control device 71 and clutch 51. The cam 75 is followed by a cam roller 85 that is supported on an arm 86, which is pivoted on a stationary pin 87. Pivoted on the same pin 87 is an arm 88 and the end of the arm 88 and the center of the roller 85 are connected by a tension spring 89. The arm 88 also is connected to a link 90 which moves a spool 91 of the valve 81 to a position determined by the position of the cam 75. The roller 85 is urged toward the cam 75 by a spring 92.

When the cam 75 is rotated in the direction of the arrow, its raised portion 93 will move around, and the spring 92 will urge the roller 85 into the position shown in FIG. 6 in broken lines, when it drops off the portion 93, as shown by broken circle 85a. At that point the spring 89 pulls the arm 88 to the position shown for it in broken lines, as soon as it passes center, so that there will be an instantaneous snap action which moves the valve spool 91 from the "clutch in" position to the "clutch out" position.

Fluid is always supplied to the valve 81 under pressure through line 94, and therefore in the "clutch in" position the hydraulic fluid is delivered to line 95, while simultaneously a line 96 drains the opposite end of the actuating cylinder of the device 71 through a drain line 97, which is always connected to a reservoir 99 (FIG. 1A) at atmospheric pressure. (For help in reading FIGS. 1A and 6, the hydraulic lines under high pressure are shown as broken lines, and the return lines are shown in solid lines.)

The valves 82, 83, and 84 operate in the same manner from lines 94 and 97 and with lines 95a, 95b and 95c corresponding to the line 95 and lines 96a, 96b and 96c, corresponding to line 96, all serving for engaging or disengaging one particular clutch 52, 53, or 54. Each of these valves 82, 83, 84 is actuated by an individual cam 76, 77, 78. Therefore, there may be a number or stack of cams 75, 76, 77, 78 on the one shaft 60 and a number or stack of valves 81, 82, 83, 84, each valve being associated with one cam, the numbers of items in the stacks being determined by the number of individual clutching functions that are to be performed. The sequencing of the operation of the valves 81, 82, 83, 84 is accomplished by selection of the proper shape and angular position of the cams 75, 76, 77, 78. Therefore, for every one of the applications of these transmission hereafter, only cams and rollers will be shown (see FIGS. 9, 13, and 15), for the valves may be identical to the valve 81 just described.

Control of the stroke of the hydraulic units 32 and 35 may be accomplished by the general type of assembly shown in FIG. 7, which is basically a servocontrol piston with a followup servofunction. The cam 79 actuates a roller 100, which is urged toward the cam 79 by a spring 101. The roller 100, in turn, positions a rod 102 that is pivoted to a link 103 which is pivoted around a pin 104. The link 103 is also pivoted to a link 105 which is connected to a spool 106 of a primary servovalve 80. As soon as this valve spool 106 moves in one direction or another, it admits pressure to one side or the other of a cylinder 107, so that a piston 108 is correspondingly moved. The piston 108 pulls a link 110 and therefore swings an arm 111 through an angle about a pivot 112 (see also FIG. 1). The pivot 112 is the pivot point of the angle plate 66 of the hydraulic unit 35. This motion of arm 111 is transmitted through a link 113 (FIG. 7) to an arm 114 which, at appropriate leverage, moves a link 115, which is secured to the link 103 at the pivot 104, to bring the link 105 back to its original position, thus restoring the servovalve spool 106 to a neutral position, as shown in FIG. 7, and stopping further motion of the piston 108. This simple form of followup servocontrol system thus causes the motion of the piston 108, and therefore the motion of the arm 111, to follow the motion of the roller 100 with increased force. More elaborate systems can, and in many instances should, be provided, but this simple form serves to illustrate the function.

The valve 80 is supplied with fluid under pressure through a hydraulic line 116 (parallel to the line 94) and is drained by a line 117 (parallel to the line 97 and likewise going to the reservoir 99).

As in the case of the clutching and declutching valves 81, 82, 83, and 84, each one of the hydraulic pumps or motors may be actuated by a different cam and an associated servocontrol system. In FIG. 1, however, which is a simplified form of construction showing only the basic ratio-changing section of the transmission, the hydraulic units 32 and 35 are tied together by a link 120 and therefore move together, so that when one unit is at full stroke the other unit is at zero stroke, and vice versa. For that reason, only one cam 79 and its associated elements are shown in FIG. 1A.

As shown in FIG. 1A, oil is picked up from the sump tank 99 by a line 121 and is pumped by a pump 122, which may be driven separately from the engine, into a line 123. This line 123 is constantly maintained at the required control pressure, for instance, 500 p.s.i., by a relief valve 124 which returns excess fluid to the sump 99. The line 123 branches into the line 94, which goes to all the clutch-actuating valves 81, 82, 83, and 84, and into the line 116 which feeds oil to the servocontrol cylinder 80. The directions of the arrows indicate the return lines 97 and 117, and the oil is again returned to the sump tank 99.

The handle 70 is shown in FIG. 1A in the position for the lowest ratio of the transmission, and therefore the clutch 51 is engaged, because pressure is applied to it through its control device 71; this, in turn, means that the valve 81 associated with the cam 75 is in such a position as to actuate the clutch 51, and therefore the roller 85 engages the high rise 93 of the cam 75. The other valves 82, 83, 84 have their followers simultaneously on low surfaces of the cams 76, 77, 78, and therefore all the other clutches 52, 53, and 54 are deenergized and are not engaged. At this particular position, the hydraulic unit 35 is on its maximum stroke and the unit 32 is on zero stroke and therefore the servopiston 108 is in the position shown in solid lines in FIG. 1A. As the handle 70 is moved in the direction of arrow 125 in FIG. 1A, all the cams 76, 77, 78 will successively pass through the sequence of events described in the diagram showing the speeds and torques of the unit.

The starting and reversing conditions of any split torque planetary gearing, whether recycling or more conventional, always present considerable difficulties. How the present invention copes with these difficulties by means of the structure of FIGS. 8 and 9 will now be discussed. In these views parts which are identical with those already shown are indicated by the same reference numerals, and only a portion of the control system is shown—principally the cams shown in FIG. 9.

To appreciate the conditions which must exist in starting up from zero, refer to the transmission 150 in FIG. 8 and bear in mind that the recycling gearing, i.e, the ring gear 21 and the ring gear 23, never reach a zero speed under operating conditions. Therefore, some other member must be found in the planetary assembly 14 which does reach a zero speed, as otherwise a start could not be made without the use of a friction clutch. The only members which do reach zero speed in this construction are the sun gears 22 and 24, as shown in FIGS. 16 and 17. When the transmission has reached its lowest output speed in the recycling modes shown in FIG. 18, and, assuming that the speed is being constantly reduced from the maximum towards the lowest, which it reaches at point P on FIGS. 17 and 18, the transmission is shifted so that the output is connected to the gear 22 as shown by a line 67. At this point of shift the gear 22 is spinning freely.

If the gears 40 and 44 of FIG. 8 are in engagement and by means of the clutch 51 and teeth 55 are clutched to the output shaft 50, the transmission 150 of FIG. 8 is enabled to go still slower and to reach zero speed condition, by having a clutch 151 splined to an extension 152 of the shaft 50 and engaged with teeth 153 of a gear 154 which meshes with the gear 30. After the engagement of the clutch 151 with the teeth 153 is made, the clutch 51 is disengaged, and thereafter the drive proceeds along the line 67 in FIG. 17 from the point P to a point Q, where the output speed reaches zero, due to the ratio of the gear 30 to the gear 154.

If it is desired to go in reverse, a clutch 155 is engaged with teeth 156 on a gear 157. The gear 157 is driven by a gear 158 that rotates with the gear 30 and the gear 22; however, the driving is done through the intervention of an idler gear 159, which causes the gear 157 to rotate in the reverse direction from that in which the gear 158 was originally rotating, so that the direction of rotation of the shaft 50 is reversed. The transmission 150 now goes into reverse and reaches an increasing speed in reverse up to the limit of the speed at which the gear 22 can operate. This particular embodiment can reach a given maximum speed forward much greater than its maximum reverse speed. This type of operation is customary and conventional for vehicles such as trucks and passenger cars, etc. Where it is necessary to have an equal speed forward and reverse, as for bulldozers, locomotives, etc., more ratio gears can be added, or the different construction of FIG. 14 may be resorted to, as described later.

The functions of the transmission of FIG. 8 include the following modes of operation, shown diagrammatically in FIGS. 17 and 18:

1. A first range 140 (FIG. 17) starts at static output torque 141 (FIG. 18) and develops constant torque at increasing horsepower. During this range 140, the horsepower output 68a starts at zero and increases to full power over a range 142 (FIG. 18) The pressure in the hydraulic units 32 and 35 can be in excess of continuous operation rating (see FIG. 20 at curve portion 143).

2. A second range 67 (FIG. 17) includes operation at constant transmitted horsepower (flat part of the curve 68a in FIG. 18). During this interval, the output torque decreases (curve 69 in FIG. 18) as the output speed increases (curve 67 in FIG. 17).

3. A third range, the recycling portion with "bumps" 61A, 62A, 63A, and 64A in FIG. 18, includes operation at constant transmitted horsepower (curve 68a in FIG. 18), and a constant average hydraulic pressure along the curve 144 in FIG. 20, with output torque and speed variation (FIG. 18).

The first two ranges 140 and 67 in FIG. 17 are considered as starting conditions, and the third range is considered as the normal operating or recycling condition.

Other operating features of the transmission of FIG. 8 are also shown in FIGS. 18 to 20.

In FIG. 18, the transmitted power and transmission output torque are compared with the power through the hydraulic units 32 and 35. As shown, the horsepower through the hydraulic system is low through the bumps 61A, 62A, 63A and 64A, rises along the curve 145, reaches a peak at zero output speed, point Q, and drops during reverse operation along a curve 146. The transmission output torque is at a high plateau 141 at zero speed and low output speeds, dropping thereafter along the curve 69, both in forward speeds and a curve 147 in reverse speeds. The transmitted horsepower, curve 68a, rises from zero at zero output speed along portion 142 to a maximum and stays at the maximum from about 400 r.p.m. and up in both forward and reverse.

FIG. 19 shows the torques of the hydraulic units 32 and 35 at the various speeds of the output shaft 50. Being a vector, there are both positive and negative torques, depending on which unit 32 or 35 is the pump and which is the motor (see FIG. 20).

FIG. 20 shows the hydraulic pressures in the lines 36 and 37 at various output shaft speeds. Flow diagrams show what happens in selected portions of the ranges, showing which of the units 32 and 35 is a pump and which is a motor, in each portion of one complete cycle, i.e. two bumps or subcycles.

The cams and cam followers only of a suitable control system for the unit 150 of FIG. 8 are shown in FIG. 9. The remainder of the control system may be basically like that of FIGS. 1 and 1A and needs no illustration, the valve operation and so on being the same here.

A handle 170 rotates a shaft 160 on which all the cams are mounted, including not only the cams 75, 76, 77 and 78, which function as in FIG. 1A, but also starting cam 161 and its follower 171 for the clutch 151, reverse cam 162 and its follower 172 for the clutch 155, control cam 163 and its follower 173 for the hydraulic unit 32 and control cam 164 and its follower 174 for the hydraulic unit 35. In the starting range, both of the units 32 and 35 must be capable of running at full stroke. The unit 35 produces reaction force through the sun gear 24, the planetary gears 16 and 15, to the sun gear 22. The unit 32 is then driven hydraulically by the unit 35 and adds torque by means of the gears 31 and 30 to the gear 154. Reverse is similar but the output shaft 50 rotates in the reverse direction. Since the angle plates 65 and 66 must be able here to operate independently, the link system of FIG. 1 cannot be used. However, the system of FIG. 7 does apply to each angle plate 65 and 66, and no additional explanation seems necessary.

FIGS. 10A to 12 show a device 200 comprising the basic transmission in combination with a secondary torque splitter. This modification is used to reduce the rated horsepower of the hydraulic units at a given bump ratio, or to increase the bump ratio with a given size of hydraulic units. There are several potential advantages:

a. The rating of both hydraulic units, at a bump ratio of R, becomes smaller than (HIT) times (R−1).

b. The number of final reduction gears to the drive shaft may be reduced for the same size hydraulic units, e.g., from four pairs to two pairs, with consequent improvement in speed and load relationships of the gears.

c. The basic planetary assembly may be designed for a bump ratio of approximately 3:1 or more. This results in a simpler planetary construction, without step pinions, or extra idlers.

In this form of the invention the input is an input shaft 211 which, through a spline 212, drives a carrier 213 of a planetary assembly 214, which has two sets of planet pinions 215 and 216. The pinions 215 and 216 may be of equal diameter throughout their entire length. This is possible because the dump ratio is wider per given hydraulic horsepower than in the devices of FIGS. 1 and 8, so that the planetary ratio is lower, and the lower planetary ratio enables the use of smaller pinions within a given ring pitch diameter. Six pinions 215 and 216 (three of each of them) may be accommodated within the planetary assembly 214, whereas in FIGS. 1 and 8, the pinions 15, 16 had to be larger due to a lower bump ratio and therefore a higher planetary ratio, and they would not fit together at the point where they mesh with each other, so that stepped pinions had to be used, a more expensive construction.

Each of the pinions 215 meshes with two pinions 216, and vice versa, and additionally each pinion 215 meshes with an output ring gear 221 and each pinion 216 meshes with an output ring gear 223. Each pinion 215 also meshes with a reaction or sun gear 222 and each pinion 216 also meshes with a reaction or sun gear 224. The output gear 221 has one gear set 240, 244 of a given ratio connecting it to the final output shaft 250, and the output gear 223 also has a gear set 242, 246 of a different ratio. The shaft 250 has clutches 251 and 252 which are splined to the shaft 250 for transmitting the drive, and these clutches can be engaged, in the case of the clutch 251 with the gear 244, and, in the case of the clutch 252, with the gear 246.

The operation so far is generally as in FIG. 1; first a pair of gears 240 and 244 are coupled to the shaft 250 by the clutch 251; then the next ratio is provided by the gears 242 and 246 which are coupled to the shaft 250 by the clutch 252, and immediately afterwards the clutch 251 uncouples the gear 244 from the output shaft 250, taking the transmission up into the next range.

In the transmission 200 of FIGS. 10A and 10B, instead of transmitting the power from the reaction gears 222 and 224 purely hydraulically, the power is transmitted through a secondary hydromechanical circuit, in which part of the power is transmitted mechanically and the other part hydraulically. The result is to reduce the size of the hydraulic units 232 and 235 with respect to the size that is required for a given number of bumps in the devices of FIGS. 1 and 8, or alternatively to reduce the number of bumps for the same size of hydraulic units, or, if desired, a combination of these two conditions.

In this transmission 200, the gear 222 is connected by a hollow shaft 225 (FIG. 10B) to a gear 230, which in turn drives through an idler 201 (to keep the proper directions of rotation) a gear 202 which constitutes the input into a sun gear 203 of a splitter planetary assembly 204. The sun gear 203 is meshed with planet gears 205 which are carried on a carrier 206. The carrier 206 has teeth upon its external circumference forming a gear 207 which meshes with a gear 208. This gear 208 may be connected to the hydraulic unit 232 by engaging a clutch 209 with it. Also meshing with the planet gears 205 is a ring gear 210 which is connected by means of a shaft 253 and a gear 254 to a gear 255 on the shaft 226 carrying the second reaction gear 224.

The hydraulic unit 235 is alternately connected either to the gear 254 by means of a gear 256 and clutch 257 or to the gear 202 by means of an idler 260 and gear 261 and clutch 262.

Deferring for the present the description of the starting and reverse mechanisms, the recycling operation of the transmission 200 will first be described. Subsequently, the operations during starting conditions and reverse conditions will be described.

Without the torque-splitting mechanism, the operation when the gears 240 and 244 are coupled to the output shaft 250 would produce the bump 280 shown in broken lines in FIG. 22. Similarly, the operation when the gears 242 and 246 are coupled to the output shaft 250 would produce the bump 280a in FIG. 22. What the torque-splitter does is to divide each of the bumps 280 and 280a into two smaller bumps, neither of which ever reaches the maximum horsepower through the hydraulic system that is reached in the bumps 280 and 280a.

The mechanism enabling this favorable condition is a device (such as but not limited to the planetary assembly 204) which has elements such as the ring 210 and the sun 203, one of which is stationary at one end of a main bump 280 or 280a, and the other of which is stationary at the other end; and also has an element or elements such as the carrier 206, which by proper choice of the bump, may be made to stand still in the middle of a main bump 280 or 280a, and which at that point provides all the necessary reaction force. Furthermore, the mechanism must be capable of continuous variation between these described extremes. FIG. 21 shows the speeds of the elements 203, 206 and 210 plotted against the speed of the output shaft 250; note that the ring gear 210 is stationary at a point 281, that the sun gear 203 is stationary at a point 283, and that the carrier 206 is stationary at the arithmetic mean of the output speeds at the points 281 and 283.

The operation of the recycling portion of the operating range of the transmission 200 is as follows. At the point 281, the output gears 240 and 244 are engaged to the output shaft 250 by means of the clutch 251; the ring gear 221 is running at its minimum operating speed at this point. The sun gear 222 and its shaft 225 and hence the gears 230, 201, 202 and 203 are spinning freely at this point 281; therefore reaction in the planetary system 214 must be developed by some other element. This other element is the sun gear 224, which is stationary at this point 281; hence the gears 267, 255, 254 and 210 must also be stationary at the point 281. The hydraulic unit 235, at full stroke, provides the reaction necessary to hold these gears through the engagement of a clutch 270 with a gear 268 which is meshed with the gear 267, as shown on FIG. 11. The hydraulic unit 232 is connected to the carrier 206 at this point 281 by means of the engagement of the clutch 209 with the gear 208; because the hydraulic unit 232 is on zero stroke, however, it presents no resistance to the rotation of the carrier 206, which spins at the speed shown at point 281 in FIG. 21.

As the speed of the output shaft 250 is increased along the line 282 of FIG. 21, the stroke of the hydraulic unit 232 is increased, slowing the carrier 206, and providing reaction for the planetary system 214, and hence for the sun 203 and its associated gears 202, 201, 230 and 222, thereby providing an additional reaction path for the ring 221, and therefore for the output. Simultaneously, the hydraulic unit 232 begins to act as a pump, driving (hydraulically) the hydraulic unit 235 through the lines 236 and 237. As this increase of stroke in the unit 232 occurs, a decrease in the stroke of the unit 235 occurs, and the reaction transmitted from this source is consequently decreased. The sum of the torques seen at the output is less, and hence the output torque is less. At the same time, the sun gear 222 has been slowed, and the sun gear 224 forced to speed up, consequently allowing the output shaft 250 to speed up as shown in line 282 on FIG. 21. This process continues until the hydraulic unit 232 is operating at full stroke and zero speed, thereby holding the carrier 206 stationary and enabling the mechanical torque developed at the sun gear 224, through the gear train 255, 254, 210 to balance the mechanical torque developed at the sun gear 222 through the gear train 230, 201, 202, and 203. At this point 284 the hydraulic unit 235 is spinning at zero stroke, offering no reaction, and may be shifted to the sun gear 203, by disengaging the clutch 270 from the gear 268 and approximately simultaneously engaging the clutch 262 to the gear 261, which is connected to the sun gear 203 by means of the gear train 260 and 202.

At this point 284, the hydraulic unit 235 becomes a pump, and the hydraulic unit 232 becomes a motor. As the unit 235 increases its stroke, it drives the unit 232 in a sense opposite to that in which the unit 232 formerly rotated, and, therefore, the sun gear 203 is gradually brought to zero speed, and the ring 210 is driven faster. As this occurs, reaction torque transmitted from the sun 224 through the gear train 255, 254, 210 decreases as a consequence of the decrease in reaction torque supplied by the hydraulic unit 232, until it is zero at this maximum operating speed of the ring 221. At this point 283, all reaction torque is again supplied by the hydraulic unit 235, but this time through the gear train 261, 260, 202, 201 and 230 to the sun gear 222.

Through this portion of the operating cycle between points 281 and 283, note in FIG. 21 that the speeds of the elements of the planetary system 214 in FIGS. 10A and 10B follow the same pattern as those of earlier presented embodiments of the invention, i.e., the speed of the ring 223 decreases from operating maximum to operating minimum as the speed of the ring 221 increases from operating minimum to operating maximum. At the operating point 283 in FIG. 21, then, it is possible to shift the output from the gears 240 and 244 to the gears 242 and 246 in FIG. 10A, by engaging the clutch 252 and immediately thereafter disengaging the clutch 251.

As the transmission increases its speed from the point 283, the hydraulic unit 235, now connected through the gear train 261, 260, and 202 to the sun gear 203, and by means of the gears 201 and 230 to the sun gear 222, is driven hydraulically by the hydraulic unit 232, which again becomes a pump. As the output speed increases, more and more reaction is developed across the planetary assembly 204, and hence at the sun 224, through the gear train 210, 254, and 255. At the arithmetic mean 285 (FIGS. 21 and 22) of the speeds covered by the bump 280a, the carrier 206 has been brought to a standstill, again balancing the reaction from the sun gears 222 and 224 through their associated gear trains; and, because the hydraulic unit 235 now provides no reaction, it may be released from the gear 261 and the gear train associated with the splitter sun 203, and connected to the gear 268 again. Now the hydraulic unit 235 becomes a pump and drives the hydraulic unit 232 in the opposite sense again.

The ring gear 210 is gradually brought to zero speed, the hydraulic unit 235 is correspondingly increased in stroke, the hydraulic unit 232 is decreased in stroke, and the output gears 242 and 246 are brought to their maximum operating speed. At the point 286 of maximum operating speed of these gears, the ring gear 221 is at its minimum operating speed, and output gears at appropriate ratio, not shown in FIG. 10A, could be engaged to carry the output shaft 250 to a higher speed than any shown in FIG. 21, if required. If such a shift should occur, the operating conditions within the transmission 200 other than those of the output shaft 250 and the hypothetical driving gear, would be identical to those at the point 281 in FIG. 21.

For easier understanding of the operation of the transmission through the bump 280a in FIG. 22, the role of the sun gear 203 of the splitter planetary assembly 204 at the point 283 is analogous to the role of the ring gear 210 of the splitter planetary assembly 204 at the point 281. In addition, the role of the ring gear 210 at the point 283 corresponds to the role of the sun gear 203 at the point 281, it being understood that the means of transmitting torque, such as the gear train shown, is such as to enable this condition to be achieved. Accordingly, the hydraulic units 232 and 235 operate in the same manner (neglecting, in the case of the hydraulic unit 232, the direction of rotation) in corresponding position of the bumps 280 and 280a whether the unit 235 is connected (by appropriate means) to either the sun gear 203 or the ring gear 210 of the splitter planetary assembly 204.

Thus, the transmission 200 operates with the two subbumps 287 and 288 of FIG. 22 instead of the main bump 280, and with the two subbumps 289 and 290 instead of the main bump 280a.

Between the extremes (with respect to torque and speed) of the hydraulic operating condition, some of the reaction torque is transmitted through the hydraulic system, and some, by reaction across the carrier 206, mechanically through the splitter planetary system 204. This mode of operation enables the hydraulic units 232 and 235 to be geared more favorably than in the configuration of FIGS. 1 and 8, so that, for the same number of output shifts (corresponding to the main bumps 280 and 280a) smaller units may be used. The more favorable gearing enables these smaller units 232 and 235 to develop the requisite torque when one or the other unit is holding.

The starting operation is again different from operation through the bumps 287, 288, 289, and 290, and is shown in FIG. 21 and FIG. 22 from the point 281 towards a point 291 which is the zero output speed. Point 292 is also indicated as the point of maximum torque on FIG. 22, and the point 291 is indicated as a point of equal torque but at zero speed. On FIG. 21, the point 281 represents the bottom of the last bump 287, and the operation now to be described starts at that speed and proceeds towards zero speed. At the bottom of the bump 287, the ring gear 221 is running at some speed, and a member must be found to which the drive may be transferred which does come to zero speed; such a member is the sun gear 222. Hence, at the bottom of the low-speed bump 287, a clutch 265 (FIG. 10A) is engaged with a gear 266, which in turn meshes with the gear 230; subsequently, the clutch 251 is disengaged. The drive therefore proceeds from the gear 22 to the gear 230, to the gear 266 and, by means of the clutch 265, to the shaft 250. In addition, the hydraulic unit 232 (FIG. 10B) becomes disconnected from the planet carrier 206 by disengaging the clutch 209 and becomes connected to the gear 260 by means of a clutch 267. The hydraulic unit 235 is stationary but on stroke, and the hydraulic unit 232 is spinning but on zero-stroke. From this point, if the stroke of the hydraulic unit 232 is increased from zero-stroke toward full stroke, then it can receive fluid from the hydraulic unit 235 and add its torque through the gears 260, 202, 201, and 230 to the output gear 266 and the shaft 250. It is necessary to shift the hydraulic unit 235 from the gears 268 and 269 to the gears 256, 254 and 255 by means of disengaging the clutch 270 after engaging the clutch 257. This occurs while the hydraulic unit 235 is standing still at maximum stroke.

By reference to FIG. 21 it will be seen that at this point, which is the point 281, the gear 224 increases in speed and therefore the hydraulic unit 235 increases in speed and pumps more and more fluid into the hydraulic unit 232 to accommodate the fact that the hydraulic unit 232 is increasing in stroke. This condition will continue until the speed decreases to the value at point 292 in FIGS. 21 and 22, at which point the pressure, which has been in the meantime rising, will having reached a maximum.

The reverse employs a gear 271, a clutch 272, and an idler gear 273 in the same manner as was described in connection with FIG. 8, except for the effect of the torque splitter, so that the operation (as shown in FIGS. 21 and 22) is the same as the operation between points 291 and 281, except for the reverse rotation of the shaft 250, brought about by the idler gear 273.

A feasible control system for the transmission 200 is shown partly in FIG. 10A, partly in FIG. 10B, and partly in FIG. 13. The details may be like those shown in FIGS. 1A, 6, and 7. The system can have a lever 300 and a shift quadrant 310, with the relationship between the cams on a shaft 320, the followers, the hydraulic units and the clutches as shown in the following tabulation.

| | Hydraulic unit | Cam | Cam follower |
|---|---|---|---|
| Clutch: | | | |
| 265... | 301 | 311 | 321 |
| 251... | 302 | 312 | 322 |
| 252... | 303 | 313 | 323 |
| 267... | 304 | 314 | 324 |
| 257... | 305 | 315 | 325 |
| 270... | 306 | 316 | 326 |
| 209... | 307 | 317 | 327 |
| 262... | 308 | 318 | 328 |
| 272... | 309 | 319 | 329 |

The lever 300 and shaft 320 also operate a cam 332 that controls the hydraulic unit 232 through a follower 333 and a system like that of FIG. 7, and also a cam 335 that similarly controls the hydraulic unit 235 through a follower 236 and another system like that of FIG. 7.

The quadrant 310 is labeled to correspond with the Roman numeral indications of the various ranges shown in FIG. 21.

The different embodiments of the transmission shown in FIGS. 8, 10A, 10B, and 14 may be conveniently discussed in terms of where the hydraulic unit which is not coupled to the planetary reaction is coupled during startup. FIGS. 8, 10A and 10B show embodiments in which that hydraulic unit is coupled to an output member during startup (an output-coupled transmission), and FIG. 14 shows an embodiment in which that hydraulic unit is coupled to an input member during startup (an input-coupled transmission). In the embodiment of FIG. 14 that hydraulic unit remains coupled to the input member throughout the entire range of output speeds.

To illustrate the difference in operation between an input-coupled system (as in FIG. 14) and output-coupled systems (as in FIGS. 8 through 13), consider the simplest form of an output-coupled planetary system (FIG. 23), and an input-coupled planetary system (FIG. 24).

The output coupled planetary system of FIG. 23 has an input S, output C and reaction R. An hydraulic unit A is geared to the reaction ring R, and an hydraulic unit B is geared to output. Both hydraulic units A and B are variable. In such a system, the output torque is the sum of the torque delivered by the motor B, and that delivered by the planetary system. In order to develop maximum torque through the planetary system, the pump A must support the total maximum reaction of the planetary system.

Thus, at the start, when static torque is to be exerted, the unit b is stationary, but exerts maximum torque, and the unit A is rotating at maximum speed, and supplying full reaction to the planetary system. The unit A therefore receives the full input horsepower (because the output is stationary). Since it is desired to develop the maximum static torque at the output of the transmission and therefore at the output of the planetary system, the unit A must provide a maximum reaction. At the same time, the unit A has to rotate, because the output of the planetary system is stationary. In view of the fact that the unit B is stationary at static torque conditions, the entire horsepower delivered to the unit A must be dissipated through a spill valve and the transmission cooling system.

FIG. 25 graphically shows what happens in the FIG. 23 system. During the constant output torque range of operation (a), the amount of horsepower rejected and dissipated through the cooling system is shown by the shaded area (b). In a vehicle which operates a great deal of the time in a forward-reverse transition, or at very low speeds or static torque conditions, the heat rejection problem may become extremely severe.

FIG. 24 illustrates an input coupled simple planetary system, with input S, output C and reaction R. The reaction R is geared to the hydraulic unit A, and the hydraulic unit B is geared to the input S. The torque at point ① is the engine input torque, while the torque at point ② that is, the torque into the planetary assembly, is the sum of the engine input torque and the torque delivered by the hydraulic motor B to the input shaft. The output torque is, of course, the torque at point ② multiplied by the planetary ratio. During the starting range ($a^1$) the output torque remains constant. Consider the condition of decreasing speed from point ③ in the diagram, FIG. 26. At this point ③ the reaction R is stationary, and therefore the unit A is stationary. Since the input shaft rotates, the displacement of the unit B must be zero at point ③ in order to block flow from the unit A and hold it stationary.

Assume that the unit A is of constant displacement. Throughout the starting range ($a^1$) therefore, the pressure is also constant (since the output torque and therefore the planetary reaction torque requirement is constant).

As the output speed decreases from point ③, the unit A must rotate as reaction; it therefore absorbs horsepower. In order to permit this rotation, the unit B must increase its stroke from zero and, acting as a motor, it delivers the horsepower to the input shaft, thus raising the torque at point ② into the planetary unit. However, since in this region the output torque is constant, the torque into the planetary unit is also constant, and as the motor B delivers more and more torque to the input shaft, there is less and less requirement for input torque from the engine, assuming that the engine is governed. At zero output speed the entire torque required by the planetary unit (at point ②) is supplied by the hydraulic unit B, and therefore there is, ideally, no requirement for the engine to supply any torque at all. Actually, of course, it has to supply sufficient torque to overcome the total losses in the hydraulic and planetary systems, which are shown by the shaded section ($b$) of FIG. 26. This shaded portion ($b^1$) may be compared with the shaded section ($b$) of FIG. 25.

Therefore, within the constant-output torque starting range, the input-coupled device is far more favorable from the standpoint of heat rejection at static torque or low speed conditions, and does not subject the cooling system to a greater load than is present under normal operating conditions. No spill occurs in the system except during transient overloads beyond the design point.

The unit 400 of this form, shown in FIGS. 14 and 15, is simpler. Certain elements corresponding to those shown in FIG. 1 are given numbers exactly four hundred higher while elements having no corresponding elements in FIG. 1 are given numbers in the five hundreds. It uses hydraulic units of small rating, without the use of any extra splitter planetary and it lends itself to extremely good starting conditions. The starting condition deserves much attention, for static torque is necessary in any vehicle starting from standstill and especially in a working vehicle such as a bulldozer pushing into a pile of dirt. In an output-coupled transmission, in order to produce static torque, the entire engine horsepower has to be dissipated through relief valves and a cooling system; however, in the input-coupled transmission 400 of FIG. 14, this is not the case, and, though the engine develops only enough horsepower to overcome the internal losses in the transmission, still the transmission is capable of producing full static torque. For that reason, an input-coupled transmission is extremely advantageous for working vehicles such as bulldozers, scrapers, etc. Also, it has great use in trucks and city buses operating in stop-and-start mode of operation.

The characteristic speed relationships for the system of FIG. 14 are shown in FIG. 27. In this system, one hydraulic unit 432 is shifted from the sun gear 424 to the sun gear 422 at a point 500 of equal speeds, and the other hydraulic unit 435 is permanently connected to the input. The rated horsepower of the hydraulic units shows that the units 432 and 435 are not of the same size. The rating of the unit 432=(R−/2)times (HIT), and the rating of the unit 435 above the starting range, in the case of a 3:1 bump ratio, =1/4 times (HIT). This is due to the fact that the unit 435 runs at constant speed and, therefore, its rated horsepower=maximum transmitted horsepower. However, due to the requirements of starting conditions, the rating of the unit 435 may be equal to that of the unit 432.

The speed relationships are shown in FIG. 28. The torque and horsepower relationships are shown in FIG. 29, and the torque of the hydraulic units and the pressure are shown respectively in FIGS. 30 and 31.

The transmission 400 is simpler in construction than the splitter planetary transmission 200. The transmission 400 of FIG. 14 comprises an input shaft 411 which through a spline 412 drives a planet carrier 413 carrying pinions 415 and 416 of a planetary assembly 414. The pinions 415 and 416 may have straight-through configuration as in FIGS. 10A and 10B, without a step construction. These pinions 415 and 416 mesh with each other; the pinions 415 also mesh with a ring gear 421 and a sun gear 422, while the pinions 416 mesh with a ring gear 423 and a sun gear 424, the gears 421 and 423 being output gears and the gears 422 and 424 being reaction gears. The gears 421, 422, 423, and 424 are on respective hollow shafts 427, 425, 428, and 426. The device 400, as will be seen, is shown fully reversible throughout its entire operating range.

Two main bumps 550 and 551 of FIG. 29 for forward operation are produced, in turn, first by gears 440 and 444 and, second, by gears 442 and 446, with the aid of clutches 451 and 452 splined to the output shaft 450. In this embodiment, gears 540 and 544 may mesh through an idler 501, and gears 542 and 546 also may mesh through an idler 502, to produce reverse operation over a full range of speeds so that the transmission is 100 percent reversible. If it is not necessary to reverse it for its full range, as for instance for use in a highway truck, then the gears 502, 542 and 546 may be eliminated, and only one set of reversing gears 540, 544 may be used.

This unit 400 has the desirable characteristic of requiring no additional shifting for the starting condition so that no special starting gearing is necessary. Assuming the vehicle to be standing still and the engine running at a governed speed, and, for the purpose of illustration, assuming that the engine runs at a constant speed, the shaft 411 is rotating at engine speed, the shaft 450 stands still, and at that point the clutch 451 is engaged to the gear 444, which therefore means that the gear 440, and therefore the ring gear 421 also, stand still. The carrier 413 is then spinning at input speed, and the ring gear 423 with its attending gearing is spinning without transmitting any power. The reaction gear 422 at this point is connected by means of a gear 430, gear 431, clutch 503, and shaft 504 to the hydraulic unit 432, and is spinning in an opposite direction to the input. (See FIG. 28 at point Q.) This represents the zero output speed point. The hydraulic unit 432 with its angle plate 465 is then on maximum positive displacement in full stroke position, and the hydraulic unit 435 with its angle plate 466 is also in maximum positive displacement, and therefore at the start, during the condition of stationary torque, the system operates as a regenerative transmission, and the power which is supplied to the unit 432 is returned back to the unit 435 and, through a gear 505 on the shaft 506 of the unit 435 to a gear 507 on the input shaft 411. For that reason the external power required from the prime mover which drives the shaft 411 by means of a spline 508 is limited only to the loss encountered in the hydraulic and mechanical systems.

As the stroke of the unit 435 is reduced toward zero, the hydraulic unit 432 is slowed down, due to the fact that its output is limited by the reduction of stroke of the unit 435, and the vehicle begins to move. The planetary output gear 421 increases in speed in accordance with the line identified as 510 on FIG. 28. When the hydraulic unit 435 reaches zero stroke, the hydraulic unit 432 is stationary, and this occurs at point 511 in FIG. 28. Thereafter, the hydraulic unit 432 runs in the opposite direction, as the unit 435 goes from zero stroke to full negative stroke and part of the power will be transmitted from the shaft 411 to the hydraulic unit 435, from the hydraulic unit 435 to the hydraulic unit 432, from the hydraulic unit 432 to the gear 401, and to the planetary system 414, whereas the balance of the power will go through the shaft 411 into the planetary carrier 413 and will be delivered to the output for the gearing 421, 440, and 444.

In the meantime, the hydraulic unit 432 will remain in its full positive displacement, if the hydraulic unit 432 is of fixed displacement. It is possible to have the hydraulic unit 432 variable for optimization of pressure relationship, but it is not necessary and the possibility of using a fixed displacement unit is attractive because it is quite inexpensive.

When the unit 435 has moved from full position to zero stroke and is spinning at zero stroke, the unit 432 must be standing still. When the unit 435 has moved to full negative stroke, the unit 432 is running at a speed indicated by shift point 512 on FIGS. 28 and 29. At this point 512, a clutch 520 is engaged to a gear 521 and subsequently the clutch 503 is disengaged from the gear 431 and therefore the hydraulic unit 432 is now connected through gears 521 and 522 and the shaft 426 to the gear 424, and the further cycle proceeds by the hydraulic unit 432 slowing down, because the hydraulic unit 435 returns toward zero stroke, which it reaches at point 513 in FIG. 28. At this point 513 the unit 432 is stopped again. This cycle repeats itself for the second main bump 551, and a shift occurs at a point 514 (FIGS. 28 and 29). The bumps 550 and 551 are of different nature than the bumps 61A, 62A, 63A, and 64A. The hydraulic horsepower transmitted, however, and the rating of the hydraulic units 432 and 435 are still small.

FIGS. 30 and 31 are self explanatory in view of what has been said about preceding embodiments.

Another startup condition can be obtained by operating the transmission as a pure hydrostatic transmission around zero output speed. In such a mode, one hydraulic unit would be geared to the output as in FIG. 8 and the other to the input as in FIG. 14.

A feasible control system generally like those already described may be used. Hydraulic units may again be used to operate the clutches, but are not shown this time. The clutches 453 and 454 are the reverse gear clutches. The cams and followers shown in FIG. 15 are related to the clutches of FIG. 14 as shown in the table below. A control lever 600 turns a shaft 610 which may carry all the cams. Valving may be as in FIG. 6.

|         | Cam | Follower |
|---------|-----|----------|
| Clutch: |     |          |
| 451     | 601 | 611      |
| 452     | 602 | 612      |
| 453     | 603 | 613      |
| 454     | 604 | 614      |
| 520     | 605 | 615      |
| 503     | 606 | 616      |

The hydraulic unit 432 needs no control if used as a fixed displacement device. If used as a variable device there will be another cam and related controls. The hydraulic unit 435 has a cam 635 and follower 636 operating a system like that of FIG. 7.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

It should be noted that while the drawings show forms of the invention in which the input means of the planetary assemblies 14, 214, and 414 is the carrier 13, 213, or 413, in which the ring gears 21 and 23, 221 and 223, and 421 and 423 serve as the output means, and in which the sun gears 22 and 24, 222 and 224, and 422 and 424 serve as the reaction means, these are merely preferred forms of the invention. Actually, while employing the principles of the invention, the input means may be a sun gear or a ring gear, the output means might be two carriers or two sun gears, and the reaction means may be two carriers or two ring gears. In fact, the output means may be one carrier and one sun gear, or one sun and one ring gear, while the reaction means may be one carrier and one ring gear or one sun and one ring gear, and so on. The invention contemplates a five element planetary assembly with a single input, dual output means, and dual reaction means, whichever element serves which function.

I claim:

1. A power transmission comprising input means, output means, and a pair of gear trains for alternately connecting said input means with the output means, each train comprising a plurality of spaced transmission ranges of different ratios, each train including a planetary gear set with the planet gears of one set being intermeshed with the planet gears of the other set and a common carrier for both sets of planet gears driven by said input means, the ends of said ranges of each train overlapping the ends of the ranges of the other train between the maximum and minimum limits of transmission of the pair of trains, and means for alternately connecting and disconnecting the gear trains to the output means at said overlapping ends whereby power is transmitted alternately from said gear trains through the spaced transmissions to gradually drive the output means through the speed ranges.

2. A power transmission comprising input means, output means, and a plurality of gear trains intermediately connected to each other by two intermeshed planet gear sets of a planetary gear arrangement and of overlapping speed ratios for connecting said input and output means, means for successively connecting each train to drive the output means through a preselected speed range, and means disconnecting each driving train from the output means after the following train has been connected thereto.

3. A power transmission comprising driving means, a planetary gear train connected to said means and having two sets of planet gears, one set being intermeshed with the other, a pair of output gears each in mesh with a different set of planet gears of said train, a pair of reaction gears each in mesh with a different set of said planet gears, and means interconnecting said reaction gears for regulating the reactive torque applied to said planet gears.

4. A device as defined in claim 3 further including driven means, a plurality of gear trains of different transmission ratios connected to said output gears, and means for alternately connecting the gear trains connected to one of the output gears and the gear trains connected to the other output gears to the driven means.

5. A power transmission comprising an input shaft, an output shaft, and a pair of gear trains for alternately connecting said input shaft with the output shaft, each train comprising a plurality of spaced transmission ranges of different ratios, each train including a planetary gear set with the planet gears of one set intermeshed with the planet gears of the other set and a common carrier for both sets of planet gears driven by said input shaft, the ends of said ranges of each train overlapping the ends of the ranges of the other train between the maximum and minimum limits of transmission of the pair of trains, and means for alternately connecting and disconnecting the gear trains to the output shaft at said overlapping ends, whereby power is transmitted alternately from said gear trains through the spaced transmissions to gradually drive the output shaft through the speed ranges.

6. A power transmission comprising an input shaft, an output shaft and a plurality of gear trains of overlapping speed ratios for connecting said shafts, each said gear train including a planetary gear arrangement with the planet gears of one train intermeshed with the planet gears of the other train, all of said planet gears being driven by said input shaft, means for successively connecting each train to drive the output shaft through a preselected speed range, and means disconnecting each driving train from the output shaft after the following train has been connected thereto.

7. A power transmission comprising an input shaft, an output shaft, and a plurality of gear trains for connecting said shafts, said plurality of gear trains including a pair of planetary gears having a common input driven by said input shaft and the planet gears of one being intermeshed with the planet gears of the other, means for connecting one of said trains to drive the output shaft through a first preselected speed range, means for connecting a second train to the output shaft during an end portion of said speed range, means for disconnecting said first train from the output shaft after the second train has been connected thereto, and means for driving the output shaft by said second train through a second preselected speed range after said first train has been disconnected.

8. A power transmission comprising a driving shaft, a planetary gear train connected to said shaft, and having two sets of planet gears, one set being intermeshed with the other, a pair of output gears each in mesh with a different set of planet gears of said train, a pair of reaction gears each in mesh with a different set of said planet gears, and means interconnecting said reaction gears for regulating the reactive torque applied to said planet gears.

9. A device as defined in claim 8 further including a driven shaft, a plurality of gear trains of different transmission ratios connected to said output gears, and means for alternately connecting the gear trains connected to one of the output gears and the gear trains connected to the other output gear to the driven shaft.

10. A power transmission comprising a driving shaft, a pair of intermediate shafts, and an output shaft, a planetary gear train connected to said input shaft, and having two sets of planet gears, one set being intermeshed with the other, a pair of output gears, one carried by each of said pair of shafts, each in mesh with a different set of planet gears of said train, at least a pair of gear trains connected to each of said pair of shafts for selective connection to the output shaft, a pair of reaction gears each in mesh with a different set of planet gears, and means connecting said reaction gears for regulating the reactive torque supplied by each reaction gear to the planet gears.

11. A device as defined in claim 10 wherein the means for selectively connecting said gear trains comprises a clutch for connecting either one of said pair of gear trains to the output shaft, means for engaging said clutches for simultaneously driving the output shaft from a gear train connected to each of the intermediate shafts, and means for disengaging one of the clutches after the other clutch has been engaged.

12. A device as defined in claim 11 wherein the means connecting said reaction gears comprises two fluid pump-motors, each able to serve as a pump at some times and as a motor at other times, means connecting said pump-motors together for driving the pump-motor which serves as a motor by the pump-motor which serves as a pump, a gear train connecting one of the reaction gears to one of the pump-motors, a gear train connecting the other of the reaction gears to the other pump-motor, and means regulating the output of the pump-motors.

13. A device as defined in claim 12 further including means for driving the output shaft in a reverse direction comprising a reversing gear train connected to one of the reaction gears and output shaft, clutch means for engaging said reversing train to and from the output shaft, and means for disengaging said pairs of gear trains from the output shaft before engaging said reversing train.

14. A power transmission comprising:
a driving shaft;
a pair of intermediate shafts;
an output shaft;
a planetary gear train connected to said input shaft;
an output gear carried by each of said pair of intermediate shafts in mesh with the planet gears of said train;
at least a pair of gear trains connected to each of said pair of intermediate shafts;
means for selectively connecting said gear trains to the output shaft, comprising a clutch for connecting either one of said pair of gear trains to the output shaft;
means for engaging said clutches for simultaneously driving the output shaft from a gear train connected to each of the intermediate shafts;
means for disengaging one of the clutches after the other clutch has been engaged;
a pair of reaction gears in mesh with the planet gears;
means connecting said reaction gears for regulating the reactive torque supplied by each reaction gear to the planet gears, comprising two fluid pump-motors, each able to serve as a pump at some times and as a motor at other times;
means connecting said pump-motors together for driving the pump-motor when it serves as a motor by the other pump-motor when it serves as a pump;
a first pair of gear trains for selectively connecting one of the reaction gears to the pump-motor serving as a pump;
a second pair of gear trains for selectively connecting the other of the reaction gears to the pump-motor serving as a motor;
means connecting one of said trains of the first pair to one of said trains of the second pair; and
means for regulating the output of the pump-motors.

15. A device as defined in claim 11 wherein one of the gear trains of each of said pair includes an idler gear whereby each of said one of said gear trains can rotate the output shaft in a reverse direction.

16. A power transmission comprising:
a driving shaft;
a pair of intermediate shafts,
an output shaft;
a planetary gear train connected to said input shaft;
an output gear carried by each of said pair of intermediate shafts in mesh with the planet gears of said train;
at least a pair of gear trains connected to each of said pair of shafts;
means for selectively connecting said gear trains comprising a clutch for connecting either one of said pair of gear trains to the output shaft;
means for engaging said clutches for simultaneously driving the output shaft from a gear train connected to each of the intermediate shafts;
means for disengaging one of the clutches after the other clutch has been engaged;
a pair of reaction gears in mesh with the planet gears;
a first positive displacement hydraulic unit drivingly connected to the driving shaft;
a second positive displacement hydraulic unit having a shaft;
means connecting the two hydraulic units for driving one by the other;
a gear train for connecting one of the reaction gears with the shaft of the second unit;
a gear train for connecting the other reaction gear with the shaft of the second unit;
clutch means for clutching said trains to the shaft of the second unit; and
means regulating the output of the two hydraulic units.

17. A power transmission comprising a driving shaft, a pair of intermediate shafts, and an output shaft, a planetary gear train connected to said input shaft, a ring gear carried by each of said pair of shafts in mesh with the planet gears of said train, at least a pair of gear trains connected to each of said pair of shafts for selective connection to the output shaft, a pair of sun gears in mesh with the planet gears, and means connecting said sun gears for regulating the reactive torque supplied by each sun gear to the planet gears.

18. A device as defined in claim 17 wherein the means for selectively connecting said gear trains comprises a clutch for connecting either one of said pair of gear trains to the output shaft, means for engaging said clutches for simultaneously driving the output shaft from a gear train connected to each of the intermediate shafts, and means for disengaging one of the clutches after the other clutch has been engaged.

19. A device as defined in claim 18 wherein the means connecting said sun gears comprises a fluid pump, a fluid motor, means connecting said pump and motor for driving the motor by the pump, a gear train connecting one of the sun gears to the pump, a gear train connecting the other of the sun gears to the motor, and means regulating the output of the pump and motor.

20. A device as defined in claim 19 further including means for driving the output shaft in a reverse direction, comprising a reversing gear train connected to one of the sun gears and output shaft, clutch means for engaging said reversing train to and from the output shaft, and means for disengaging said pairs of gear trains from the output shaft before engaging said reversing train.

21. A device as defined in claim 18 wherein the means connecting the sun gears comprises a fluid pump, a fluid motor, means connecting said pump and motor for driving the motor by the pump, a first pair of gear trains for selectively connecting one of the sun gears to the pump, a second pair of gear trains for selectively connecting the other of the sun gears to the motor, means connecting one of said trains of the first pair to one of said trains of the second pair, and means for regulating the output of the pump and motor.

22. A device as defined in claim 18 wherein one of the gear trains of each of said pair includes an idler gear whereby each of said one of said gear trains can rotate the output shaft in a reverse direction.

23. A power transmission comprising:
a driving shaft;

a pair of intermediate shafts;

an output shaft;

a planetary gear train connected to said input shaft;

a ring gear carried by each of said pair of shafts in mesh with the planet gears of said train;

at least a pair of gear trains connected to each of said pair of shafts;

means for selectively connecting said gear trains, comprising a clutch for connecting either one of said pair of gear trains to the output shaft, means for engaging said clutches for simultaneously driving the output shaft from a gear train connected to each of the intermediate shafts, and means for disengaging one of the clutches after the other clutch has been engaged;

a pair of sun gears in mesh with the planet gears;

a first positive displacement hydraulic unit drivingly connected to the driving shaft;

a second positive displacement hydraulic unit having a shaft;

means connecting the two hydraulic units for driving one by the other;

a gear train for connecting one of the sun gears with the shaft of the second unit;

a gear train for connecting the other sun gear with the shaft of the second unit;

clutch means for clutching said trains to the shaft of the second unit; and means regulating the output of the two hydraulic units.

24. A power transmission for transmitting power between an input shaft and an output shaft, comprising:

a plurality of fixed transmission ratio gear trains;

a variable speed transmission driven by the input shaft including a pair of planetary gear assemblies each having a set of planet gears, one said set of planet gears being intermeshed with the other said set of planet gears and both sets having a common carrier and driven by said input shaft, each set being in engagement with output means of its said planetary gear assembly;

means connecting the output means of said variable speed transmission to said gear trains to drive said trains;

means for varying the speeds of said variable speed transmission to increase the speed of some of said trains and simultaneously reduce the speed of the remainder of said trains;

the end portion of the speed range of the variable speed transmission producing the same transmission ratio between one of the trains of said some of said trains and one of the trains of said remainder of said trains; and means for simultaneously connecting one of the trains of said same transmission ratio to the output shaft and disconnecting the other of said trains of the same transmission ratio from the output shaft.

25. The device of claim 24 wherein each planetary gear set of said variable speed transmission has a reaction member and the means for varying the speed of said variable speed transmission comprises a hydraulic motor connected to one of said reaction members, a pump connected to the other reaction member, and conduit means connecting the motor and pump.

26. A recycling transmission, including in combination:
1. a planetary assembly having an input means, a pair of output means, a pair of reaction means, and a pair of planet gear sets intermeshed with each other, each set being meshed with one said output means and one said reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a pair of hydraulic units, each able to perform as a motor and, at a different time, as a pump, each mounted on a separate shaft for rotation therewith, with hydraulic conduit means connecting said pair of units;
9. at least one additional gear mounted on each of said reaction shafts, for rotation therewith; and
10. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner.

27. The recycling transmission of claim 26 wherein there is a plurality of said output gears on each of said first and second output shafts, each making a gear pair with a said driving gear on said final output shaft.

28. The recycling transmission of claim 27 wherein each said gear pair has a different ratio from that of the other gear pairs.

29. The recycling transmission of claim 27 wherein said gear pairs come in twos on each said output shaft, one pair directly meshed for forward drive of said final output shaft and one pair connected to each other by an idler gear for reverse drive of said final output shaft.

30. A recycling transmission, including in combination:
1. a planetary assembly having an input means, a pair of output means, and a pair of reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a starting gear on said final output shaft in driving relation with a mating gear on said first reaction shaft, to provide a starting gear pair;
9. means for causing said starting and mating gears to transmit power from said first reaction shaft to said final output shaft;
10. a pair of hydraulic units, each able to perform as a motor and, at a different time, as a pump, each mounted on a separate shaft for rotation therewith, with hydraulic conduit means connecting said pair of units;
11. at least one additional gear mounted on each of said reaction shafts, for rotation therewith; and 12. 12. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner.

31. A recycling transmission, including in combination:
1. a planetary assembly having an input means, a pair of output means, and a pair of reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a reversing gear on said final output shaft and an idling gear meshed therewith and to one said additional gear;
9. means for causing said additional, idling and reversing gears to transmit power to said output shaft;
10. a pair of hydraulic units, each able to perform as a motor and, at a different time, as a pump, each mounted on a separate shaft for rotation therewith, with hydraulic conduit means connecting said pair of units;
11. at least one additional gear mounted on each of said reaction shafts, for rotation therewith; and
12. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner.

32. The recycling transmission of claim 26 having control means for operating said hydraulic means so that one of them is on full stroke while the other is operating at zero stroke and vice versa.

33. The recycling transmission of claim 26 having separate control means for each said hydraulic means.

34. A recycling transmission, including in combination:
1. a planetary assembly having an input means, a pair of output means, and a pair of reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a pair of hydraulic units, each able to perform as a motor and, at a different time, as a pump, each mounted on a separate shaft for rotation therewith, with hydraulic conduit means connecting said pair of units;
9. at least one additional gear mounted on each of said reaction shafts, for rotation therewith;
10. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner;
11. means for retaining a fixed displacement on a first said hydraulic unit, two said gear means (10) being on the shaft of said hydraulic unit and separately clutchable thereto; one said gear means (10) being meshed with the additional gear on said first reaction shaft while the other is meshed with the additional gear on said second reaction shaft;
12. means for varying the stroke of the second said hydraulic unit from full stroke in one direction through zero stroke to full stroke in the opposite direction;
13. a first coupling gear on the shaft of said second hydraulic unit; and
14. a second coupling gear on said input shaft meshed with said first coupling gear, to provide an input-coupled device.

35. The recycling transmission of claim 26 having a single control means for all of said means for separately causing and for said hydraulic units.

36. The recycling transmission of claim 35 wherein said single control means comprises a single shaft with a plurality of cam means thereon, separate valves operated by said cam means, separate hydraulic means for operating said means for separately causing and said hydraulic units, and a fluid pressure system controlled by said valves and controlling each of said hydraulic means.

37. A recycling transmission, including in combination:
1. a planetary assembly having an input means, a pair of output means, and a pair of reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a pair of hydraulic units, each able to perform as a motor and, at a different time, as a pump, each mounted on a separate shaft for rotation therewith, with hydraulic conduit means connecting said pair of units;
9. at least one additional gear mounted on each of said reaction shafts, for rotation therewith; and
10. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner;
11. a torque-splitting planetary assembly with first, second and third elements comprising the sun, planets and carrier, and ring gears, not necessarily in that order, said first element being drivingly connected to said first reaction shaft, said second element being drivingly connected to said second reaction shaft;

12. means for connecting and disconnecting said third element to the first of said pair of hydraulic units; and
13. means for connecting and disconnecting at different times from each other each of said first and second elements to the second said hydraulic unit.

38. A recycling transmission, including in combination:
1. a planetary assembly having an input means, a pair of output means, and a pair of reaction means;
2. an input shaft driving said input means;
3. first and second output shafts mounting said pair of output means;
4. first and second reaction shafts mounting said pair of reaction means;
5. at least one output gear on each said output shaft;
6. a final output shaft having a plurality of driving gears each one driven by a said output gear to make a gear pair, said gear pairs providing different gear ratios between the input shaft and the final output shaft;
7. means for separately causing each gear pair to transmit power to said final output shaft;
8. a pair of hydraulic units, each able to perform as a motor and, at a different time, as a pump, each mounted on a separate shaft for rotation therewith, with hydraulic conduit means connecting said pair of units;
9. at least one additional gear mounted on each of said reaction shafts, for rotation therewith; and
10. gear means on at least one of the shafts carrying a said hydraulic unit and driven by a said additional gear, whereby each said output gear is able to drive said final output shaft at a different input-speed-to-output-speed ratio and a shift can be made from an output gear on said first output shaft to an output gear on said second output shaft and vice versa at a time when one of said first and second output shafts is moving at its minimum speed and the other is moving at its maximum speed and when one said hydraulic unit is a pump and the other one is a motor and one is on full stroke and the other is operating at zero stroke, so that the transmission can alternately transfer its output drive between said first and second output shafts in a recycling manner, said first said hydraulic unit being alternatingly coupled to the additional gear of said first reaction shaft through a first path comprising a first intermediate gear and a first gear on and clutchable to the shaft of said first unit and through a second path comprising said first intermediate gear, a shaft secured thereto, an input member of a torque-splitter planetary assembly also secured to said shaft, an output member of said torque-splitter planetary assembly, a second gear engaged with said output member, on and clutchable to the shaft of said first unit, and a reaction member of said torque-splitter planetary assembly connected to and rotating with the additional gear of the second reaction shaft.

39. The recycling transmission of claim 37 wherein the second said hydraulic unit is connected to said second reaction shaft (a) by a first said additional gear on said second reaction shaft and a first gear on the shaft of said second unit and (b) as a second alternate path by a gear train comprising a second said additional gear on said second reaction shaft, a gear attached to and rotating with the reaction means of said torque-splitter planetary assembly, and a second gear on the shaft of said second unit, and wherein the second hydraulic unit is, as a third alternate connected by a third gear clutchable to its shaft and engaged with the first said gear on the shaft of said first unit.

40. A recycling transmission, including in combination:
1. a planetary assembly having;
    a. a carrier,
    b. first and second planet gear sets carried by said carrier, with first engaging means on each gear of said first set engaging first engaging means on at least one gear of said second set, each gear of each set also having second engaging means,
    c. first and second sun gears, said second engaging means of said first set being meshed with said first sun gear, said second engaging means of said second set being meshed with said second sun gear,
    d. first and second ring gears, said second engaging means of said first set being meshed with said first ring gear and said second engaging means of said second set being meshed with said second ring gear;
2. an input shaft driving said carrier;
3. a first sun gear shaft mounting said first sun gear;
4. a second sun gear shaft mounting said second sun gear;
5. a first ring gear shaft mounting said first ring gear and having at least one output gear;
6. a second ring gear shaft mounting said second ring gear and having at least one output gear;
7. an output shaft;
8. a plurality of driving gears on said output shaft, one driven by each said output gear, to make a plurality of gear pairs, either each said driving gear or each said output gear being secured to its shaft, the other of each said gear pair being freely rotatable upon its shaft;
9. clutch means for clutching each said freely rotatable gear separately to its said shaft;
10. a pair of hydraulic units, each able to perform as a motor and, at a different time, as a pump, each mounted on a separate shaft for rotation therewith, with hydraulic conduit means connecting said pair of units;
11. at least one additional gear mounted on each of said first and second sun gear shafts, for rotation with the sun gears thereof; and
12. gear means on each of the shafts carrying a said hydraulic unit, each driven by a different said addition gear, whereby each said output gear is able to drive said output shaft at a different input-speed-to-output-speed ratio and a shift can be made from an output gear on said first ring gear shaft to an output gear on said second ring gear shaft and vice versa at a time when one of said ring gear shafts is moving at its minimum speed and the other is moving at its maximum speed and when one said hydraulic unit is a pump and the other one is a motor and one is on full stroke and the other is operating at zero stroke, so that the transmission can alternately transfer its output drive between said ring gear shafts in a recycling manner.

41. The recycling transmission of claim 40 wherein there is a plurality of said output gears on each said ring gear shaft, each making a gear pair with a said driving gear on said output shaft.

42. The recycling transmission of claim 41 wherein each said gear pair has a different ratio from that of the other gear pairs.

43. The recycling transmission of claim 40 having a starting gear on said output shaft in driving relation with a mating gear on said first sun gear shaft, to provide a starting gear pair, one gear of which is in direct driving relation with its shaft while the other gear is freely rotatable on its shaft, and clutch means for clutching the freely rotatable gear to its said shaft.

44. The recycling transmission of claim 40 wherein there is a reversing gear on said output shaft and an idling gear meshed therewith and to one said additional gear, and clutch means for clutching said reversing gear to said output shaft.

45. The recycling transmission of claim 40 having control means for operating said hydraulic means so that one said hydraulic means is on full stroke while the other is operating at zero stroke and vice versa.

46. The recycling transmission of claim 40 having separate control means for each said hydraulic means.

47. A recycling transmission, including in combination:
1. a planetary assembly having;
    a. a carrier,
    b. first and second planet gear sets carried by said carrier, with first engaging means on each gear of said first set engaging first engaging means on at least one gear of said second set, each gear of each set also having second engaging means, c. first and second sun gears, said second engaging means of said first set being meshed with said first sun gear, said second engaging means of said second set being meshed with said second sun gear, d. first and second ring gears, said second engaging means of said first set being meshed with said first ring gear and said second engaging means of said second set being meshed with said second ring gear;

2. an input shaft driving said carrier;
3. a first sun gear shaft mounting said first sun gear;
4. a second sun gear shaft mounting said second sun gear;
5. a first ring gear shaft mounting said first ring gear and having at least one output gear;
6. a second ring gear shaft mounting said second ring gear and having at least one output gear;
7. an output shaft;
8. a plurality of driving gears on said output shaft, one driven by each said output gear, to make a plurality of gear pairs, either each said driving gear or each said output gear being secured to its shaft, the other of each said gear pair being freely rotatable upon its shaft;
9. clutch means for clutching each said freely rotatable gear separately to its said shaft;
10. a pair of hydraulic units, each able to perform as a motor and, at a different time, as a pump, each mounted on a separate shaft for rotation therewith; with hydraulic conduit means connecting said pair of units;
11. at least one additional gear mounted on each of said first and second sun gear shafts, for rotation with the sun gears thereof; and
12. gear means on at least one of the shafts carrying a said hydraulic unit, driven by a said addition gear, whereby each said output gear is able to drive said output shaft at a different input-speed-to-output-speed ratio and a shift can be made from an output gear on said first ring gear shaft to an output gear on said second ring gear shaft and vice versa at a time when one of said ring gear shafts is moving at its minimum speed and the other is moving at its maximum speed and when one said hydraulic unit is a pump and the other one is a motor and one is on full stroke and the other is operating at zero stroke, so that the transmission can alternately transfer its output drive between said ring gear shafts in a recycling manner,
13. means for retaining a fixed displacement on a first said hydraulic unit, two said gear means (12) being on the shaft of said first hydraulic unit and separately clutchable thereto, one said gear means (12) being meshed with the additional gear on said first sun gear shaft while the other is meshed with the additional gear on said second sun gear shaft;
14. means for varying the stroke of the second said hydraulic unit from full stroke in one direction through zero stroke to full stroke in the opposite direction;
15. a first coupling gear on the shaft of said second hydraulic unit; and
16. a second coupling gear on said input shaft meshed with said first coupling gear, to provide an input-coupled device.

48. The recycling transmission of claim 47 wherein said gear pairs come in twos on the same ring gear shaft, one pair directly meshed for forward drive of said output shaft and one pair connected to each other by an idler gear for reverse drive of said output shaft.

49. The recycling transmission of claim 40 having a single control means for all of said clutch means and for said hydraulic units.

50. The recycling transmission of claim 51 wherein said single control means comprises a single shaft with a plurality of cam means thereon, separate valves operated by said cam means, separate hydraulic means for operating said clutch means and hydraulic units, and a fluid pressure system controlled by said valves and controlling each of said hydraulic means.

51. A recycling transmission, including in combination:

1. a planetary assembly having;
   a. a carrier,
   b. first and second planet gear sets carried by said carrier, with first engaging means on each gear of said first set engaging first engaging means on at least one gear of said second set, each gear of each set also having second engaging means,
   c. first and second sun gears, said second engaging means of said first set being meshed with said first sun gear, said second engaging means of said second set being meshed with said second sun gear,
   d. first and second ring gears, said second engaging means of said first set being meshed with said first ring gear and said second engaging means of said second set being meshed with said second ring gear;
2. an input shaft driving said carrier;
3. a first sun gear shaft mounting said first sun gear;
4. a second sun gear shaft mounting said second sun gear;
5. a first ring gear shaft mounting said first ring gear and having at least one output gear;
6. a second ring gear shaft mounting said second ring gear and having at least one output gear;
7. an output shaft;
8. a plurality of driving gears on said output shaft, one driven by each said output gear, to make a plurality of gear pairs, either each said driving gear or each said output gear being secured to its shaft, the other of each said gear pair being freely rotatable upon its shaft;
9. clutch means for clutching each said freely rotatable gear separately to its said shaft;
10. a pair of hydraulic units, each able to perform as a motor and, at a different time, as a pump, each mounted on a separate shaft for rotation therewith, with hydraulic conduit means connecting said pair of units;
11. at least one additional gear mounted on each of said first and second sun gear shafts, for rotation with the sun gears thereof;
12. gear means on at least one of the shafts carrying a said hydraulic unit, driven by a said additional gear, whereby each said output gear is able to drive said output shaft at a different input-speed-to-output-speed ratio and a shift can be made from an output gear on said first ring gear shaft to an output gear on said second ring gear shaft and vice versa at a time when one of said ring gear shafts is moving at its minimum speed and the other is moving at its maximum speed and when one said hydraulic unit is a pump and the other one is a motor and one is on full stroke and the other is operating at zero stroke, so that the transmission can alternately transfer its output drive between said ring gear shafts in a recycling manner;
13. a torque-splitting planetary assembly with first, second and third elements comprising the sun, planets and carrier, and ring gears, not necessarily in that order, said first element being drivingly connected to said first sun gear shaft, said second element being drivingly connected to said second sun gear shaft;
14. means for connecting and disconnecting said third element to the first of said pair of hydraulic units; and
15. means for connecting and disconnecting at different times from each other each of said first and second elements to the second said hydraulic unit.

52. A recycling transmission, including in combination:
1. a planetary assembly having;
   a. a carrier,
   b. first and second planet gear sets carried by said carrier, with first engaging means on each gear of said first set engaging first engaging means on at least one gear of said second set, each gear of each set also having second engaging means,
   c. first and second sun gears, said second engaging means of said first set being meshed with said first sun gear, said second engaging means of said second set being meshed with said second sun gear, d. first and second ring gears, said second engaging means of said first set being meshed with said first ring gear and said second engaging means of said second set being meshed with said second ring gear;
2. an input shaft driving said carrier;
3. a first sun gear shaft mounting said first sun gear;
4. a second sun gear shaft mounting said second sun gear,
5. a first ring gear shaft mounting said first ring gear and having at least one output gear;
6. a second ring gear shaft mounting said second ring gear and having at least one output gear;
7. an output shaft;
8. a plurality of driving gears on said output shaft, one driven by each said output gear, to make a plurality of gear pairs, either each said driving gear or each said output gear being secured to its shaft, the other of each said gear pair being freely rotatable upon its shaft;
9. clutch means for clutching each said freely rotatable gear separately to its said shaft;
10. a pair of hydraulic units, each able to perform as a motor and, at a different time, as a pump, each mounted on a separate shaft for rotation therewith, with hydraulic conduit means connecting said pair of units;
11. at least one additional gear mounted on each of said first and second sun gear shafts, for rotation with the sun gears thereof;
12. gear means on at least one of the shafts carrying a said hydraulic unit, driven by a said additional gear, whereby each said output gear is able to drive said output shaft at a different input-speed-to-output-speed ratio and a shift can be made from an output gear on said first ring gear shaft to an output gear on said second ring gear shaft and vice versa at a time when one of said ring gear shafts is moving at its minimum speed and the other is moving at its maximum speed and when one said hydraulic unit is a pump and the other one is a motor and one is on full stroke and the other is operating at zero stroke, so that the transmission can alternately transfer its output drive between said ring gear shafts in a recycling manner; and
13. said first said hydraulic unit being alternatingly coupled to the additional gear of said first sun gear shaft through a first path comprising a first intermediate gear and a first gear on and clutchable to the shaft of said first unit and through a second path comprising said first intermediate gear, an auxiliary shaft secured thereto, an input member of a torque-splitter planetary assembly also secured to said auxiliary shaft, an output member of said torque-splitter of said planetary assembly, a second gear engaged with said output member on and clutchable to the shaft of said first unit, and a reaction member of said torque-splitter planetary assembly connected to and rotating with the additional gear of said second sun gear shaft.

53. The recycling transmission of claim 52 wherein said input member is a sun gear and said output member a planetary gear carrier unit having a toothed gear surface.

54. The recycling transmission of claim 52 wherein the second said hydraulic unit is connected to said second sun gear shaft (a) by a first said additional gear on said second sun gear shaft and a first gear on the shaft of said second unit and (b) as a second alternate path by a gear train comprising a second said additional gear on said second sun gear shaft, a gear attached to and rotating with the reaction means of said torque-splitter planetary assembly, and a second gear on the shaft of said second unit, and wherein the second hydraulic unit is, as a third alternate, connected by a third gear clutchable to its shaft and engaged with the first said gear on the shaft of said first unit.

55. The recycling transmission of claim 54 wherein said input member is a sun gear, said output member is a planetary gear carrier, and said reaction member is a ring gear.

56. A recycling transmission, including in combination:
1. a planetary assembly having;
   a. a carrier,
   b. first and second planet gear sets carried by said carrier, each set comprising three gears, with first teeth on each gear of said first set engaging first teeth on at least one gear of said second set, each gear of each set also having second teeth,
   c. first and second sun gears, said second teeth of said first set being meshed with said first sun gear, said second teeth of said second set being meshed with said second sun gear,
   d. first and second ring gears, said second teeth of said first set being meshed with said first ring gear and said second teeth of said second set being meshed with said second ring gear;
2. an input shaft driving said carrier;
3. a first hollow shaft mounting said first sun gear and concentric with said input shaft;
4. a second hollow shaft mounting said second sun gear and coaxial with and displaced linearly from said first hollow shaft;
5. a third hollow shaft concentric with said first hollow shaft and mounting said first ring gear;
6. a fourth hollow shaft concentric with said second hollow shaft and mounting said second ring gear;
7. at least one output gear on said third hollow shaft;
8. at least one output gear on said fourth hollow shaft, having a different diameter from said one output gear on said third hollow shaft; 9. 9. an output shaft parallel to said hollow shafts;
10. a plurality of gears freely rotatable on said output shaft, one driven by each said output gear;
11. clutch means on said output shaft for clutching each said gear separately to said output shaft;
12. a pair of hydraulic units, each able to perform as a motor and, at a different time, as a pump, each mounted on a separate shaft for rotation therewith;
13. hydraulic conduit means connecting said pair of hydraulic units;
14. at least one additional gear mounted on each of said first and second hollow shafts, for rotation with the sun gears thereof; and
15. two gear means, one on each of the said shafts that carry a said hydraulic unit and each driven by a different said additional gear, whereby each said output gear is able to drive said output shaft at a different input-speed-to-output-speed ratio and a shift can be made from an output gear on said third hollow shaft to an output gear on said fourth hollow shaft and vice versa at a time when one of said third and fourth shafts is moving at its minimum speed and the other is moving at its maximum speed and when one said hydraulic unit is a pump and the other one is a motor and one is on full stroke and the other is operating at zero stroke, so that the transmission can alternately transfer its output drive between said third and fourth hollow shafts in a recycling manner.

57. The recycling transmission of claim 56 wherein there is a plurality of said output gears on each of said third and fourth hollow shafts, each being operatively connectable to a gear on said output shaft that is clutchable to said output shaft.

58. The recycling transmission of claim 57 wherein each of the output gears and the gear operatively connectable thereto provides a different ratio from the others, to provide a different transmission ratio.

59. The recycling transmission of claim 57 wherein some of said output gears mesh directly with their associated gears on said output shaft, to give a forward direction of rotation of said output shaft; and at least one of said output gears drives its associated gear on said output shaft through an idler gear to give a reverse direction of rotation of said output shaft.

60. The recycling transmission of claim 56 wherein there is a starting gear on said output shaft meshed with the said additional gear on said first hollow shaft, and clutch means on said output shaft for clutching said starting gear to said output shaft.

61. The recycling transmission of claim 56 wherein there is a reverse gear on said output shaft, clutch means for clutching said reverse gear to said output shaft, and idler gear means interposed between said reverse gear and the said additional gear on said first hollow shaft, for enabling that said additional gear to drive said reverse gear and to do so in a direction of rotation of the output shaft opposite to that in which said output gears drive it.

62. The recycling transmission of claim 56 wherein there is control means for said pair of hydraulic units for first making one of them perform as a pump while the other performs as a motor and then making the other perform as a pump while the one performs as a motor, the one being on full stroke while the other is on zero stroke and vice versa.

63. The recycling transmission of claim 56 wherein each said hydraulic unit has separate control means so that each one can separately be moved from full stroke to zero stroke and back.

64. A recycling transmission, including in combination:
1. a planetary assembly having;
  a. a carrier,
  b. first and second planet gear sets carried by said carrier, each set comprising three gears, with first teeth on each gear of said first set engaging first teeth on at least one gear of said second set, each gear of each set also having second teeth,
  c. first and second sun gears, said second teeth of said first set being meshed with said first sun gear, said second teeth of said second set being meshed with said second sun gear,
  d. first and second ring gears, said second teeth of said first set being meshed with said first ring gear and said second teeth of said second set being meshed with said second ring gear;
2. an input shaft driving said carrier;
3. a first hollow shaft mounting said first sun gear and concentric with said input shaft;
4. a second hollow shaft mounting said second sun gear and coaxial with and displaced linearly from said first hollow shaft;
5. a third hollow shaft concentric with said first hollow shaft and mounting said first ring gear;
6. a fourth hollow shaft concentric with said second hollow shaft and mounting said second ring gear;
7. at least one output gear on said third hollow shaft; 8. 8. at least one output gear on said fourth hollow shaft, having a different diameter from said one output gear on said third hollow shaft;
9. an output shaft parallel to said hollow shafts;
10. a plurality of gears freely rotatable on said output shaft, one driven by each said output gear;
11. clutch means on said output shaft for clutching each said gear separately to said output shaft;
12. a pair of hydraulic units, each able to perform as a motor and, at a different time, as a pump, each mounted on a separate shaft for rotation therewith;
13. hydraulic conduit means connecting said pair of hydraulic units;
14. at least one additional gear mounted on each of said first and second hollow shafts, for rotation with the sun gears thereof;
15. two gear means, the gear means being on at least one of the said shafts that carry a said hydraulic unit and driven by a said additional gear, whereby each said output gear is able to drive said output shaft at a different input-speed-to-output-speed ratio and a shift can be made from an output gear on said third hollow shaft to an output gear on said fourth hollow shaft and vice versa at a time when one of said third and fourth shafts is moving at its minimum speed and the other is moving at its maximum speed and when one said hydraulic unit is a pump and the other one is a motor and one is on full stroke and the other is operating at zero stroke, so that the transmission can alternately transfer its output drive between said third and fourth hollow shafts in a recycling manner;
16. means for retaining a fixed displacement on a first said hydraulic unit; and
17. means for varying the stroke of a second said hydraulic unit from full stroke in one direction of flow through said conduit means through zero stroke to full stroke in the opposite direction of flow, said second hydraulic unit being coupled directly to the input shaft while both said gear means (15) are on the shaft for said first hydraulic unit and are separately clutchable thereto.

65. The recycling transmission of claim 56 having single control means for controlling each of said clutch means and said hydraulic units.

66. The recycling transmission of claim 65 wherein said single control means comprises a single shaft, a set of cams mounted thereon, a cam follower engaging each said cam, valve means operated by each of said cam followers, hydraulic means for operating each said clutch means and a fluid pressure system controlled by said valve means for actuating each said hydraulic means.

67. The recycling transmission of claim 66 wherein said shaft also carries a cam for operating one said hydraulic unit through a cam follower, valve, said fluid pressure system and a hydraulic means.

68. The recycling transmission of claim 67 wherein said one said hydraulic unit has means for operating the other said hydraulic unit in a reverse mode, so that when one is on full stroke the other is on zero stroke and vice versa.

69. The recycling transmission of claim 68 wherein only said one said hydraulic unit is so controlled, the other said hydraulic unit operating at a fixed stroke.

70. The recycling transmission of claim 67 wherein each said hydraulic unit has its own said cam, cam follower, valve, and hydraulic means.

71. A recycling transmission, including in combination:
1. a planetary assembly having;
  a. a carrier,
  b. first and second planet gear sets carried by said carrier, each set comprising three gears, with first teeth on each gear of said first set engaging first teeth on at least one gear of said second set, each gear of each set also have second teeth,
  c. first and second sun gears, said second teeth of said first set being meshed with said first sun gear, said second teeth of said second set being meshed with said second sun gear,
  d. first and second ring gears, said second teeth of said first set being meshed with said first ring gear and said second teeth of said second set being meshed with said second ring gear,
2. an input shaft driving said carrier;
3. a first hollow shaft mounting said first sun gear and concentric with said input shaft;
4. a second hollow shaft mounting said second sun gear and coaxial with and displaced linearly from said first hollow shaft;
5. a third hollow shaft concentric with said first hollow shaft and mounting said first ring gear;
6. a fourth hollow shaft concentric with said second hollow shaft and mounting said second ring gear;
7. at least one output gear on said third hollow shaft; 8. at least one output gear on said fourth hollow shaft, having a different diameter from said one output gear on said third hollow shaft;
9. an output shaft parallel to said hollow shafts;
10. a plurality of gears freely rotatable on said output shaft, one driven by each said output gear;
11. clutch means on said output shaft for clutching each said gear separately to said output shaft;
12. a pair of hydraulic units, each able to perform as a motor and, at a different time, as a pump, each mounted on a separate shaft for rotation therewith;

13. hydraulic conduit means connecting said pair of hydraulic units;
14. at least one additional gear mounted on each of said first and second hollow shafts, for rotation with the sun gears thereof;
15. two gear means, the gear means being on at least one of the said shafts that carry a said hydraulic unit and driven by a said additional gear, whereby each said output gear is able to drive said output shaft at a different input-speed-to-output-speed ratio and a shift can be made from an output gear on said third hollow shaft to an output gear on said fourth hollow and vice versa at a time when one of said third and fourth shafts is moving at its minimum speed and the other is moving at its maximum speed and when one said hydraulic unit is a pump and the other one is a motor and one is on full stroke and the other is operating at zero stroke, so that the transmission can alternately transfer its output drive between said third and fourth hollow shafts in a recycling manner;
16. a torque-splitting planetary assembly with first, second and third elements comprising the sun, planets and carrier, and ring gears, not necessarily in that order, said first element being drivingly connected to said first hollow shaft, said second element being drivingly connected to second hollow shaft;
17. means for connecting and disconnecting said third element to the first of said pair of hydraulic units; and
18. means for connecting and disconnecting at different times from each other each of said first and second elements to the second said hydraulic unit.

72. The recycling transmission of claim 58 wherein said gear means (15) of a first of said pair of hydraulic units has clutch means for clutching and declutching it from the shaft for said first hydraulic unit.

73. The recycling transmission of claim 72 wherein said gear means (15) of said first hydraulic unit is driven through first and second intermediate gears by the said additional gear on said first hollow shaft.

74. The recycling transmission of claim 73 wherein said first intermediate gear drives a sun gear of a splitter planetary assembly having a carrier with an external gear comprising said second intermediate gear.

75. The recycling transmission of claim 74 wherein said shaft of said first hydraulic unit has two gears thereon, each separately clutchable to that said shaft, a first one being driven by said first intermediate gear through said planetary carrier and a second gear being driven from said first intermediate gear by a directly meshed other intermediate gear.

76. The recycling transmission of claim 75 wherein the second of said hydraulic units has a shaft with three gears mounted thereon, each separately clutchable to that said shaft, a first of these said three gears being directly meshed with the said second gear on the shaft of the first hydraulic unit, a second said gear of said three gears being driven directly by a said additional gear on said second hollow shaft, and a third said gear of said three gears driven from a further additional said gear on said second hollow shaft through a special intermediate gear.

77. The recycling transmission of claim 76 wherein said special intermediate gear is connected directly by a shaft to a ring gear of said splitter planetary assembly.

78. A device as defined in claim 16 wherein one of the gear trains of at least one said pair includes an idler gear, whereby said one of said gear trains can rotate the output shaft in a reverse direction.

79. A device as defined in claim 23 wherein one of the gear trains of at least one of said pair includes an idler gear whereby said one of said gear trains can rotate the output shaft in a reverse direction.

80. The recycling transmission of claim 47 wherein there is a plurality of said output gears on each said ring gear shaft, each making a gear pair with a said driving gear on said output shaft.

81. The recycling transmission of claim 47 wherein each said gear pair has a different ratio from that of the other gear pairs.

82. The recycling transmission of claim 47 having control means for operating said hydraulic means so that one said hydraulic means is on full stroke while the other is operating at zero stroke and vice versa.

83. The recycling transmission of claim 64 wherein there is a plurality of said output gears on each of said third and fourth hollow shafts, each being operatively connectable to a gear on said output shaft that is clutchable to said output shaft.

84. The recycling transmission of claim 64 wherein each of the output gears and the gear operatively connectable thereto provides a different ratio from the others, to provide a different transmission ratio.

85. The recycling transmission of claim 64 wherein some of said output gears mesh directly with their associated gears on said output shaft, to give a forward direction of rotation of said output shaft; and others of said output gears drive their associated gear on said output shaft through an idler gear to give a reverse direction of rotation of said output shaft.

86. A power transmission comprising:
a driving shaft;
a pair of intermediate shafts;
an output shaft;
a planetary gear train connected to said input shaft;
an output gear carried by each of said pair of intermediate shafts in mesh with the planet gears of said train;
at least a pair of gear trains connected to each of said pair of shafts;
means for selectively connecting said gear trains comprising a clutch for connecting either one of said pair of gear trains to the output shaft;
means for engaging said clutches for simultaneously driving the output shaft from a gear train connected to each of the intermediate shafts;
means for disengaging one of the clutches after the other clutch has been engaged;
a reaction gear in mesh with the planet gears of one said train;
a first positive displacement hydraulic unit drivingly connected to the driving shaft;
a second positive displacement hydraulic unit having a shaft;
means connecting the two hydraulic units for driving one by the other;
a gear train for connecting said reaction gear with the shaft of the second unit; and
means regulating the output of the two hydraulic units.

87. A power transmission comprising:
a driving shaft;
a pair of intermediate shafts;
an output shaft;
a planetary gear train connected to said input shaft;
a ring gear carried by each of said pair of shafts in mesh with the planet gears of said train;
at least a pair of gear trains connected to each of said pair of shafts;
means for selectively connecting said gear trains, comprising a clutch for connecting either one of said pair of gear trains to the output shaft, means for engaging said clutches for simultaneously driving the output shaft from a gear train connected to each of the intermediate shafts, and means for disengaging one of the clutches after the other clutch has been engaged;
sun gear means in mesh with the planet gears;
a first positive displacement hydraulic unit drivingly connected to the driving shaft;
a second positive displacement hydraulic unit having a shaft;
means connecting the two hydraulic units for driving one by the other;
a gear train for connecting said sun gear means with the shaft of the second unit; and means regulating the output of the two hydraulic units.

88. A method of operating a transmission of the type having a planetary gear assembly with a rotary input member, a pair of rotary reaction members, and a pair of rotary output members, said transmission also having a pair of fluid pump-motors hydraulically connected together, each able to serve as a pump at some times and as a motor at other times, one serving as a pump when the other serves as a motor and vice versa, and each being connected to a said rotary reaction member, and a series of gear trains of overlapping ratios, a plurality for each said rotary output member, a main output shaft, and clutch means for connecting said main output shaft to each said rotary output member through a said gear train, comprising the steps of:
1. continuously driving said rotary input member;
2. transmitting torque from said rotary input member to said main output shaft through a first said rotary output member and a first said gear train;
3. causing a first said pump-motor connected to a first said reaction member to progress from zero speed and full stroke to maximum speed and zero stroke;
4. simultaneously causing a second said pump-motor, connected to a second said rotary reaction member to retrogress from maximum speed and zero stroke to zero speed and full stroke;
5. whereby said first rotary output member increases its speed and the speed of the main output shaft while said second rotary output member decreases its speed;
6. shifting synchronously the drive to said main output shaft from said first gear train to a second gear train driven by said second rotary output member at an overlapping ratio, the clutch means being caused to engage said second gear train to said main output shaft while said first gear train is still engaged therewith and then to disengage said first gear train therefrom;
7. reversing the functional operation of said two pump-motors, so that the second pump-motor progresses from zero speed and full stroke to maximum speed and zero stroke while the first pump-motor retrogresses from maximum speed and zero stroke to zero speed and full stroke, and so that said second rotary output member increases its speed and further increases the speed of said main output shaft while the speed of said first rotary output member decreases;
8. shifting synchronously the drive to said main output shaft from said second gear train to a third gear train driven by said first rotary output member at a different overlapping ratio, engagement of said third gear train being followed by disengagement of said second gear train; and
9. again reversing the functional operation of said pump-motors; and continuing to increase the speed of said main output shaft by shifting successively between gear trains of different overlapping ratios driven alternately by said rotary output members as set forth in steps (6) and (8) and by reversing the functional operation of said pump-motors as set forth in steps (7) and (9).

89. The method of claim 88 characterized by a constant ratio between the maximum and minimum speeds of said main output shaft for every one of said gear trains.

90. A method of operating a transmission of the type having a planetary gear assembly with a rotary input member, a pair of rotary reaction members, and a pair of rotary output members, said transmission also having first and second fluid pump-motors hydraulically connected together, each able to serve as a pump at some times and as a motor at other times, one serving as a pump while the other serves as a motor and vice versa, said first pump-motor being kept at constant stroke and being connectable in alternation through first and second reaction gear trains to each of said rotary reaction members, said second pump-motor always being connected operatively to said rotary input member, and a series of output gear trains of overlapping ratios, a plurality for each said rotary output member, a main output shaft, and clutch means for connecting said main output shaft to each said rotary output member through a said gear train, comprising the steps of:
1. continuously driving said rotary input member;
2. transmitting torque from said rotary input member to said main output shaft through a first said rotary output member and a first said outer gear train;
3. causing said first pump-motor to be connected to a first said reaction member and to serve as a motor progressing from zero speed to maximum speed;
4. simultaneously causing said second pump-motor then serving as a pump, to move from zero stroke to full stroke;
5. whereby said first rotary output member increases its speed and the speed of the main output shaft while a second rotary output member decreases its speed, and the speed of said first reaction member increases while the speed of said second reaction member decreases;
6. when said first and second reaction members attain the same speed, shifting synchronously the connection of said first pump-motor to said second reaction member and then disengaging it from said first reaction member, whereby said first pump-motor becomes a pump and second pump-motor becomes a motor;
7. moving said second pump-motor from full stroke to zero stroke while moving said first pump-motor from maximum speed to zero speed, thereby further increasing the speed of said first rotary output member and further decreasing the speed of said second rotary output member, and also decreasing the speed of said second reaction member while further increasing the speed of said first reaction member;
8. shifting synchronously the drive to said main output shaft from said first output gear train to a second output gear train driven by said second rotary output member at an overlapping ratio, the clutch means being caused to engage said second output gear train to said main output shaft while said first output gear train is still engaged therewith and then to disengage said first output gear train therefrom;
9. again reversing the functional operation of said two pump-motors, so that the first pump-motor again moves as a motor from zero speed to maximum speed, while the second pump-motor again moves as a pump from zero stroke to full stroke, and so that said second rotary output member increases its speed and further increases the speed of said main output shaft while the speed of said first rotary output member decreases and while the speed of said second reaction member increases while the speed of said first reaction member decreases; and
10. when said first and second reaction members once again attain the same speed, shifting synchronously the connection of said first pump-motor to said first reaction member and disengaging it from said second reaction member and then moving said second pump-motor from full stroke to zero stroke while it serves as a motor and while said first pump-motor, serving as a pump, moves from maximum speed to zero speed, thereby further increasing the speed of the output shaft, and continuing to increase the speed of said main output shaft by shifting successively between output gear trains of different overlapping ratios driven alternately by said rotary output members as set forth in step (8) and by intermediately shifting between said reaction gear trains as set forth in steps 6 and 10.

91. The method of claim 90 characterized by a constant ratio between the maximum and minimum speeds of said main output shaft for every one of said output gear trains.

92. A method of operating a transmission of the type having a main planetary gear assembly with a rotary input member, first and second rotary reaction members, and a pair of rotary output members, said transmission also having an auxiliary planetary gear assembly with a first member connected to said first reaction member, a second member connected to said second reaction member, and a third reaction member, each of said first and second members acting sometimes as an input while the other acts as an output and vice versa, said transmission having first and second fluid pump-motors, hydraulically connected together, each able to serve as a pump at some times and as a motor at other times, one serving as a pump while the other serves as a motor and vice versa, said first pump-motor being connectable in alternation through first and second reaction gear trains to each of said rotary reaction members, said first pump-motor at the same time being connected to one of said first and second members of said auxiliary planetary gear assembly, said second pump-motor being connected to the third reaction member, and a series of output gear trains of overlapping ratios, a plurality for each said rotary output member, a main output shaft, and clutch means for connecting said main output shaft to each said rotary output member through a said output gear train, comprising the steps of:

1. continuously driving said rotary input member;
2. transmitting torque from said rotary input member to said main output shaft through a first said rotary output member and a first said output gear train;
3. operatively connecting said first pump-motor to said first reaction member and to said first member of said auxiliary planetary gear assembly to progress from zero speed and full stroke to maximum speed and zero stroke;
4. simultaneously causing said second pump-motor connected to said third reaction member to retrogress from maximum speed and zero stroke to zero speed and full stroke;
5. whereby said first reaction member increases its speed and said first rotary output member increases its speed and the speed of the main output shaft, while said second reaction member decreases its speed and a second rotary output member decreases its speed;
6. shifting synchronously the connection of said first pump-motor from to said first reaction gear train to said second reaction gear train;
7. reversing the functional operation of said two pump-motors, so that the second pump-motor progress from zero speed and full stroke to maximum speed and zero stroke while the first pump-motor retrogresses from maximum speed and zero stroke to zero speed and full stroke, and so that said second reaction member increases its speed and said first rotary output member continues to increase its speed and further increases the speed of said main output shaft while the speeds of said first reaction member and said second rotary output member decrease;
8. shifting synchronously the drive to said main output shaft from said first output gear train to a second output gear train driven by said second rotary output member at an overlapping ratio, engagement of said second output gear train being followed by disengagement of said first output gear train; and
9. again reversing the functional operation of said pump motors; and continuing to increase the speed of said main output shaft by shifting successively, first, between reaction gear trains and, second, between output gear trains of different overlapping ratios driven alternately by said rotary output members as set forth in steps (6) and (8) and by reversing the functional operation of said pump motors as set forth in steps (7) and (9).

93. The method of claim 92 characterized by a constant ratio between the maximum and minimum speeds of said main output shaft for every one of said output gear trains.

PO-1050
(5/69)

UNITED STATES PATENT OFFICE
CERTIFICATE OF CORRECTION

Patent No. 3,580,107　　　　　　　　Dated May 25, 1971

Inventor(s)　　　Elias Orshansky, Jr.

It is certified that error appears in the above-identified patent and that said Letters Patent are hereby corrected as shown below:

Column 6, line 63, "driven" should read -- drive --. Column 7, line 15, "on" should read -- one --. Column 8, line 32, "ration" should read -- ratio --. Column 10, line 73, insert -- . -- after "(Fig. 18)". Column 12, line 11, "dump" should read -- bump --. Column 15, lines 50 & 51, "having" should read -- have --. Column 17, line 17, "(b)" should read -- $(b^1)$ --; line 54, "(R-/2)" should read -- $\left(\frac{R-1}{2}\right)$ --.

Column 26, line 12, insert -- first -- after "said". Column 28, line 32, "addition" should read -- additional --. Column 29, line 32, "addition" should read -- additional --; line 68, "51" should read -- 49 --. Column 32, line 27-28, after ";" delete the first "9." and put everything else as a new paragraph. Column 33, lines 46-49, after ";" delete the first "8." and put everything else as a new paragraph. Column 34, lines 64-67, after ";" on line 64 put everything else as a new paragraph. Column 35, line 32, "58" should read -- 56 --. Column 37, lines 31 & 32, "ration" should read -- ratio --. Column 40, line 2, delete "to" after "from".

Signed and sealed this 30th day of November 1971.

(SEAL)
Attest:

EDWARD M. FLETCHER, JR.　　　　　　ROBERT GOTTSCHALK
Attesting Officer　　　　　　　　　　Acting Commissioner of Patents